US012436366B2

(12) United States Patent
Lin et al.

(10) Patent No.: US 12,436,366 B2
(45) Date of Patent: Oct. 7, 2025

(54) PHOTOGRAPHING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Yu Jui Lin, Taichung (TW); Yu-Tai Tseng, Taichung (TW); Wei-Xiang Fu, Taichung (TW); Cheng-Yu Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 530 days.

(21) Appl. No.: 17/900,674

(22) Filed: Aug. 31, 2022

(65) Prior Publication Data

US 2024/0012223 A1 Jan. 11, 2024

(30) Foreign Application Priority Data

Jul. 8, 2022 (TW) .................................. 111125695

(51) Int. Cl.
*G02B 9/60* (2006.01)
*G02B 13/00* (2006.01)
*H04N 23/54* (2023.01)

(52) U.S. Cl.
CPC ........... *G02B 9/60* (2013.01); *G02B 13/0045* (2013.01); *G02B 13/0065* (2013.01); *H04N 23/54* (2023.01)

(58) Field of Classification Search
None
See application file for complete search history.

(56) References Cited

U.S. PATENT DOCUMENTS

| 3,215,037 | A | 11/1965 | Tronnier et al. |
| 4,767,201 | A | 8/1988 | Fujita et al. |
| 5,267,086 | A | 11/1993 | Hirano |
| 8,576,498 | B2 * | 11/2013 | Huang .................. G02B 13/18 359/764 |
| 8,953,257 | B1 * | 2/2015 | Chen .................. G02B 13/0045 359/714 |
| 10,649,176 | B2 * | 5/2020 | Yoo ...................... G02B 13/001 |
| 11,385,437 | B2 * | 7/2022 | Chen ....................... G02B 9/60 |

(Continued)

FOREIGN PATENT DOCUMENTS

| CN | 108152936 A | 6/2018 |
| CN | 109298514 A | 2/2019 |

(Continued)

OTHER PUBLICATIONS

European Search Report issued in corresponding application No. 22194523.1, dated Sep. 20, 2023.

*Primary Examiner* — Darryl J Collins
(74) *Attorney, Agent, or Firm* — Maschoff Brennan

(57) ABSTRACT

A photographing optical lens assembly includes five lens elements which are, in order from an object side to an image side along an optical path: a first lens element, a second lens element, a third lens element, a fourth lens element and a fifth lens element. The first lens element has positive refractive power. The second lens element has negative refractive power. When specific conditions are satisfied, the requirements of compact size and high image quality can be met by the photographing optical lens assembly, simultaneously.

28 Claims, 36 Drawing Sheets

(56) References Cited

U.S. PATENT DOCUMENTS

| | | |
|---|---|---|
| 2018/0017767 A1 | 1/2018 | Chen |
| 2018/0059376 A1 | 3/2018 | Lin et al. |
| 2018/0143403 A1 | 5/2018 | Tseng et al. |
| 2018/0180847 A1 | 6/2018 | Yoo |
| 2018/0284394 A1 | 10/2018 | Chen et al. |
| 2018/0364455 A1 | 12/2018 | Chen et al. |
| 2019/0086636 A1 | 3/2019 | Fukaya |
| 2020/0064594 A1 | 2/2020 | Jeong et al. |
| 2020/0088972 A1 | 3/2020 | Yoo et al. |
| 2021/0063687 A1 | 3/2021 | Huh et al. |
| 2021/0063688 A1 | 3/2021 | Shin et al. |
| 2021/0063703 A1 | 3/2021 | Byun et al. |
| 2021/0349289 A1 | 11/2021 | Huh et al. |
| 2021/0382207 A1 | 12/2021 | Lee et al. |
| 2021/0389570 A1 | 12/2021 | Wang et al. |
| 2022/0026682 A1 | 1/2022 | Wu et al. |
| 2022/0035125 A1 | 2/2022 | Yang et al. |
| 2022/0057610 A1 | 2/2022 | Kim et al. |
| 2022/0091395 A1* | 3/2022 | Huang .................. G02B 9/62 |
| 2022/0137344 A1 | 5/2022 | Tan |
| 2022/0206274 A1 | 6/2022 | Huh et al. |
| 2023/0103427 A1* | 4/2023 | Xie .................... H04N 23/55 |
| | | 348/340 |
| 2024/0004162 A1* | 1/2024 | Lin .................... G02B 9/62 |

FOREIGN PATENT DOCUMENTS

| | | |
|---|---|---|
| CN | 110955020 A | 4/2020 |
| CN | 113433657 A | 9/2021 |
| CN | 214375510 U | 10/2021 |
| CN | 113759517 A | 12/2021 |
| CN | 113866942 A | 12/2021 |
| CN | 113933967 A | 1/2022 |
| CN | 216052398 U | 3/2022 |
| CN | 114415336 A | 4/2022 |
| TW | 202144851 | 12/2021 |
| WO | 2018154421 A1 | 8/2018 |
| WO | 2022058807 A1 | 3/2022 |

* cited by examiner

PHOTOGRAPHING OPTICAL LENS ASSEMBLY, IMAGE CAPTURING UNIT AND ELECTRONIC DEVICE

RELATED APPLICATIONS

This application claims priority to Taiwan Application 111125695, filed on Jul. 8, 2022, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

Specifically, in recent years, electronic devices such as electronic products have been required for lightness and thinness, so it is difficult for a conventional optical lens to simultaneously meet the requirements of high-specification and compactness, especially a small lens featuring a large aperture or a telephoto function. However, as the optical zoom requirement becomes stricter (e.g., increasing the optical zoom magnification, etc.), the conventional telephoto lens becomes unable to catch the technology requirements and thus have problems such as an overly long total length, an overly small aperture, insufficient quality and inability in compactness. Therefore, it needs to introduce different optical features to overcome the abovementioned problems for meeting the requirements.

SUMMARY

According to one aspect of the present disclosure, a photographing optical lens assembly includes five lens elements. The five lens elements are, in order from an object side to an image side along an optical path, a first lens element, a second lens element, a third lens element, a fourth lens element and a fifth lens element.

The first lens element has positive refractive power. The second lens element has negative refractive power.

When an Abbe number of the second lens element is V2, an Abbe number of the third lens element is V3, an Abbe number of the fourth lens element is V4, a sum of central thicknesses of all lens elements of the photographing optical lens assembly is $\Sigma CT$, a sum of axial distances between each of all adjacent lens elements of the photographing optical lens assembly is $\Sigma AT$, a central thickness of the first lens element is CT1, a central thickness of the second lens element is CT2, a central thickness of the fourth lens element is CT4, a central thickness of the fifth lens element is CT5, an axial distance between an object-side surface of the first lens element and an image-side surface of the fifth lens element is TD, an axial distance between the image-side surface of the fifth lens element and an image surface is BL, an axial distance between the object-side surface of the first lens element and the image surface is TL, a maximum image height of the photographing optical lens assembly is ImgH, and an axial distance between the third lens element and the fourth lens element is T34, the following conditions are satisfied:

$30 < V2+V3+V4 < 93;$ $0.5 < \Sigma CT/\Sigma AT < 2.5;$ $1.8 < (CT1+CT2)/(CT4+CT5) < 5.0;$ $0.1 < TD/BL < 1.1;$ $1.0 < TL/\mathrm{Img}H < 4.2;$ and $0.01 < CT4/T34 < 4.0.$ According to another aspect of the present disclosure, a photographing optical lens assembly includes five lens elements. The five lens elements are, in order from an object side to an image side along an optical path, a first lens element, a second lens element, a third lens element, a fourth lens element and a fifth lens element.

The first lens element has positive refractive power. The second lens element has negative refractive power. The third lens element has an image-side surface being concave in a paraxial region thereof.

When an Abbe number of the second lens element is V2, an Abbe number of the third lens element is V3, an Abbe number of the fourth lens element is V4, a sum of central thicknesses of all lens elements of the photographing optical lens assembly is $\Sigma CT$, a sum of axial distances between each of all adjacent lens elements of the photographing optical lens assembly is $\Sigma AT$, a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between an object-side surface of the first lens element and an image-side surface of the fifth lens element is TD, an axial distance between the image-side surface of the fifth lens element and an image surface is BL, a focal length of the photographing optical lens assembly is f, a focal length of the first lens element is f1, a focal length of the second lens element is f2, a focal length of the fourth lens element is f4, and a focal length of the fifth lens element is f5, the following conditions are satisfied:

$30 < V2+V3+V4 < 93;$ $0.5 < \Sigma CT/\Sigma AT < 2.5;$ $1.8 < (CT1+CT2)/(CT4+CT5) < 5.0;$ $0.1 < TD/BL < 1.1;$ $0 < (|f/f4|+|f/f5|)/(|f/f1|+|f/f2|) < 0.35;$ and $0 < CT3/CT1 < 0.55.$ According to another aspect of the present disclosure, an image capturing unit includes one of the aforementioned photographing optical lens assemblies and an image sensor, wherein the image sensor is disposed on the image surface of the photographing optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical lens assembly includes five lens elements. The five lens elements are, in order from an object side to an image side along an optical path, a first lens element, a second lens element, a third lens element, a fourth lens element and a fifth lens element.

The first lens element has positive refractive power. Therefore, it is favorable for reducing the size of the photographing optical lens assembly.

The second lens element has negative refractive power. Therefore, it is favorable for correcting aberrations of the photographing optical lens assembly.

The third lens element can have positive refractive power. Therefore, it is favorable for utilizing the third lens element as a positive lens element to be arranged with a relatively small Abbe number for chromatic aberration compensation and image periphery light convergence so as to achieve chromatic aberration correction. The third lens element can have an object-side surface being convex in a paraxial region thereof. Therefore, it is favorable for increasing the symmetry of the photographing optical lens assembly so as to improve image quality. The third lens element can have an image-side surface being concave in a paraxial region thereof. Therefore, it is favorable for assisting in reduction of the back focal length of the photographing optical lens assembly while correcting off-axial aberrations.

Figure 30:
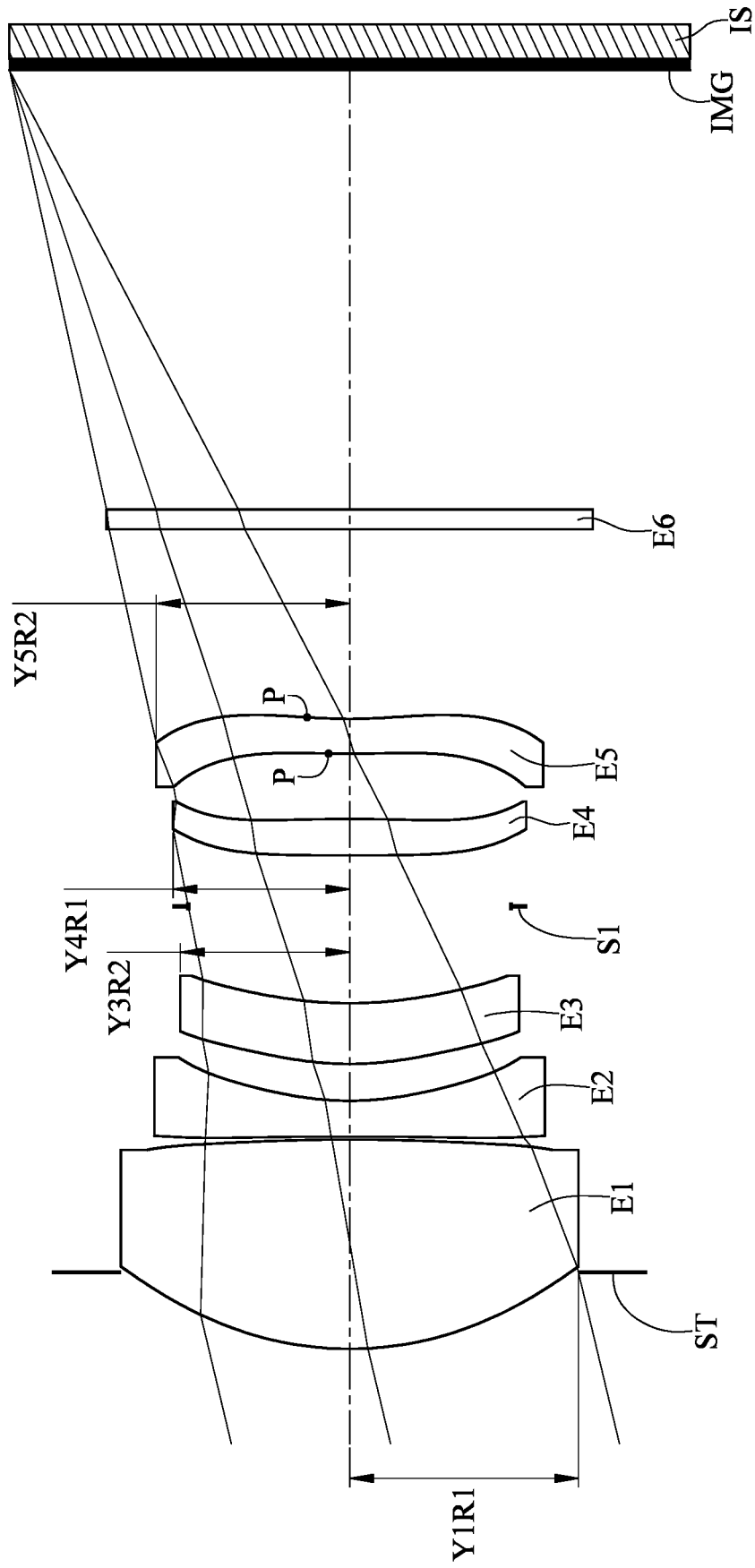
FIG. 30 shows a schematic view of Y1R1, Y3R2, Y4R1, Y5R2 and several inflection points of the fifth lens element according to the 1st embodiment of the present disclosure.

At least one of an object-side surface and an image-side surface of the fifth lens element can have at least one inflection point. Therefore, it is favorable for correcting distortion so as to prevent deformation at the image periphery. Please refer to FIG. 30, which shows a schematic view of inflection points P on each of the object-side surface and the image-side surface of the fifth lens element E5 according to the 1st embodiment of the present disclosure. The above-mentioned inflection points on the object-side surface and the image-side surface of the fifth lens element in FIG. 30 are only exemplary. Each of lens surfaces in various embodiments of the present disclosure may also have one or more inflection points.

When an Abbe number of the second lens element is V2, an Abbe number of the third lens element is V3, and an Abbe number of the fourth lens element is V4, the following condition is satisfied: 30<V2+V3+V4<93. Therefore, it is favorable for effectively correcting focus positions at different wavelengths so as to prevent overlayed images. Moreover, the following condition can also be satisfied: 50<V2+V3+V4<90. Moreover, the following condition can also be satisfied: 60<V2+V3+V4<88.

When a sum of central thicknesses of all lens elements of the photographing optical lens assembly is ΣCT, and a sum of axial distances between each of all adjacent lens elements of the photographing optical lens assembly is ΣAT, the following condition is satisfied: 0.5<ΣCT/ΣAT<2.5. Therefore, it is favorable for adjusting the lens distribution and obtaining a proper balance between lens thicknesses and lens intervals, thereby facilitating reducing the overall size. Moreover, the following condition can also be satisfied: 0.8<ΣCT/ΣAT<2.3.

When a central thickness of the first lens element is CT1, a central thickness of the second lens element is CT2, a central thickness of the fourth lens element is CT4, and a central thickness of the fifth lens element is CT5, the following condition is satisfied: 1.8<(CT1+CT2)/(CT4+CT5)<5.0. Therefore, it is favorable for balancing the central thicknesses proportion of lens elements at the front side and the rear side, such that the lens is easily to be assembled and the yield rate thereof is increased. Moreover, the following condition can also be satisfied: 1.9<(CT1+CT2)/(CT4+CT5)<4.2.

When an axial distance between an object-side surface of the first lens element and the image-side surface of the fifth lens element is TD, and an axial distance between the image-side surface of the fifth lens element and an image surface is BL, the following condition is satisfied: 0.1<TD/BL<1.1. Therefore, it is favorable for ensuring the photographing optical lens assembly is able to provide a good telephoto function. Moreover, the following condition can also be satisfied: 0.5<TD/BL<1.0.

When an axial distance between the object-side surface of the first lens element and the image surface is TL, and a maximum image height of the photographing optical lens assembly (which can be half of a diagonal length of an effective photosensitive area of the image sensor) is ImgH, the following condition can be satisfied: 1.0<TL/ImgH<4.2. Therefore, it is favorable for adjusting the photographing optical lens assembly to have a good viewing angle so as to be applied in various fields. Moreover, the following condition can also be satisfied: 2.0<TL/ImgH<4.0. Moreover, the following condition can also be satisfied: 3.0<TL/ImgH<4.0. Moreover, the following condition can also be satisfied: 3.0<TL/ImgH<3.9.

When the central thickness of the fourth lens element is CT4, and an axial distance between the third lens element and the fourth lens element is T34, the following condition can be satisfied: 0.01<CT4/T34<4.0. Therefore, it is favorable for having sufficient space between the third lens element and the fourth lens element so as to increase design flexibility. Moreover, the following condition can also be satisfied: 0.1<CT4/T34<2.5. Moreover, the following condition can also be satisfied: 0.1<CT4/T34<1.3.

When a focal length of the photographing optical lens assembly is f, a focal length of the first lens element is f1, a focal length of the second lens element is f2, a focal length of the fourth lens element is f4, and a focal length of the fifth lens element is f5, the following condition can be satisfied: 0<(|f/f4|+|f/f5|)/(|f/f1|+|f/f2|)<0.35. Therefore, it is favorable for ensuring the first lens element and the second lens element to each have sufficient refractive power for featuring compactness of the photographing optical lens assembly. Moreover, the following condition can also be satisfied: 0.01<(|f/f4|+|f/f5|)/(|f/f1|+|f/f2|)<0.32.

When the central thickness of the first lens element is CT1, and a central thickness of the third lens element is CT3, the following condition can be satisfied: 0<CT3/CT1<0.55. Therefore, it is favorable for balancing the central thicknesses proportion of the first lens element and the third lens element so as to control the size of the photographing optical lens assembly. Moreover, the following condition can also be satisfied: 0.1<CT3/CT1<0.52. Moreover, the following condition can also be satisfied: 0.2<CT3/CT1<0.50.

When a curvature radius of the object-side surface of the third lens element is R5, and a curvature radius of the image-side surface of the third lens element is R6, the following condition can be satisfied: (R5+R6)/(R5−R6)<−1.5. Therefore, it is favorable for having a relatively strong refraction ability of the object-side surface of the third lens element so as to control the travelling direction of the light path. Moreover, the following condition can also be satisfied: (R5+R6)/(R5−R6)<−1.8. Moreover, the following condition can also be satisfied: −50.0<(R5+R6)/(R5−R6)<−2.0. Moreover, the following condition can also be satisfied: −45.0<(R5+R6)/(R5−R6)<−3.0.

When the curvature radius of the object-side surface of the third lens element is R5, and a curvature radius of an object-side surface of the fourth lens element is R7, the following condition can be satisfied: −15.0<(R5+R7)/(R5−R7)<0.6. Therefore, it is favorable for effectively balancing lens shapes of the third lens element and the fourth lens element, such that the third lens element has a relatively strong light path control ability, and the fourth lens element is utilized for balancing the light path. Moreover, the following condition can also be satisfied: −12.0<(R5+R7)/(R5−R7)<0. Moreover, the following condition can also be satisfied: −8.0<(R5+R7)/(R5−R7)<−0.5.

When a curvature radius of the object-side surface of the fifth lens element is R9, and a curvature radius of the image-side surface of the fifth lens element is R10, the following condition can be satisfied: −0.5<(R9+R10)/(R9−R10)<13.0. Therefore, it is favorable for adjusting the lens shape of the fifth lens element, thereby adjusting the back focal length. Moreover, the following condition can also be satisfied: −0.43<(R9+R10)/(R9−R10)<10.0.

When the focal length of the second lens element is f2, and the central thickness of the second lens element is CT2, the following condition can be satisfied: 3.2<|f2|/CT2<27.5. Therefore, it is favorable for effectively balancing the refractive power and the thickness of the second lens element, thereby correcting overall aberrations and miniaturizing the photographing optical lens assembly. Moreover, the following condition can also be satisfied: $3.5<|f2|/CT2<26.0$.

When the central thickness of the first lens element is CT1, the central thickness of the second lens element is CT2, the central thickness of the third lens element is CT3, an axial distance between the first lens element and the second lens element is T12, an axial distance between the second lens element and the third lens element is T23, and the axial distance between the object-side surface of the first lens element and the image surface is TL, the following condition can be satisfied: $0.15<(CT1+T12+CT2+T23+CT3)/TL<0.32$. Therefore, it is favorable for balancing the space arrangement of the front three lens elements so as to achieve compactness of the lens. Moreover, the following condition can also be satisfied: $0.18<(CT1+T12+CT2+T23+CT3)/TL<0.30$.

According to the present disclosure, the photographing optical lens assembly can further include an aperture stop. When an axial distance between the aperture stop and the image-side surface of the fifth lens element is SD, and the axial distance between the object-side surface of the first lens element and the image-side surface of the fifth lens element is TD, the following condition can be satisfied: $0.35<SD/TD<0.95$. Therefore, it is favorable for controlling the position of the aperture stop so as to maintain a small opening at the object side of the photographing optical lens assembly. Moreover, the following condition can also be satisfied: $0.45<SD/TD<0.93$.

When a focal length of the third lens element is f3, and the focal length of the fourth lens element is f4, the following condition can be satisfied: $-0.45<f3/f4<3.0$. Therefore, it is favorable for adjusting the refractive power distribution of lens elements, thereby correcting aberrations and adjusting the field of view. Moreover, the following condition can also be satisfied: $-0.25<f3/f4<2.5$.

When the central thickness of the second lens element is CT2, and the central thickness of the fourth lens element is CT4, the following condition can be satisfied: $0.1<CT4/CT2<1.2$. Therefore, it is favorable for balancing the central thicknesses proportion of the second lens element and the fourth lens element so as to control the size of the photographing optical lens assembly. Moreover, the following condition can also be satisfied: $0.2<CT4/CT2<1.1$.

When a minimum value among Abbe numbers of all lens elements of the photographing optical lens assembly is Vmin, the following condition can be satisfied: $Vmin<20$. Therefore, it is favorable for adjusting the material distribution of the lens elements so as to correct chromatic aberration. Moreover, the following condition can also be satisfied: $10<Vmin<19.5$.

Figure 31:
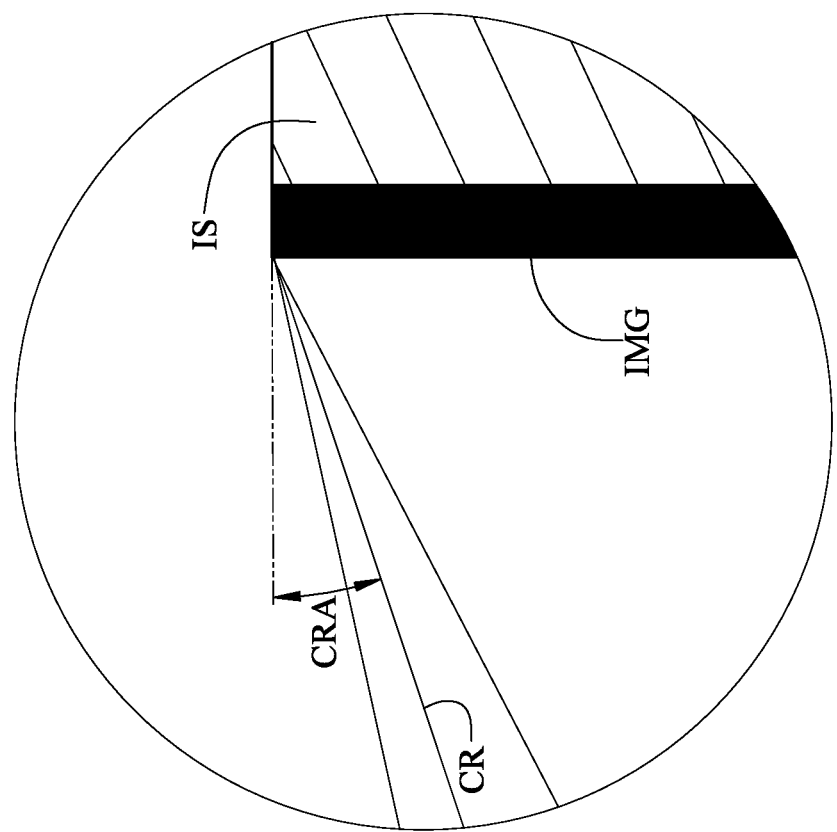
FIG. 31 shows a schematic view of CRA according to the 1st embodiment of the present disclosure.

When a chief ray angle at a maximum image height position of the photographing optical lens assembly is CRA, the following condition can be satisfied: $0.25<\tan(CRA)<0.45$. Therefore, it is favorable for controlling the light incident angle onto the image surface, such that a relatively large image sensor can be arranged to improve image quality. Moreover, the following condition can also be satisfied: $0.28<\tan(CRA)<0.4$. Please refer to FIG. 31, which shows a schematic view of CRA according to the 1st embodiment of the present disclosure, wherein a chief ray CR is projected on the image surface IMG at the maximum image height, and the angle between a normal line of the image surface IMG and the chief ray CR is the chief ray angle CRA.

When the axial distance between the first lens element and the second lens element is T12, and the central thickness of the second lens element is CT2, the following condition can be satisfied: $0<T12/CT2<0.9$. Therefore, it is favorable for balancing the central thickness of the second lens element and the lens interval between the first lens element and the second lens element so as to reduce the size of the lens element. Moreover, the following condition can also be satisfied: $0.01<T12/CT2<0.7$.

When a curvature radius of an object-side surface of the second lens element is R3, and a curvature radius of an image-side surface of the second lens element is R4, the following condition can be satisfied: $-10.0<(R3-R4)/(R3+R4)<1.4$. Therefore, it is favorable for adjusting the lens shape and the refractive power of the second lens element, thereby reducing distortion of aberrations. Moreover, the following condition can also be satisfied: $-5.0<(R3-R4)/(R3+R4)<1.0$. Moreover, the following condition can also be satisfied: $-2.5<(R3-R4)/(R3+R4)<0.95$.

When the axial distance between the second lens element and the third lens element is T23, the axial distance between the third lens element and the fourth lens element is T34, and an axial distance between the fourth lens element and the fifth lens element is T45, the following condition can be satisfied: $2.5<(T34+T45)/T23<20.0$. Therefore, it is favorable for balancing lens intervals between lens elements so as to facilitate lens assembly and improve yield rate. Moreover, the following condition can also be satisfied: $3.2<(T34+T45)/T23<15.0$.

When a maximum effective radius of the object-side surface of the first lens element is Y1R1, and a maximum effective radius of the image-side surface of the fifth lens element is Y5R2, the following condition can be satisfied: $0.5<Y5R2/Y1R1<1.0$. Therefore, it is favorable for controlling the size of light beam so as to prevent affecting compactness of the lens due to an overly large effective radius of single lens element. Moreover, the following condition can also be satisfied: $0.6<Y5R2/Y1R1<0.95$. Moreover, the following condition can also be satisfied: $0.75<Y5R2/Y1R1<0.9$. Please refer to FIG. 30, which shows a schematic view of Y1R1 and Y5R2 according to the 1st embodiment of the present disclosure.

When a maximum effective radius of the image-side surface of the third lens element is Y3R2, and a maximum effective radius of the object-side surface of the fourth lens element is Y4R1, the following condition can be satisfied: $0.8<Y3R2/Y4R1<1.5$. Therefore, it is favorable for reducing the size of light beam at the middle of the photographing optical lens assembly, thereby miniaturizing the lens. Moreover, the following condition can also be satisfied: $0.85<Y3R2/Y4R1<1.3$. Moreover, the following condition can also be satisfied: $0.9<Y3R2/Y4R1<1.2$. Please refer to FIG. 30, which shows a schematic view of Y3R2 and Y4R1 according to the 1st embodiment of the present disclosure.

When the central thickness of the third lens element is CT3, and the axial distance between the third lens element and the fourth lens element is T34, the following condition can be satisfied: $CT3/T34<5.0$. Therefore, it is favorable for having sufficient space between the third lens element and the fourth lens element so as to achieve diversity application design. Moreover, the following condition can also be satisfied: $0.01<CT3/T34<3.0$. Moreover, the following condition can also be satisfied: $0.1<CT3/T34<2.0$.

When an Abbe number of the first lens element is V1, the Abbe number of the second lens element is V2, the Abbe number of the third lens element is V3, the Abbe number of the fourth lens element is V4, an Abbe number of the fifth lens element is V5, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, and a refractive index of the i-th lens element is Ni, at least one lens element of the photographing optical lens assembly can satisfy the following condition: 5.0<Vi/Ni<12.0, wherein i=1, 2, 3, 4, or 5. Therefore, it is favorable for correcting chromatic aberration of the photographing optical lens assembly.

According to the present disclosure, the aforementioned features and conditions can be utilized in numerous combinations so as to achieve corresponding effects.

According to the present disclosure, the lens elements of the photographing optical lens assembly can be made of either glass or plastic material. When the lens elements are made of glass material, the refractive power distribution of the photographing optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing optical lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the photographing optical lens assembly, based on the corresponding image sensor, can be flat or curved, especially a curved surface being concave facing towards the object side of the photographing optical lens assembly.

According to the present disclosure, an image correction unit, such as a field flattener, can be optionally disposed between the lens element closest to the image side of the photographing optical lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 32:
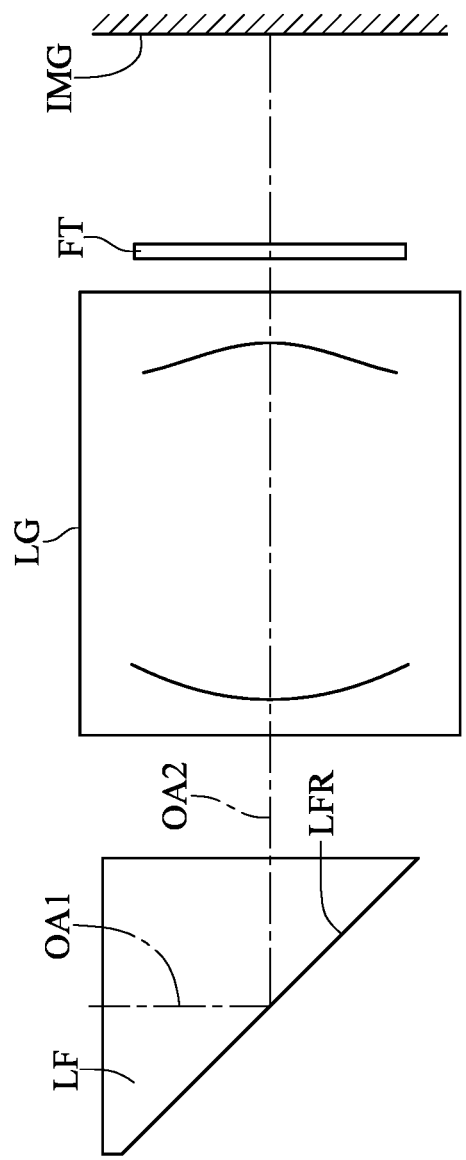
FIG. 32 shows a schematic view of a configuration of a reflective element in a photographing optical lens assembly according to one embodiment of the present disclosure.
Figure 33:
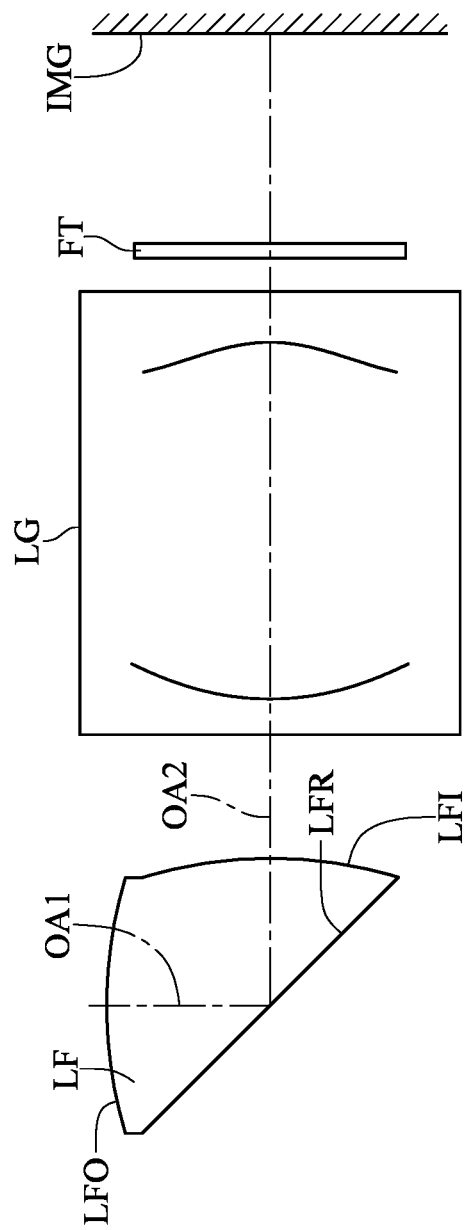
FIG. 33 shows a schematic view of another configuration of a reflective element in a photographing optical lens assembly according to one embodiment of the present disclosure.
Figure 34:
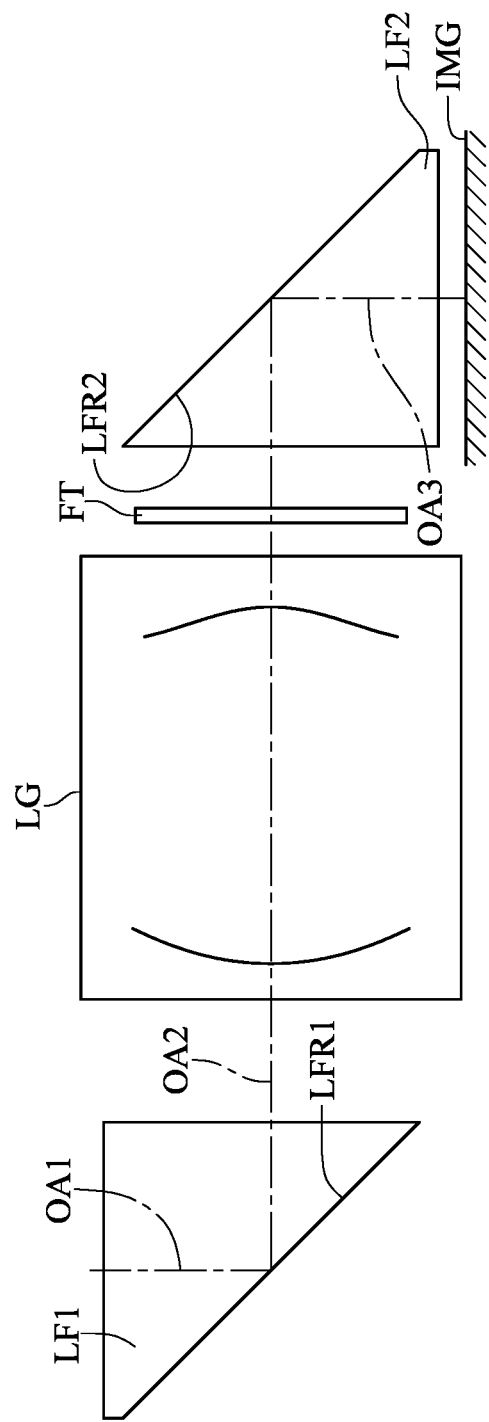
FIG. 34 shows a schematic view of a configuration of two reflective elements in a photographing optical lens assembly according to one embodiment of the present disclosure.
Figure 35:
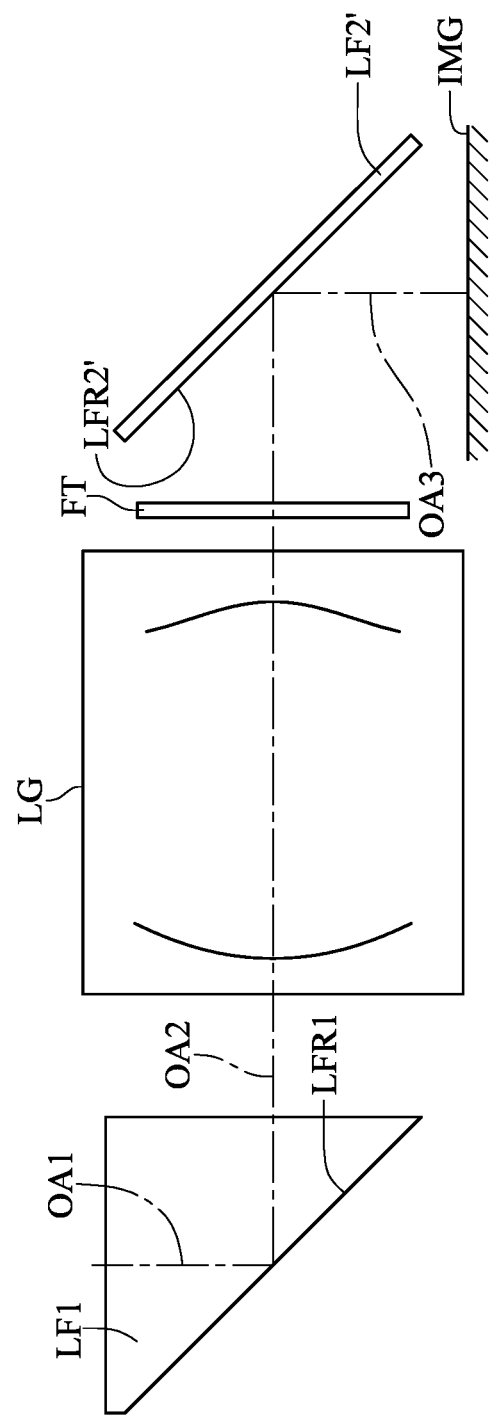
FIG. 35 shows a schematic view of another configuration of two reflective elements in a photographing optical lens assembly according to one embodiment of the present disclosure.
Figure 36:
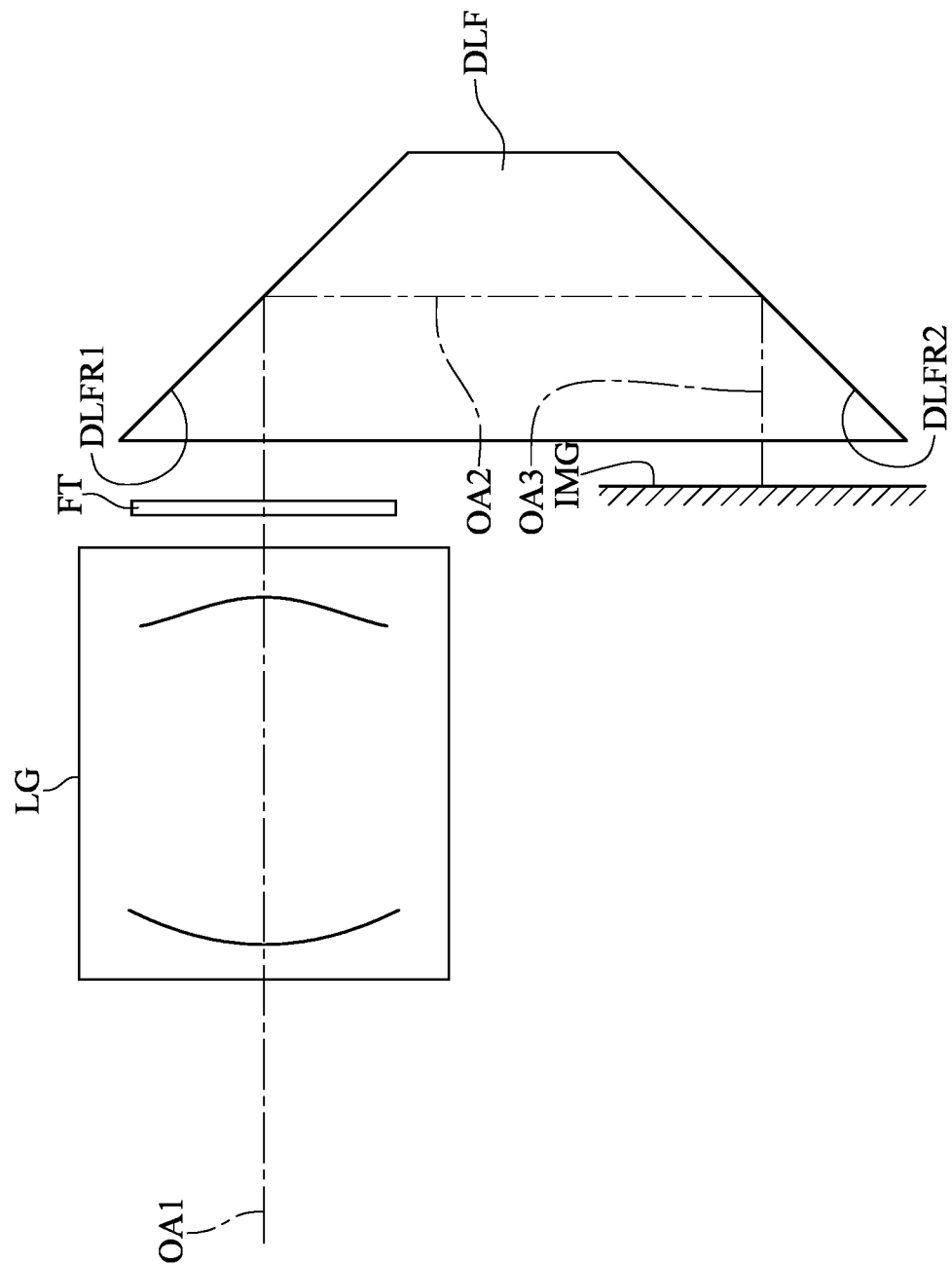
FIG. 36 shows a schematic view of still another configuration of a reflective element in a photographing optical lens assembly according to one embodiment of the present disclosure.

According to the present disclosure, at least one reflective element with an optical path folding function, such as, but not limited to, a prism or a mirror, can be optionally disposed between an imaged object and the image surface on the imaging optical path, such that the photographing optical lens assembly can have a deflected light path and can be more flexible in space arrangement, and therefore the dimensions of an electronic device is not restricted by the total track length of the photographing optical lens assembly, thereby reducing mechanical limitation, miniaturizing the photographing optical lens assembly, and thus achieving various specification requirements. Moreover, the reflective element can also be located at an object side of the object-side surface of the first lens element, that is, located between an imaged object and the first lens element. Moreover, the reflective element can also be located at an image side of the image-side surface of the fifth lens element, that is, located between the fifth lens element and the image surface. Please refer to FIG. 32, which shows a schematic view of a configuration of a reflective element in a photographing optical lens assembly according to one embodiment of the present disclosure. As shown in FIG. 32, in order from an imaged object (not shown in the figures) to an image surface IMG of the photographing optical lens assembly, an optical path can enter a reflective element LF along a first optical axis OA1, deflect off a reflective surface LFR of the reflective element LF, and then pass through a lens group LG and a filter FT along a second optical axis OA2. The reflective element LF is a prism disposed between the imaged object and the lens group LG of the photographing optical lens assembly. However, the present disclosure is not limited thereto. In some other embodiments, the reflective element can also be disposed between the lens group and the image surface of the photographing optical lens assembly. Moreover, in the aspect that the reflective element is a prism, the reflective element can have an object-side surface being convex in a paraxial region thereof. Therefore, it is favorable for giving the photographing optical lens assembly additional refractive power so as to reduce the size of the photographing optical lens assembly and improve image quality while making the overall appearance to have a three-dimensional visual effect. Please refer to FIG. 33, which shows a schematic view of another configuration of a reflective element in a photographing optical lens assembly according to one embodiment of the present disclosure. As shown in FIG. 33, in order from an imaged object (not shown in the figures) to an image surface IMG of the photographing optical lens assembly, an optical path can enter a reflective element LF via an object-side surface LFO of the reflective element LF along a first optical axis OA1, deflect off a reflective surface LFR of the reflective element LF, and then pass through an image-side surface LFI of the reflective element LF, a lens group LG and a filter FT along a second optical axis OA2. The object-side surface LFO of the reflective element LF is convex towards the imaged object in a paraxial region thereof, and the image-side surface LFI of the reflective element LF is convex towards the lens group LG in a paraxial region thereof. In addition, at least two reflective elements can also be optionally disposed between an imaged object and the image surface on the imaging optical path of the photographing optical lens assembly. Please refer to FIG. 34, which shows a schematic view of a configuration of two reflective elements in a photographing optical lens assembly according to one embodiment of the present disclosure. As shown in FIG. 34, in order from an imaged object (not shown in the figures) to an image surface IMG of the photographing optical lens assembly, an optical path can enter a first reflective element LF1 along a first optical axis OA1, deflect off a reflective surface LFR1 of the first reflective element LF1, pass through a lens group LG and a filter FT along a second optical axis OA2, enter a second reflective element LF2 to deflect off a reflective surface LFR2 of the second reflective element LF2, and then extend onto the image surface IMG along a third optical axis OA3. The first reflective element LF1 is disposed between the imaged object and the lens group LG of the photographing optical lens assembly, the second reflective element LF2 is disposed between the lens group LG and the image surface IMG of the photographing optical lens assembly, and the travelling direction of light on the first optical axis OA1 can be the same direction as the travelling direction of light on the third optical axis OA3 as shown in FIG. 34. In addition, the at least two reflective elements optionally disposed between the imaged object and the image surface on the imaging optical path of the photographing optical lens assembly can be different types. Please refer to FIG. 35, which shows a schematic view of another configuration of two reflective elements in a photographing optical lens assembly according to one embodiment of the present disclosure. As shown in FIG. 35, a second reflective element LF2' of the photographing optical lens assembly is a mirror, which is different from the second reflective element LF2 as being a prism in the arrangement of FIG. 34. The optical path along a second optical axis OA2 can also deflect off a reflective surface LFR2' of the second reflective element LF2' and then extend onto the image surface IMG along a third optical axis OA3. The arrangement of FIG. 35 is similar to that of FIG. 34, and the description is not repeated herein. The photographing optical lens assembly can be optionally provided with three or more reflective elements, and the present disclosure is not limited to the type, amount and position of the reflective elements of the embodiments disclosed in the aforementioned figures. In addition, the optical path can deflect once, twice, thrice or more in a single reflective element. Please refer to FIG. 36, which shows a schematic view of still another configuration of a reflective element in a photographing optical lens assembly according to one embodiment of the present disclosure. As shown in FIG. 36, in order from an imaged object (not shown in the figures) to an image surface IMG of the photographing optical lens assembly, an optical path can pass through a lens group LG and a filter FT along a first optical axis OA1, enter a double-reflective element DLF to deflect off a first reflective surface DLFR1 of the double-reflective element DLF, extend along a second optical axis OA2 to deflect off a second reflective surface DLFR2 of the double-reflective element DLF, and then extend onto the image surface IMG along a third optical axis OA3. The double-reflective element DLF is disposed between lens group LG and the image surface IMG of the photographing optical lens assembly, and the travelling direction of light on the first optical axis OA1 can be an opposite direction from the travelling direction of light on the third optical axis OA3 as shown in FIG. 36.

According to the present disclosure, the photographing optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens assembly and thereby provides a wider field of view for the same.

According to the present disclosure, the photographing optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the photographing optical lens assembly can include one or more optical elements for limiting the form of light passing through the photographing optical lens assembly. Each optical element can be, but not limited to, a filter, a polarizer, etc., and each optical element can be, but not limited to, a single-piece element, a composite component, a thin film, etc. The optical element can be located at the object side or the image side of the photographing optical lens assembly or between any two adjacent lens elements so as to allow light in a specific form to pass through, thereby meeting application requirements.

According to the present disclosure, the photographing optical lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the above description of the present disclosure, the following specific embodiments are provided for further explanation.

1st Embodiment

Figure 1:
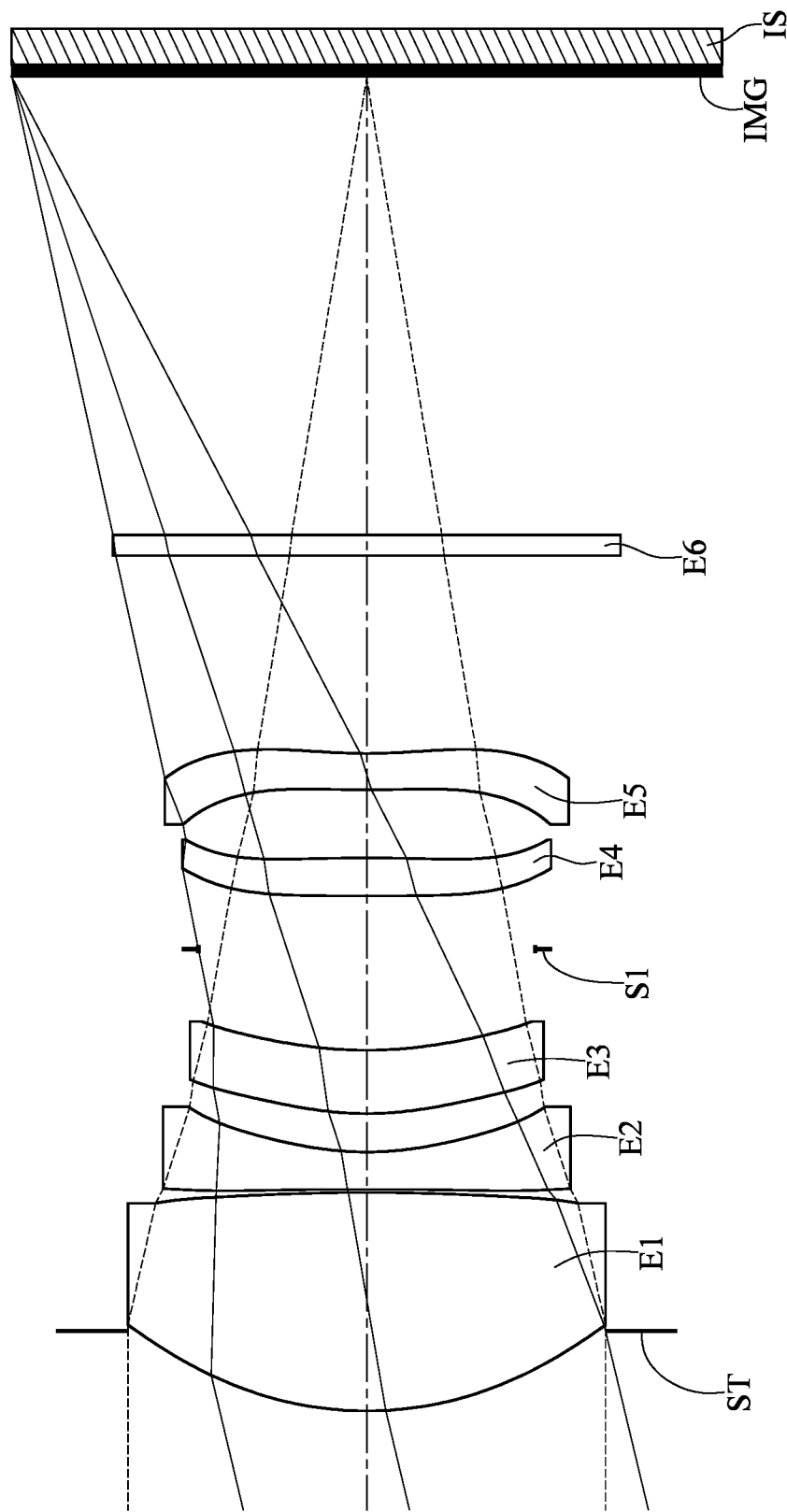
FIG. 1 is a schematic view of an image capturing unit according to the 1st embodiment of the present disclosure.
Figure 2:
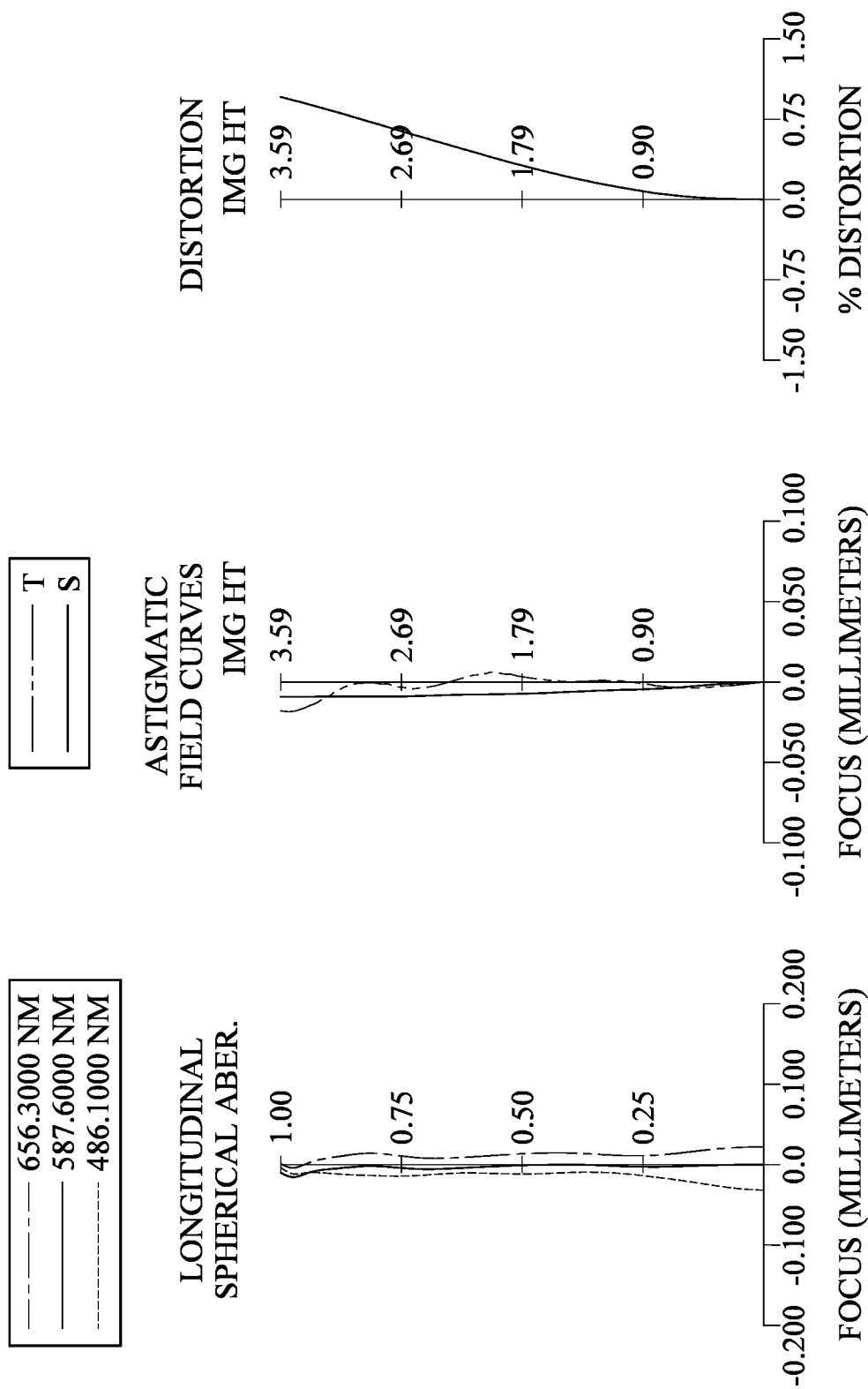
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a second lens element E2, a third lens element E3, a stop S1, a fourth lens element E4, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has two inflection points.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k)\times(Y/R)^2)) + \sum_i (Ai) \times (Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28 and 30.

In the photographing optical lens assembly of the image capturing unit 1 according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=14.93 millimeters (mm), Fno=3.09, HFOV=13.4 degrees (deg.).

When an axial distance between the object-side surface of the first lens element E1 and the image surface IMG is TL, and a maximum image height of the photographing optical lens assembly is ImgH, the following condition is satisfied: TL/ImgH=3.77.

When an axial distance between the object-side surface of the first lens element E1 and the image-side surface of the fifth lens element E5 is TD, and an axial distance between the image-side surface of the fifth lens element E5 and the image surface IMG is BL, the following condition is satisfied: TD/BL=0.97.

When an axial distance between the aperture stop ST and the image-side surface of the fifth lens element E5 is SD, and the axial distance between the object-side surface of the first lens element E1 and the image-side surface of the fifth lens element E5 is TD, the following condition is satisfied: SD/TD=0.88.

When the focal length of the photographing optical lens assembly is f, a focal length of the first lens element E1 is f1, a focal length of the second lens element E2 is f2, a focal length of the fourth lens element E4 is f4, and a focal length of the fifth lens element E5 is f5, the following condition is satisfied: (|f/f4|+|f/f5|)/(|f/f1|+|f/f2|)=0.26.

When a focal length of the third lens element E3 is f3, and the focal length of the fourth lens element E4 is f4, the following condition is satisfied: f3/f4=0.86.

When the focal length of the second lens element E2 is f2, and a central thickness of the second lens element E2 is CT2, the following condition is satisfied: |f2|/CT2=13.47.

When a curvature radius of the object-side surface of the second lens element E2 is R3, and a curvature radius of the image-side surface of the second lens element E2 is R4, the following condition is satisfied: (R3−R4)/(R3+R4)=0.92.

When a curvature radius of the object-side surface of the third lens element E3 is R5, and a curvature radius of the image-side surface of the third lens element E3 is R6, the following condition is satisfied: (R5+R6)/(R5−R6)=−7.93.

When the curvature radius of the object-side surface of the third lens element E3 is R5, and a curvature radius of the object-side surface of the fourth lens element E4 is R7, the following condition is satisfied: (R5+R7)/(R5−R7)=−1.02.

When a curvature radius of the object-side surface of the fifth lens element E5 is R9, and a curvature radius of the image-side surface of the fifth lens element E5 is R10, the following condition is satisfied: (R9+R10)/(R9−R10)=2.86.

When a sum of central thicknesses of all lens elements of the photographing optical lens assembly is ΣCT, and a sum of axial distances between each of all adjacent lens elements of the photographing optical lens assembly is ΣAT, the following condition is satisfied: ΣCT/ΣAT=1.49. In this embodiment, an axial distance between two adjacent lens elements is a distance in a paraxial region between two adjacent lens surfaces of the two adjacent lens elements. In this embodiment, ΣCT is a sum of central thicknesses of the first lens element E1, the second lens element E2, the third lens element E3, the fourth lens element E4, and the fifth lens element E5. In this embodiment, ΣAT is a sum of axial distances between the first lens element E1 and the second lens element E2, the second lens element E2 and the third lens element E3, the third lens element E3 and the fourth lens element E4, and the fourth lens element E4 and the fifth lens element E5.

When a central thickness of the first lens element E1 is CT1, the central thickness of the second lens element E2 is CT2, a central thickness of the fourth lens element E4 is CT4, and a central thickness of the fifth lens element E5 is CT5, the following condition is satisfied: (CT1+CT2)/(CT4+CT5)=3.44.

When the central thickness of the first lens element E1 is CT1, the central thickness of the second lens element E2 is CT2, a central thickness of the third lens element E3 is CT3, an axial distance between the first lens element E1 and the second lens element E2 is T12, an axial distance between the second lens element E2 and the third lens element E3 is T23, and the axial distance between the object-side surface of the first lens element E1 and the image surface IMG is TL, the following condition is satisfied:
(CT1+T12+CT2+T23+CT3)/TL=0.27.

When the central thickness of the first lens element E1 is CT1, and the central thickness of the third lens element E3 is CT3, the following condition is satisfied: CT3/CT1=0.29.

When the central thickness of the third lens element E3 is CT3, and an axial distance between the third lens element E3 and the fourth lens element E4 is T34, the following condition is satisfied: CT3/T34=0.41.

When the central thickness of the second lens element E2 is CT2, and the central thickness of the fourth lens element E4 is CT4, the following condition is satisfied: CT4/CT2=1.01.

When the central thickness of the fourth lens element E4 is CT4, and the axial distance between the third lens element E3 and the fourth lens element E4 is T34, the following condition is satisfied: CT4/T34=0.25.

When the axial distance between the second lens element E2 and the third lens element E3 is T23, the axial distance between the third lens element E3 and the fourth lens element E4 is T34, and an axial distance between the fourth lens element E4 and the fifth lens element E5 is T45, the following condition is satisfied: (T34+T45)/T23=5.78.

When the axial distance between the first lens element E1 and the second lens element E2 is T12, and the central thickness of the second lens element E2 is CT2, the following condition is satisfied: T12/CT2=0.08.

When an Abbe number of the second lens element E2 is V2, an Abbe number of the third lens element E3 is V3, and an Abbe number of the fourth lens element E4 is V4, the following condition is satisfied: V2+V3+V4=69.6.

When an Abbe number of the first lens element E1 is V1, the Abbe number of the second lens element E2 is V2, the Abbe number of the third lens element E3 is V3, the Abbe number of the fourth lens element E4 is V4, an Abbe number of the fifth lens element E5 is V5, a refractive index of the first lens element E1 is N1, a refractive index of the second lens element E2 is N2, a refractive index of the third lens element E3 is N3, a refractive index of the fourth lens element E4 is N4, and a refractive index of the fifth lens element E5 is N5, the following conditions are satisfied: V1/N1=36.3; V2/N2=15.9; V3/N3=15.9; V4/N4=10.9; and V5/N5=36.3.

When a minimum value among Abbe numbers of all lens elements of the photographing optical lens assembly is Vmin, the following condition is satisfied: Vmin=18.4. In this embodiment, among the first lens element E1 through the fifth lens element E5, the Abbe number of the fourth lens element E4 is smaller than Abbe numbers of the other lens elements of the photographing optical lens assembly, and Vmin is equal to the Abbe number of the fourth lens element E4.

When a maximum effective radius of the object-side surface of the first lens element E1 is Y1R1, and a maximum effective radius of the image-side surface of the fifth lens element E5 is Y5R2, the following condition is satisfied: Y5R2/Y1R1=0.84.

When a maximum effective radius of the image-side surface of the third lens element E3 is Y3R2, and a maximum effective radius of the object-side surface of the fourth lens element E4 is Y4R1, the following condition is satisfied: Y3R2/Y4R1=0.94.

When a chief ray angle at a maximum image height position of the photographing optical lens assembly is CRA, the following condition is satisfied: tan(CRA)=0.33.

The detailed optical data of the 1st embodiment are shown in Table 1A and the aspheric surface data are shown in Table 1B below.

TABLE 1A

1st Embodiment
f = 14.93 mm, Fno = 3.09, HFOV = 13.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.809 | | | | |
| 2 | Lens 1 | 3.5392 | (ASP) | 2.209 | Plastic | 1.545 | 56.1 | 5.90 |

TABLE 1A-continued

1st Embodiment
f = 14.93 mm, Fno = 3.09, HFOV = 13.4 deg.

| Surface # | | Curvature Radius | | Thickness | Material | Index | Abbe # | Focal Length |
|---|---|---|---|---|---|---|---|---|
| 3 | | −27.2834 | (ASP) | 0.030 | | | | |
| 4 | Lens 2 | 68.8716 | (ASP) | 0.379 | Plastic | 1.614 | 25.6 | −5.11 |
| 5 | | 2.9931 | (ASP) | 0.389 | | | | |
| 6 | Lens 3 | 3.3041 | (ASP) | 0.641 | Plastic | 1.614 | 25.6 | 19.12 |
| 7 | | 4.2581 | (ASP) | 1.023 | | | | |
| 8 | Stop | Plano | | 0.538 | | | | |
| 9 | Lens 4 | 303.0115 | (ASP) | 0.384 | Plastic | 1.686 | 18.4 | 22.28 |
| 10 | | −16.0921 | (ASP) | 0.688 | | | | |
| 11 | Lens 5 | 11.0357 | (ASP) | 0.368 | Plastic | 1.544 | 56.0 | −19.32 |
| 12 | | 5.3204 | (ASP) | 2.000 | | | | |
| 13 | Filter | Plano | | 0.210 | Glass | 1.517 | 64.2 | — |
| 14 | | Plano | | 4.639 | | | | |
| 15 | Image | Plano | | — | | | | |

Note:
Reference wavelength is 587.6 nm (d-line).
An effective radius of the stop S1 (Surface 8) is 1.700 mm.

TABLE 1B

Aspheric Coefficients

| Surface # | 2 | 3 | 4 | 5 |
|---|---|---|---|---|
| k = | 4.7541400E−01 | 3.0491600E+01 | 0.0000000E+00 | −1.5476900E+00 |
| A4 = | −2.1488445E−03 | −3.4157526E−02 | −5.7692941E−02 | −4.7559279E−02 |
| A6 = | −2.4527903E−04 | 7.8495473E−02 | 1.0123044E−01 | 4.2898786E−02 |
| A8 = | −5.5844693E−05 | −8.4923464E−02 | −9.9659007E−02 | −3.0115289E−02 |
| A10 = | 9.8813396E−05 | 5.1714800E−02 | 5.7531995E−02 | 1.3898055E−02 |
| A12 = | −1.0498217E−04 | −1.8302169E−02 | −1.8717173E−02 | −3.1457468E−03 |
| A14 = | 5.8331422E−05 | 3.4536042E−03 | 2.6395088E−03 | −5.1148114E−05 |
| A16 = | −1.9802209E−05 | −1.4238371E−04 | 3.0996504E−04 | 2.0535572E−04 |
| A18 = | 4.2397033E−06 | −8.4243684E−05 | −2.0389269E−04 | −4.3095936E−05 |
| A20 = | −5.6223692E−07 | 2.0185290E−05 | 3.7823997E−05 | 2.8826411E−06 |
| A22 = | 4.2214415E−08 | −2.0383955E−06 | −3.3702246E−06 | — |
| A24 = | −1.3730122E−09 | 9.2991092E−08 | 1.2225658E−07 | — |
| A26 = | — | −1.2298976E−09 | — | — |

| Surface # | 6 | 7 | 9 | 10 |
|---|---|---|---|---|
| k = | −4.7164200E+00 | −1.0731800E+01 | −9.0000000E+01 | 6.3782400E+01 |
| A4 = | −1.6628288E−02 | 5.1582782E−03 | 1.7115636E−02 | 1.5996899E−02 |
| A6 = | 4.4808034E−03 | −3.0920063E−03 | −1.4239505E−04 | 6.3573902E−03 |
| A8 = | −1.3951241E−03 | 1.4797719E−03 | 4.3167390E−03 | −5.1971221E−03 |
| A10 = | 5.0602777E−04 | 3.4799741E−04 | −2.1247160E−03 | 1.0483848E−02 |
| A12 = | −1.7490595E−04 | −7.6634288E−04 | −7.8216529E−04 | −1.0990843E−02 |
| A14 = | 1.0165094E−04 | 4.2217359E−04 | 1.2015894E−03 | 6.2337188E−03 |
| A16 = | −2.4772611E−05 | −9.8819061E−05 | −5.0916020E−04 | −1.9897371E−03 |

TABLE 1B-continued

Aspheric Coefficients

| A18 = | 1.7577988E−06 | 8.2378385E−06 | 9.8909547E−05 | 3.3871718E−04 |
| A20 = | — | — | −7.5449021E−06 | −2.4007310E−05 |

| Surface # | 11 | 12 |
|---|---|---|
| k = | −8.1808800E+01 | −4.4177700E+01 |
| A4 = | −6.2354203E−02 | −3.3878838E−02 |
| A6 = | 1.8125445E−02 | 7.7888070E−04 |
| A8 = | 1.1478639E−02 | 1.2227232E−03 |
| A10 = | −8.1845647E−02 | 2.0152803E−03 |
| A12 = | 1.9238886E−01 | −3.1003940E−03 |
| A14 = | −2.7541538E−01 | 1.8390316E−03 |
| A16 = | 2.6615863E−01 | −6.0985024E−04 |
| A18 = | −1.8082327E−01 | 1.1916045E−04 |
| A20 = | 8.7560157E−02 | −1.2911863E−05 |
| A22 = | −3.0081492E−02 | 6.0203629E−07 |
| A24 = | 7.1636096E−03 | — |
| A26 = | −1.1241147E−03 | — |
| A28 = | 1.0450841E−04 | — |
| A30 = | −4.3592049E−06 | — |

In Table 1A, the curvature radius, the thickness and the focal length are shown in millimeters (mm). Surface numbers 0-15 represent the surfaces sequentially arranged from the object side to the image side along the optical axis. In Table 1B, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
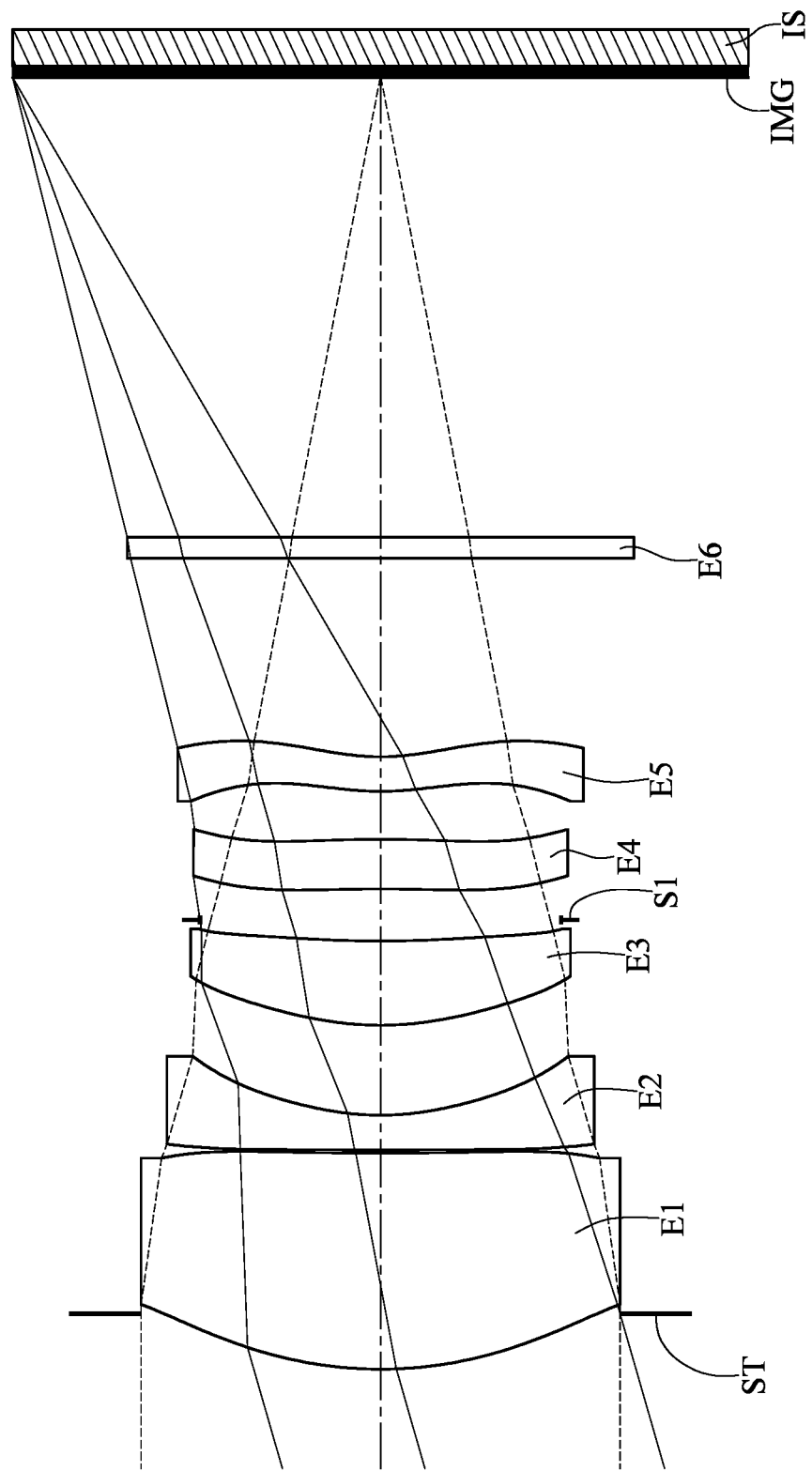
FIG. 3 is a schematic view of an image capturing unit according to the 2nd embodiment of the present disclosure.
Figure 4:
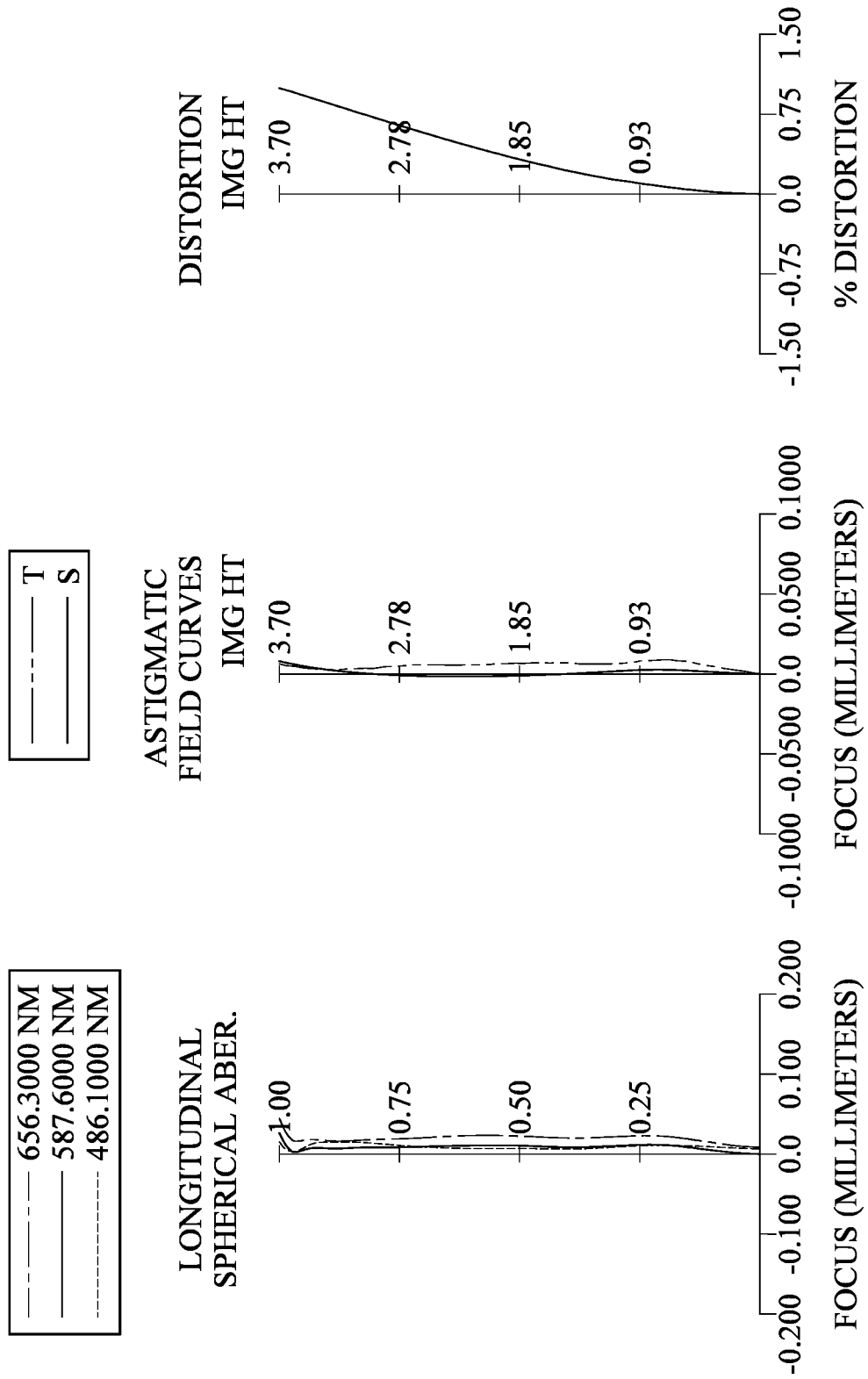
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the photographing optical lens assembly (its reference numeral is omitted)

of the present disclosure and an image sensor IS. The photographing optical lens assembly includes, in order from an object side to an image side along an optical axis, an aperture stop ST, a first lens element E1, a second lens element E2, a third lens element E3, a stop S1, a fourth lens element E4, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has one inflection point. The image-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 2nd embodiment are shown in Table 2A and the aspheric surface data are shown in Table 2B below.

TABLE 2A

2nd Embodiment
f = 12.76 mm, Fno = 2.65, HFOV = 16.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.560 |  |  |  |  |
| 2 | Lens 1 | 4.0692 | (ASP) | 2.176 | Glass | 1.620 | 60.4 | 6.96 |
| 3 |  | 55.5556 | (ASP) | 0.030 |  |  |  |  |
| 4 | Lens 2 | 25.2693 | (ASP) | 0.351 | Plastic | 1.587 | 28.3 | −5.06 |
| 5 |  | 2.6428 | (ASP) | 0.906 |  |  |  |  |
| 6 | Lens 3 | 3.2182 | (ASP) | 0.848 | Plastic | 1.566 | 37.4 | 7.71 |
| 7 |  | 11.0764 | (ASP) | 0.213 |  |  |  |  |
| 8 | Stop | Plano |  | 0.311 |  |  |  |  |
| 9 | Lens 4 | −15.1286 | (ASP) | 0.500 | Plastic | 1.669 | 19.5 | 122.90 |
| 10 |  | −12.9470 | (ASP) | 0.483 |  |  |  |  |
| 11 | Lens 5 | 2.8171 | (ASP) | 0.347 | Plastic | 1.566 | 37.4 | −24.60 |
| 12 |  | 2.2387 | (ASP) | 2.000 |  |  |  |  |
| 13 | Filter | Plano |  | 0.210 | Glass | 1.517 | 64.2 | — |
| 14 |  | Plano |  | 4.631 |  |  |  |  |
| 15 | Image | Plano |  | — |  |  |  |  |

Note:
Reference wavelength is 587.6 nm (d-line).
An effective radius of the stop S1 (Surface 8) is 1.815 mm.

TABLE 2B

Aspheric Coefficients

| Surface # | 2 | 3 | 4 | 5 |
|---|---|---|---|---|
| k = | 4.6860100E−01 | −9.0000000E+01 | 1.2985900E+01 | −1.3526700E+00 |
| A4 = | −2.1350842E−03 | 1.8194200E−02 | −1.5188223E−02 | −4.9298618E−02 |
| A6 = | −2.8163226E−04 | −5.0239687E−02 | −2.9709342E−02 | 3.0955784E−02 |
| A8 = | −1.0657622E−04 | 6.8808111E−02 | 7.1284014E−02 | −6.0383624E−03 |
| A10 = | 5.6809182E−05 | −5.5537717E−02 | −6.7680720E−02 | −4.8716781E−03 |
| A12 = | −1.7518288E−05 | 2.7647848E−02 | 3.7803070E−02 | 4.9497285E−03 |
| A14 = | −5.2189120E−07 | −8.6298166E−03 | −1.3605651E−02 | −2.1046385E−03 |
| A16 = | 1.8856433E−06 | 1.6003826E−03 | 3.2388897E−03 | 4.9671727E−04 |
| A18 = | −5.8688179E−07 | −1.2995723E−04 | −5.0627648E−04 | −6.3517386E−05 |
| A20 = | 8.7728450E−08 | −1.0135648E−05 | 4.9879998E−05 | 3.4443715E−06 |

TABLE 2B-continued

Aspheric Coefficients

| | | | |
|---|---|---|---|
| A22 = | −6.6560178E−09 | 3.5596429E−06 | −2.8053074E−06 | — |
| A24 = | 2.0545309E−10 | −3.3480307E−07 | 6.8750579E−08 | — |
| A26 = | — | 1.1520766E−08 | — | — |

| Surface # | 6 | 7 | 9 | 10 |
|---|---|---|---|---|
| k = | −2.7972400E+00 | −6.6644200E+01 | 3.8938100E+01 | 3.7717500E+01 |
| A4 = | −7.9445990E−03 | −2.8724122E−05 | 2.7953849E−02 | 7.0993664E−03 |
| A6 = | −3.3659060E−04 | −5.3567972E−03 | −3.7865563E−04 | 2.5736995E−02 |
| A8 = | 1.2787250E−03 | 2.8416038E−03 | −5.1019119E−03 | −2.5700898E−02 |
| A10 = | −3.4442733E−04 | −3.0692182E−05 | 7.1104607E−03 | 1.9877294E−02 |
| A12 = | −3.5371433E−05 | −5.9487722E−04 | −5.0666486E−03 | −1.0755624E−02 |
| A14 = | 6.5726073E−05 | 3.0544864E−04 | 2.0663822E−03 | 3.7535328E−03 |
| A16 = | −1.6684649E−05 | −6.2986495E−05 | −4.8854962E−04 | −7.9815968E−04 |
| A18 = | 1.3780568E−06 | 4.8921581E−06 | 6.2676251E−05 | 9.4045358E−05 |
| A20 = | — | — | −3.4183848E−06 | −4.7292386E−06 |

| Surface # | 11 | 12 |
|---|---|---|
| k = | −2.0228100E+01 | −9.0426100E+00 |
| A4 = | −3.3539594E−02 | −4.6087030E−02 |
| A6 = | −5.3176492E−02 | −1.6885744E−03 |
| A8 = | 1.0525525E−01 | 1.6666227E−02 |
| A10 = | −1.3341208E−01 | −1.4732348E−02 |
| A12 = | 1.3347459E−01 | 7.8442411E−03 |
| A14 = | −1.0613465E−01 | −2.8455909E−03 |
| A16 = | 6.5742105E−02 | 7.0862914E−04 |
| A18 = | −3.1126982E−02 | −1.1567937E−04 |
| A20 = | 1.1060287E−02 | 1.1098667E−05 |
| A22 = | −2.8819823E−03 | −4.7214741E−07 |
| A24 = | 5.3205737E−04 | — |
| A26 = | −6.5707211E−05 | — |
| A28 = | 4.8610478E−06 | — |
| A30 = | −1.6280802E−07 | — |

In the 2nd embodiment, the equation of the aspheric surface profiles of the aforementioned lens elements is the same as the equation of the 1st embodiment. Also, the definitions of these parameters shown in Table 2C are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Schematic Parameters

| | | | |
|---|---|---|---|
| f [mm] | 12.76 | CT3/CT1 | 0.39 |
| Fno | 2.65 | CT3/T34 | 1.62 |
| HFOV [deg.] | 16.0 | CT4/CT2 | 1.42 |
| TL/ImgH | 3.52 | CT4/T34 | 0.95 |
| TD/BL | 0.90 | (T34 + T45)/T23 | 1.11 |
| SD/TD | 0.91 | T12/CT2 | 0.09 |
| (\|f/f4\| + \|f/f5\|)/(\|f/f1\| + \|f/f2\|) | 0.14 | V2 + V3 + V4 | 85.2 |
| f3/f4 | 0.06 | V1/N1 | 37.3 |
| \|f2\|/CT2 | 14.40 | V2/N2 | 17.8 |
| (R3 − R4)/(R3 + R4) | 0.81 | V3/N3 | 23.9 |

TABLE 2C-continued

Schematic Parameters

| | | | |
|---|---|---|---|
| (R5 + R6)/(R5 − R6) | −1.82 | V4/N4 | 11.7 |
| (R5 + R7)/(R5 − R7) | −0.65 | V5/N5 | 23.9 |
| (R9 + R10)/(R9 − R10) | 8.74 | Vmin | 19.5 |
| ΣCT/ΣAT | 2.17 | Y5R2/Y1R1 | 0.85 |
| (CT1 + CT2)/(CT4 + CT5) | 2.98 | Y3R2/Y4R1 | 0.97 |
| (CT1 + T12 + CT2 + T23 + CT3)/TL | 0.33 | tan(CRA) | 0.36 |

3rd Embodiment

Figure 5:
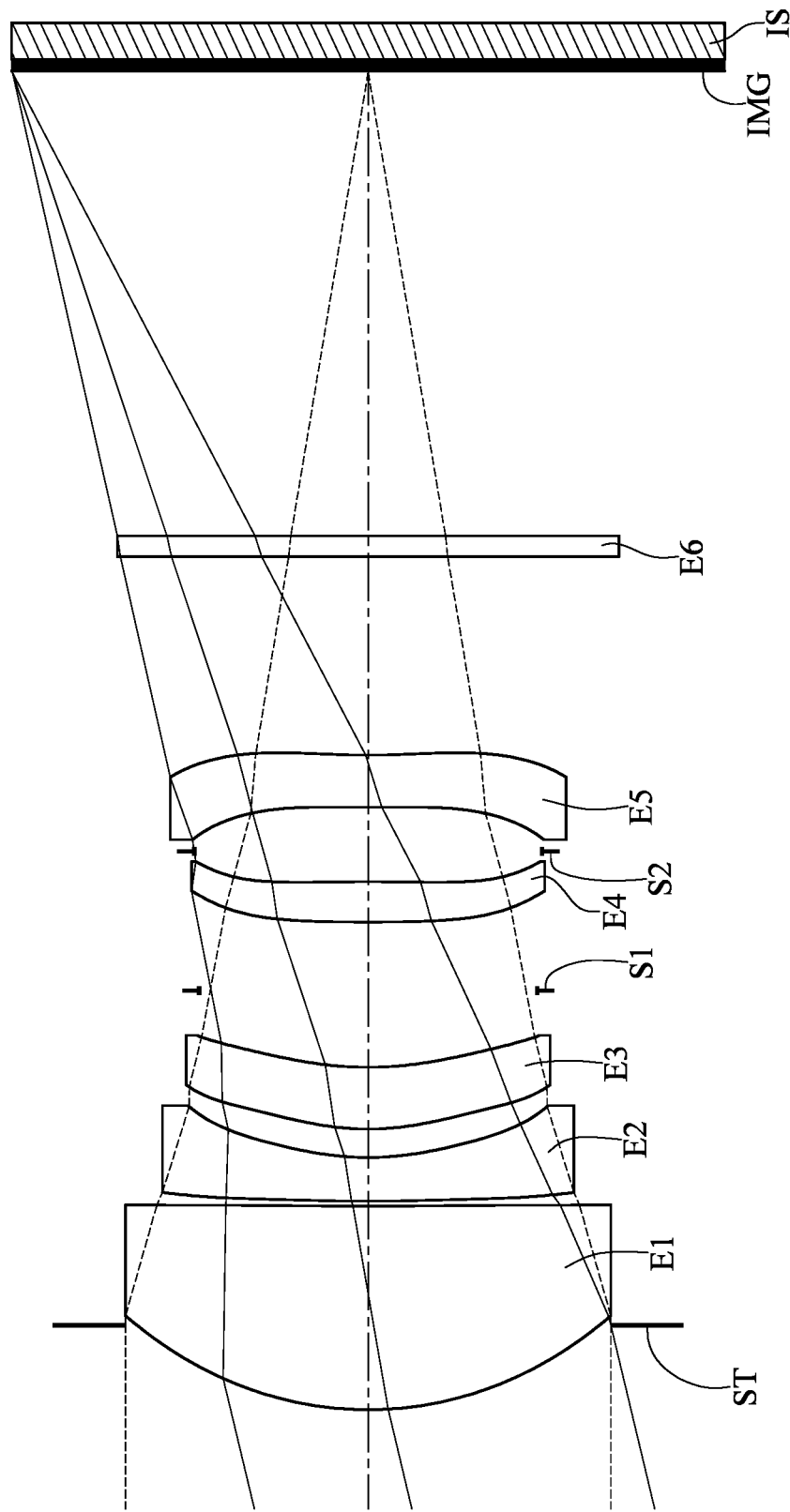
FIG. 5 is a schematic view of an image capturing unit according to the 3rd embodiment of the present disclosure.
Figure 6:
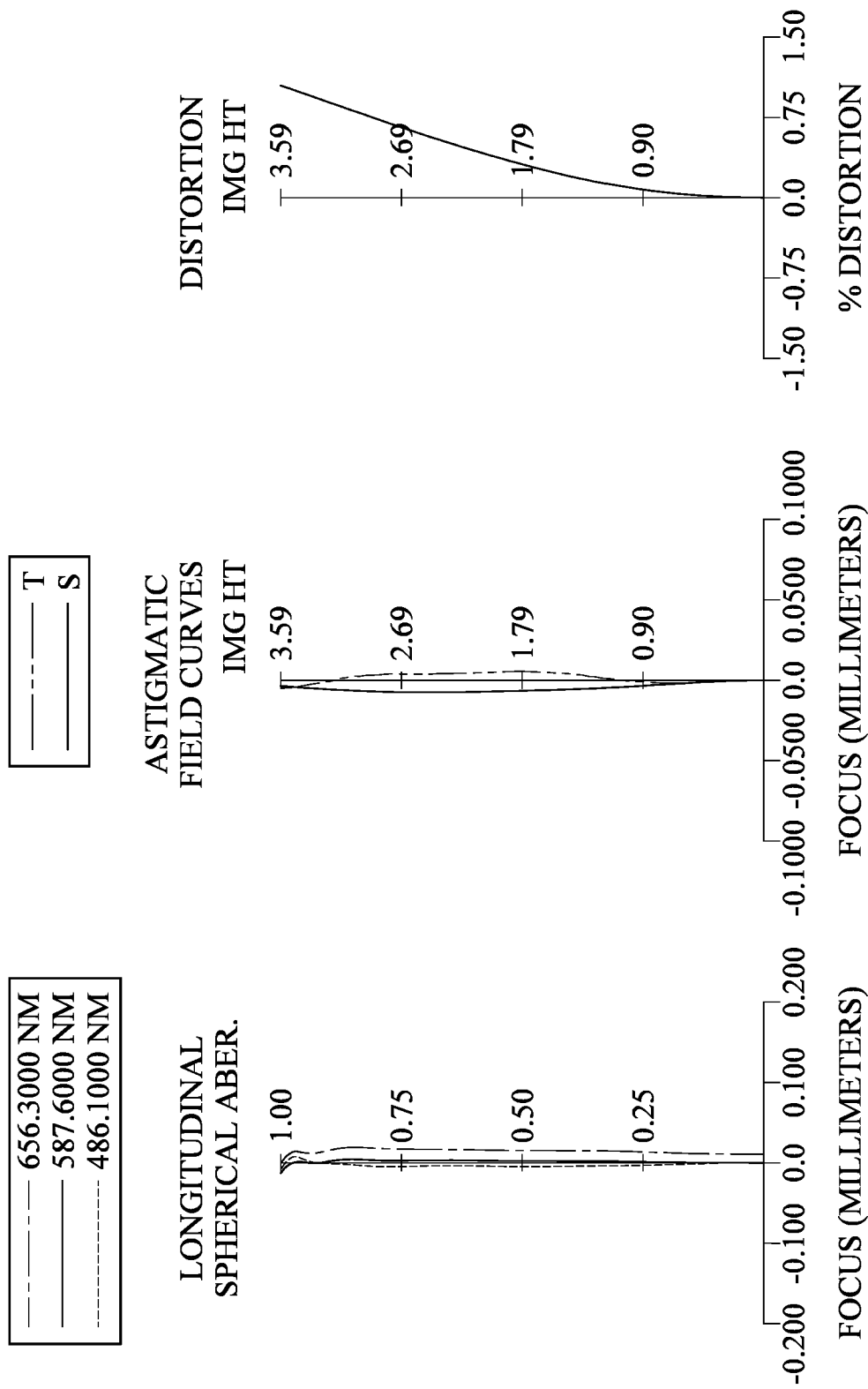
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a second lens element E2, a third lens element E3, a stop S1, a fourth lens element E4, a stop S2, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has two inflection points.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 3rd embodiment are shown in Table 3A and the aspheric surface data are shown in Table 3B below.

TABLE 3A

3rd Embodiment
f = 14.89 mm, Fno = 3.05, HFOV = 13.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.850 | | | | |
| 2 | Lens 1 | 3.5010 | (ASP) | 2.051 | Plastic | 1.545 | 56.1 | 6.71 |
| 3 | | 64.5391 | (ASP) | 0.050 | | | | |
| 4 | Lens 2 | 18.6198 | (ASP) | 0.440 | Plastic | 1.639 | 23.5 | −5.27 |
| 5 | | 2.8235 | (ASP) | 0.286 | | | | |
| 6 | Lens 3 | 2.6037 | (ASP) | 0.623 | Plastic | 1.587 | 28.3 | 14.14 |
| 7 | | 3.4574 | (ASP) | 0.773 | | | | |
| 8 | Stop | Plano | | 0.690 | | | | |
| 9 | Lens 4 | 23.9660 | (ASP) | 0.406 | Plastic | 1.669 | 19.5 | 21.08 |
| 10 | | −34.0539 | (ASP) | 0.307 | | | | |
| 11 | Stop | Plano | | 0.443 | | | | |
| 12 | Lens 5 | 23.9042 | (ASP) | 0.526 | Plastic | 1.546 | 54.0 | −20.86 |
| 13 | | 7.6539 | (ASP) | 2.000 | | | | |
| 14 | Filter | Plano | | 0.210 | Glass | 1.517 | 64.2 | — |
| 15 | | Plano | | 4.687 | | | | |
| 16 | Image | Plano | | — | | | | |

Note:
Reference wavelength is 587.6 nm (d-line).
An effective radius of the stop S1 (Surface 8) is 1.700 mm.
An effective radius of the stop S2 (Surface 11) is 1.750 mm.

TABLE 3B

Aspheric Coefficients

| Surface # | 2 | 3 | 4 | 5 |
|---|---|---|---|---|
| k = | 5.0419300E−01 | −9.0000000E+01 | 0.0000000E+00 | −1.3862600E+00 |
| A4 = | −2.0838795E−03 | 2.7995874E−03 | −8.4282381E−03 | −3.5195210E−02 |
| A6 = | −1.5454432E−04 | −8.9383109E−03 | −3.7363721E−03 | 8.2034374E−03 |
| A8 = | −5.6322829E−05 | 7.7588197E−03 | 8.0588295E−03 | 4.3314488E−03 |
| A10 = | 1.5444540E−05 | −4.1686623E−03 | −5.5162091E−03 | −4.2916807E−03 |
| A12 = | −5.4145170E−06 | 1.4676386E−03 | 2.2082457E−03 | 1.9860189E−03 |
| A14 = | 8.5934588E−07 | −3.1682476E−04 | −5.1849686E−04 | −4.6007332E−04 |
| A16 = | −7.3931720E−08 | 3.7285501E−05 | 6.4871640E−05 | 5.1242939E−05 |
| A18 = | 1.7913073E−09 | −1.8124559E−06 | −3.3189032E−06 | −2.3233947E−06 |

| Surface # | 6 | 7 | 9 | 10 |
|---|---|---|---|---|
| k = | −4.9868600E+00 | −1.2749500E+01 | 9.0000000E+01 | −5.6915200E+01 |
| A4 = | −1.0360349E−02 | 2.1770876E−02 | 1.3255948E−02 | 6.3819881E−03 |
| A6 = | −1.0384252E−02 | −2.2764626E−02 | 8.0173223E−03 | 1.3782309E−02 |
| A8 = | 6.8906595E−03 | 1.1851162E−02 | −2.5451899E−03 | −4.4498698E−03 |
| A10 = | −1.9656620E−03 | −3.9275796E−03 | 8.3471264E−04 | 1.8207713E−03 |
| A12 = | 6.1657088E−04 | 9.8771573E−04 | −2.8348328E−04 | −6.3028822E−04 |
| A14 = | −1.2263359E−04 | −1.7002926E−04 | 5.8070169E−05 | 1.2408940E−04 |
| A16 = | 9.5464146E−06 | 1.5047438E−05 | −5.6951809E−06 | −1.1936317E−05 |

| Surface # | 12 | 13 |
|---|---|---|
| k = | −9.0000000E+01 | −6.9915700E+01 |
| A4 = | −6.1642551E−02 | −3.4743901E−02 |
| A6 = | 1.7063713E−02 | 5.2573289E−03 |
| A8 = | −5.5985795E−03 | −9.0221297E−05 |
| A10 = | 1.6322175E−03 | −5.2746180E−04 |
| A12 = | −4.8967066E−04 | 1.9109266E−04 |
| A14 = | 1.0107493E−04 | −3.1435318E−05 |
| A16 = | −1.0329042E−05 | 2.0181522E−06 |

In the 3rd embodiment, the equation of the aspheric surface profiles of the aforementioned lens elements is the same as the equation of the 1st embodiment. Also, the definitions of these parameters shown in Table 3C are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

Schematic Parameters

| | | | |
|---|---|---|---|
| f [mm] | 14.89 | CT3/CT1 | 0.30 |
| Fno | 3.05 | CT3/T34 | 0.43 |
| HFOV [deg.] | 13.4 | CT4/CT2 | 0.92 |
| TL/ImgH | 3.76 | CT4/T34 | 0.28 |
| TD/BL | 0.96 | (T34 + T45)/T23 | 7.74 |
| SD/TD | 0.87 | T12/CT2 | 0.11 |
| (|f/f4| + |f/f5|)/(|f/f1| + |f/f2|) | 0.28 | V2 + V3 + V4 | 71.3 |

TABLE 3C-continued

Schematic Parameters

| | | | |
|---|---|---|---|
| f3/f4 | 0.67 | V1/N1 | 36.3 |
| \|f2\|/CT2 | 11.97 | V2/N2 | 14.3 |
| (R3 − R4)/(R3 + R4) | 0.74 | V3/N3 | 17.8 |
| (R5 + R6)/(R5 − R6) | −7.10 | V4/N4 | 11.7 |
| (R5 + R7)/(R5 − R7) | −1.24 | V5/N5 | 34.9 |
| (R9 + R10)/(R9 − R10) | 1.94 | Vmin | 19.5 |
| ΣCT/ΣAT | 1.59 | Y5R2/Y1R1 | 0.81 |
| (CT1 + CT2)/(CT4 + CT5) | 2.67 | Y3R2/Y4R1 | 0.98 |
| (CT1 + T12 + CT2 + T23 + CT3)/TL | 0.26 | tan(CRA) | 0.33 |

4th Embodiment

Figure 7:
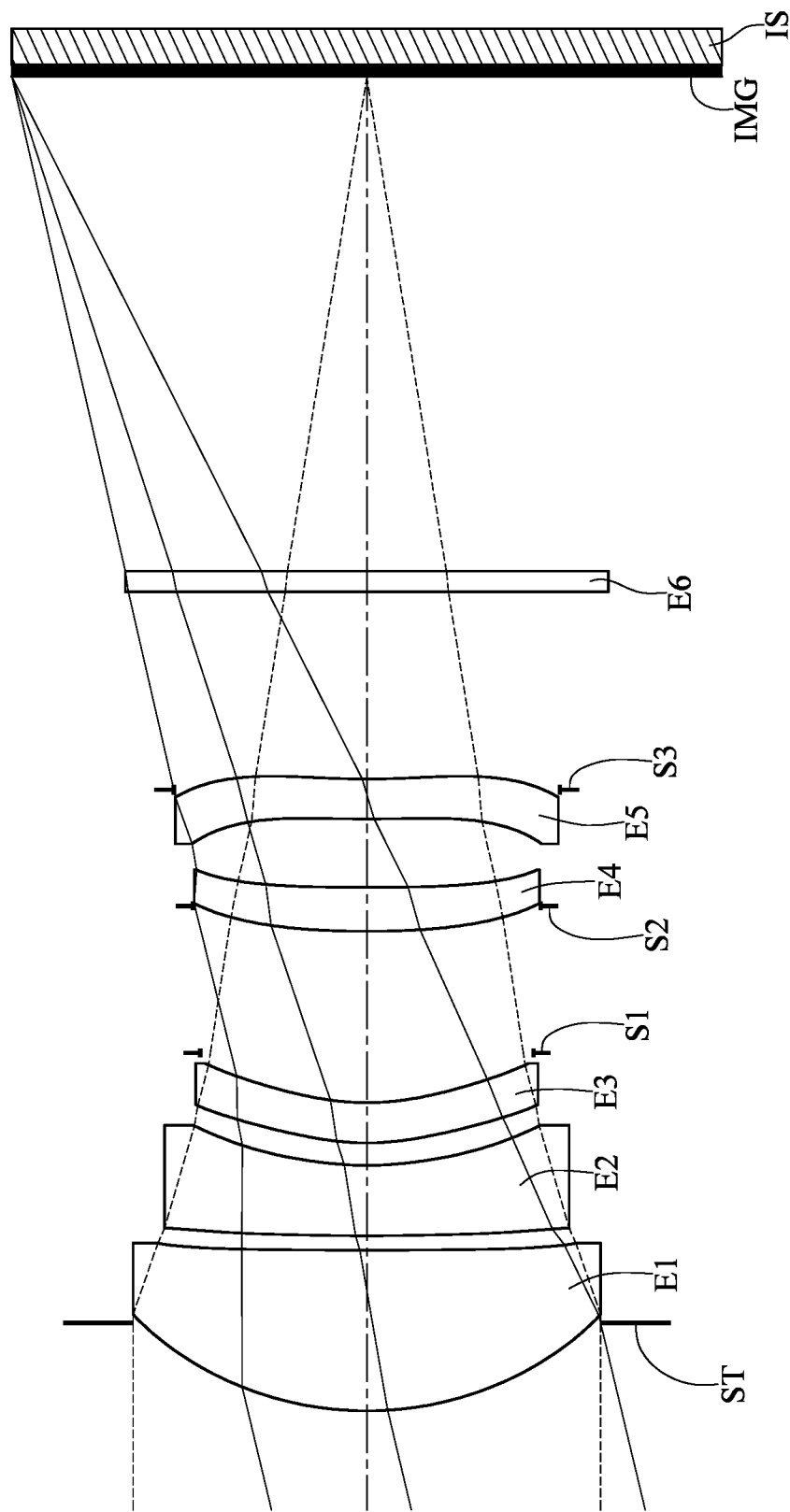
FIG. 7 is a schematic view of an image capturing unit according to the 4th embodiment of the present disclosure.
Figure 8:
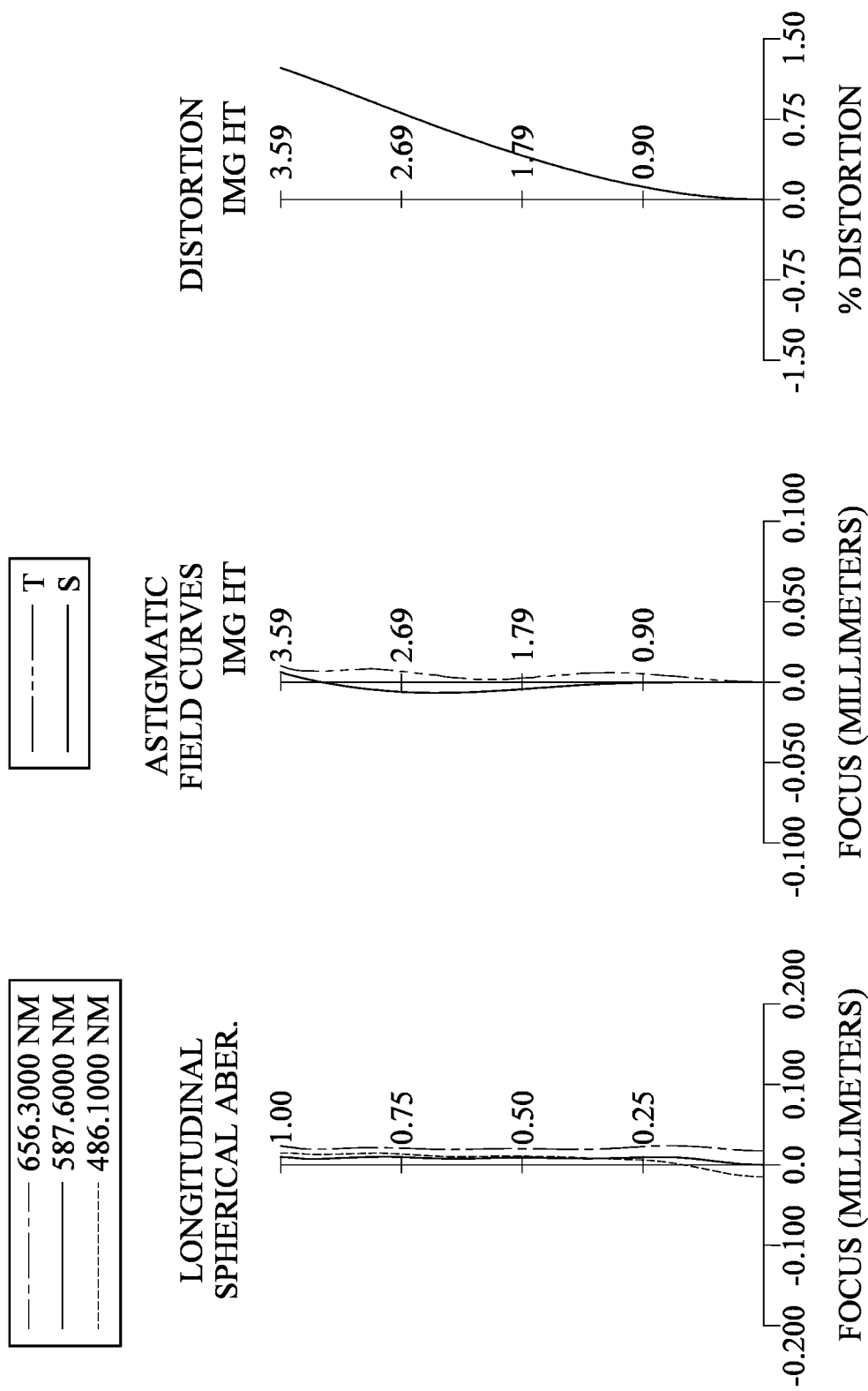
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a second lens element E2, a third lens element E3, a stop S1, a stop S2, a fourth lens element E4, a fifth lens element E5, a stop S3, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The filter E6 is made of glass material and located between the stop S3 and the image surface IMG, and will not affect the focal length of the photographing optical lens assembly. The image sensor IS is disposed on or near the image surface IMG of the photographing optical lens assembly.

The detailed optical data of the 4th embodiment are shown in Table 4A and the aspheric surface data are shown in Table 4B below.

TABLE 4A

4th Embodiment
f = 14.90 mm, Fno = 3.15, HFOV = 13.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.890 | | | | |
| 2 | Lens 1 | 3.3966 (ASP) | 1.624 | Plastic | 1.545 | 56.1 | 6.69 |
| 3 | | 41.4924 (ASP) | 0.146 | | | | |
| 4 | Lens 2 | 17.5479 (ASP) | 0.712 | Plastic | 1.639 | 23.5 | −6.22 |
| 5 | | 3.1871 (ASP) | 0.227 | | | | |
| 6 | Lens 3 | 2.4494 (ASP) | 0.408 | Plastic | 1.587 | 28.3 | 38.49 |
| 7 | | 2.5778 (ASP) | 0.503 | | | | |
| 8 | Stop | Plano | 1.485 | | | | |
| 9 | Stop | Plano | −0.255 | | | | |
| 10 | Lens 4 | 10.2182 (ASP) | 0.445 | Plastic | 1.669 | 19.5 | 19.14 |
| 11 | | 49.7249 (ASP) | 0.691 | | | | |
| 12 | Lens 5 | 16.6554 (ASP) | 0.404 | Plastic | 1.544 | 56.0 | −27.76 |
| 13 | | 7.8525 (ASP) | −0.108 | | | | |
| 14 | Stop | Plano | 2.000 | | | | |
| 15 | Filter | Plano | 0.210 | Glass | 1.517 | 64.2 | — |
| 16 | | Plano | 5.005 | | | | |
| 17 | Image | Plano | — | | | | |

Note:
Reference wavelength is 587.6 nm (d-line).
An effective radius of the stop S1 (Surface 8) is 1.683 mm.
An effective radius of the stop S2 (Surface 9) is 1.755 mm.
An effective radius of the stop S3 (Surface 14) is 1.950 mm.

TABLE 4B

Aspheric Coefficients

| Surface # | 2 | 3 | 4 | 5 |
|---|---|---|---|---|
| k = | 5.2509300E-01 | 5.0000000E+01 | 0.0000000E+00 | -1.3743400E+00 |
| A4 = | -1.5739994E-03 | -1.4285179E-02 | -3.0259891E-02 | -6.9304397E-02 |
| A6 = | -1.4454366E-04 | 1.4097218E-02 | 3.1130748E-02 | 7.0541584E-02 |
| A8 = | -1.7551594E-04 | -7.5998216E-03 | -1.7541321E-02 | -4.0014443E-02 |
| A10 = | 1.0171763E-04 | 2.6154463E-03 | 6.2880341E-03 | 1.6093898E-02 |
| A12 = | -3.5615065E-05 | -5.5143030E-04 | -1.4585536E-03 | -4.9554856E-03 |
| A14 = | 7.3217178E-06 | 6.8234454E-05 | 2.0842369E-04 | 1.0517491E-03 |
| A16 = | -8.2138988E-07 | -4.4925288E-06 | -1.6366242E-05 | -1.2127053E-04 |
| A18 = | 3.8153360E-08 | 1.2868091E-07 | 5.2784046E-07 | 4.8591599E-06 |

| Surface # | 6 | 7 | 10 | 11 |
|---|---|---|---|---|
| k = | -5.5043500E+00 | -7.6017400E+00 | -2.7134700E+00 | -9.0000000E+01 |
| A4 = | -4.5181075E-02 | 1.4860300E-02 | 2.0785784E-02 | 2.2756581E-02 |
| A6 = | 2.9386748E-02 | -2.2434145E-02 | -8.8483475E-03 | -1.0559496E-02 |
| A8 = | -5.3047885E-03 | 2.2582083E-02 | 5.6579704E-03 | 7.1225503E-03 |
| A10 = | -1.9506728E-03 | -1.2688816E-02 | -2.6378578E-03 | -3.0967188E-03 |
| A12 = | 8.7145981E-04 | 3.9260326E-03 | 8.4012303E-04 | 8.3517377E-04 |
| A14 = | -4.0410572E-05 | -5.7313983E-04 | -1.3906626E-04 | -9.4576399E-05 |
| A16 = | -1.2050711E-05 | 2.6922468E-05 | 8.7961667E-06 | 9.4096257E-07 |

| Surface # | 12 | 13 |
|---|---|---|
| k = | 0.0000000E+00 | -7.9943500E+00 |
| A4 = | -3.6245540E-02 | -3.6262646E-02 |
| A6 = | -4.8620293E-03 | -1.3218258E-04 |
| A8 = | 6.1137345E-03 | 3.9439186E-03 |
| A10 = | -2.8489592E-03 | -2.3338006E-03 |
| A12 = | 6.2790318E-04 | 6.9643348E-04 |
| A14 = | -4.4307746E-05 | -1.1001012E-04 |
| A16 = | 3.8391115E-06 | 7.0025496E-06 |

In the 4th embodiment, the equation of the aspheric surface profiles of the aforementioned lens elements is the same as the equation of the 1st embodiment. Also, the definitions of these parameters shown in Table 4C are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Schematic Parameters

| | | | |
|---|---|---|---|
| f [mm] | 14.90 | CT3/CT1 | 0.25 |
| Fno | 3.15 | CT3/T34 | 0.24 |
| HFOV [deg.] | 13.4 | CT4/CT2 | 0.63 |
| TL/ImgH | 3.76 | CT4/T34 | 0.26 |
| TD/BL | 0.90 | (T34 + T45)/T23 | 10.68 |
| SD/TD | 0.86 | T12/CT2 | 0.21 |
| (|f/f4| + |f/f5|)/(|f/f1| + |f/f2|) | 0.28 | V2 + V3 + V4 | 71.3 |
| f3/f4 | 2.01 | V1/N1 | 36.3 |
| |f2|/CT2 | 8.73 | V2/N2 | 14.3 |
| (R3 − R4)/(R3 + R4) | 0.69 | V3/N3 | 17.8 |
| (R5 + R6)/(R5 − R6) | -39.15 | V4/N4 | 11.7 |
| (R5 + R7)/(R5 − R7) | -1.63 | V5/N5 | 36.3 |
| (R9 + R10)/(R9 − R10) | 2.78 | Vmin | 19.5 |
| ΣCT/ΣAT | 1.28 | Y5R2/Y1R1 | 0.82 |
| (CT1 + CT2)/(CT4 + CT5) | 2.75 | Y3R2/Y4R1 | 0.96 |
| (CT1 + T12 + CT2 + T23 + CT3)/TL | 0.23 | tan(CRA) | 0.32 |

5th Embodiment

Figure 9:
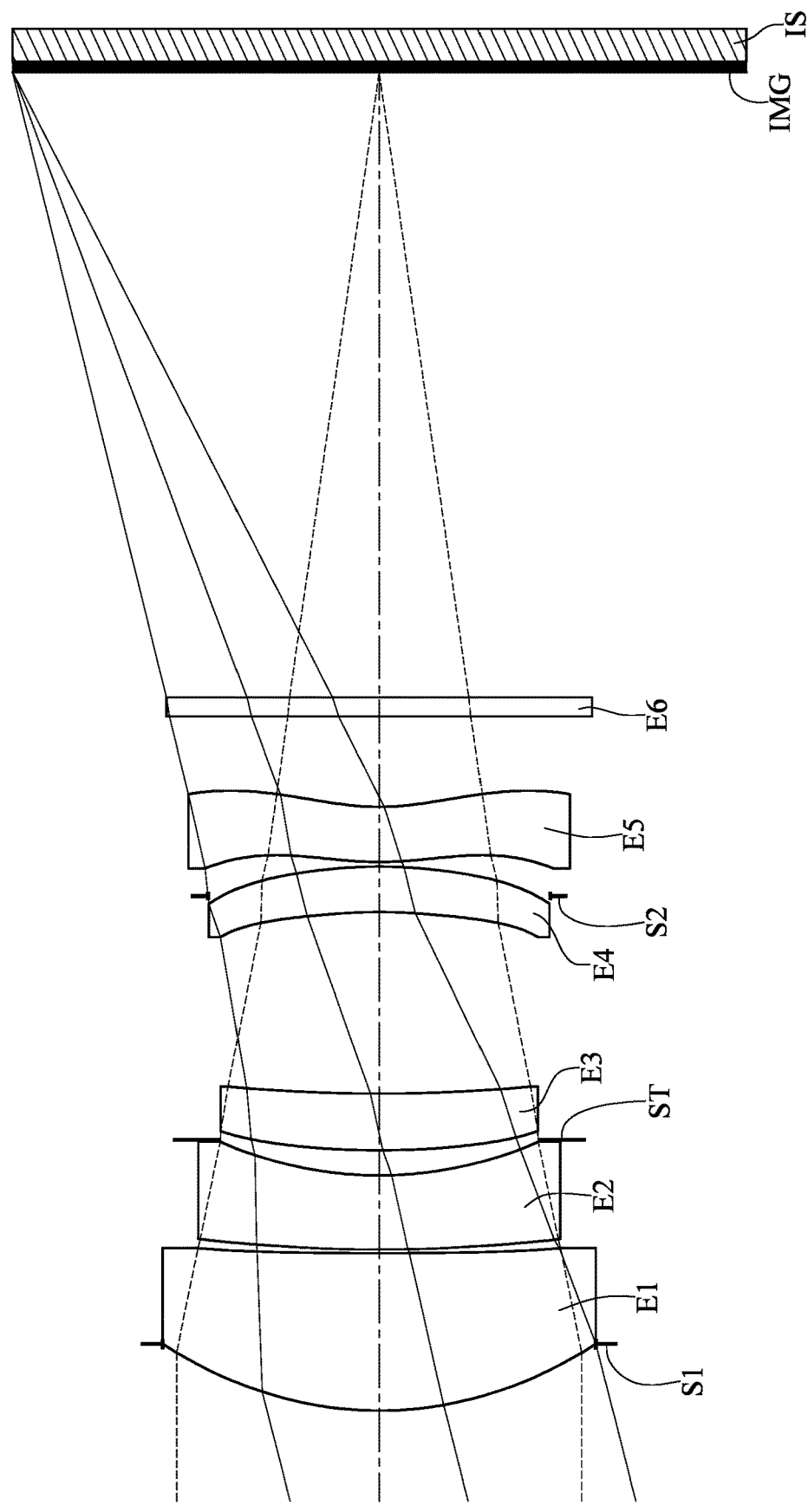
FIG. 9 is a schematic view of an image capturing unit according to the 5th embodiment of the present disclosure.
Figure 10:
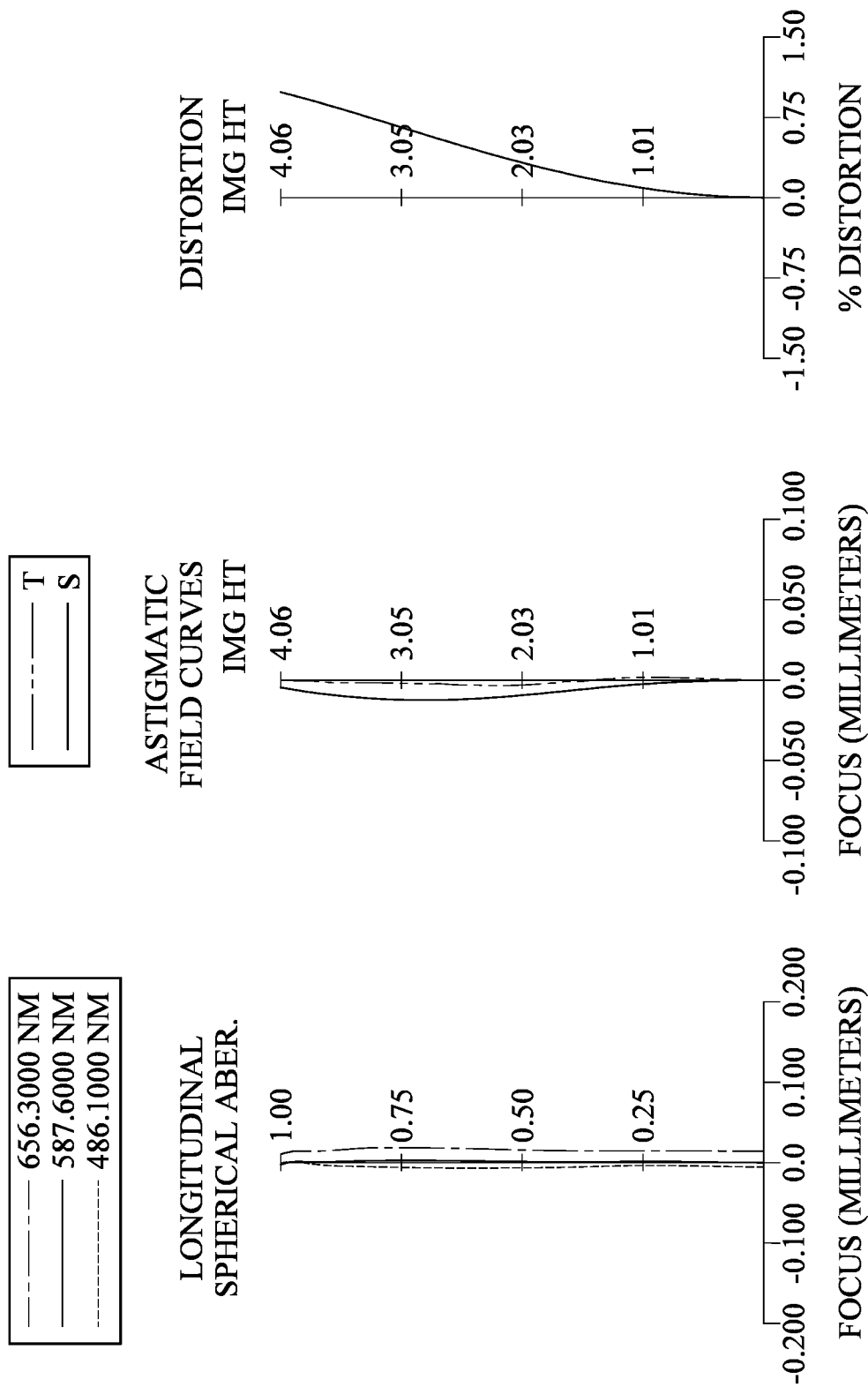
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the photographing optical lens assembly (its reference numeral is omitted) of the present disclosure and an image sensor IS. The photographing optical lens assembly includes, in order from an object side to an image side along an optical axis, a stop S1, a first lens element E1, a second lens element E2, an aperture stop ST, a third lens element E3, a fourth lens element E4, a stop S2, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 5th embodiment are shown in Table 5A and the aspheric surface data are shown in Table 5B below.

TABLE 5A

5th Embodiment
f = 15.79 mm, Fno = 3.52, HFOV = 14.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Stop | Plano | −0.740 | | | | |
| 2 | Lens 1 | 4.0944 (ASP) | 1.749 | Plastic | 1.544 | 56.0 | 7.83 |
| 3 | | 88.6394 (ASP) | 0.040 | | | | |
| 4 | Lens 2 | 16.0217 (ASP) | 0.820 | Plastic | 1.639 | 23.5 | −9.37 |
| 5 | | 4.2708 (ASP) | 0.394 | | | | |
| 6 | Ape. Stop | Plano | −0.114 | | | | |
| 7 | Lens 3 | 9.9458 (ASP) | 0.630 | Plastic | 1.566 | 37.4 | 38.97 |
| 8 | | 17.6958 (ASP) | 2.011 | | | | |
| 9 | Lens 4 | −5.5824 (ASP) | 0.508 | Plastic | 1.686 | 18.4 | 35.97 |
| 10 | | −4.7211 (ASP) | −0.329 | | | | |
| 11 | Stop | Plano | 0.379 | | | | |
| 12 | Lens 5 | 3.7709 (ASP) | 0.613 | Plastic | 1.566 | 37.4 | −24.87 |
| 13 | | 2.7994 (ASP) | 1.000 | | | | |
| 14 | Filter | Plano | 0.210 | Glass | 1.517 | 64.2 | — |
| 15 | | Plano | 6.941 | | | | |
| 16 | Image | Plano | — | | | | |

Note:
Reference wavelength is 587.6 nm (d-line).
An effective radius of the stop S1 (Surface 1) is 2.400 mm.
An effective radius of the stop S2 (Surface 11) is 1.895 mm.

TABLE 5B

Aspheric Coefficients

| Surface # | 2 | 3 | 4 | 5 |
|---|---|---|---|---|
| k= | 7.55036000E−02 | −5.46865000E+01 | 3.69458000E+01 | 2.21267000E+00 |
| A4= | −7.14053510E−04 | 4.16688100E−03 | −5.62082870E−05 | −3.19682920E−03 |
| A6= | −7.05754210E−05 | −1.90207170E−03 | −1.68279700E−03 | −2.41070890E−03 |
| A8= | −7.64291040E−06 | 5.63207190E−04 | 5.28535370E−04 | 5.89907930E−04 |
| A10= | 4.64122370E−07 | −6.85638520E−05 | −6.41509790E−05 | −1.98027800E−05 |
| A12= | — | 3.08862330E−06 | 5.32289400E−07 | 6.34332620E−06 |
| A14= | — | — | 1.62614720E−07 | −4.21770340E−06 |

| Surface # | 7 | 8 | 9 | 10 |
|---|---|---|---|---|
| k= | 2.08759000E+01 | −9.00000000E+01 | 1.05878000E+00 | −2.21504000E+00 |
| A4= | 5.28252090E−03 | 4.46979130E−03 | 4.59769760E−02 | 2.94110230E−02 |
| A6= | −4.99157740E−03 | −3.94130080E−03 | −3.62978130E−02 | −2.92474750E−02 |
| A8= | 1.81910140E−03 | 1.54846820E−03 | 1.81998580E−02 | 1.64217710E−02 |
| A10= | −2.81271210E−04 | −2.87335100E−04 | −7.00233540E−03 | −6.53770840E−03 |
| A12= | 5.35702780E−05 | 3.17870920E−05 | 1.67790930E−03 | 1.55628510E−03 |
| A14= | −8.43968920E−06 | −1.12291500E−06 | −2.24767210E−04 | −2.00034490E−04 |
| A16= | — | — | 1.22370740E−05 | 1.05067430E−05 |

| Surface # | 12 | 13 |
|---|---|---|
| k= | −1.22355000E+01 | −1.07380000E+01 |
| A4= | −4.78875490E−02 | −2.60609790E−02 |
| A6= | 2.68965220E−03 | 1.63673320E−03 |
| A8= | 5.39484640E−03 | 1.85524850E−03 |
| A10= | −3.15825200E−03 | −1.00594860E−03 |
| A12= | 8.16372010E−04 | 2.44244290E−04 |
| A14= | −1.01486010E−04 | −2.98738990E−05 |
| A16= | 4.73381190E−06 | 1.47252560E−06 |

In the 5th embodiment, the equation of the aspheric surface profiles of the aforementioned lens elements is the same as the equation of the 1st embodiment. Also, the definitions of these parameters shown in Table 5C are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Schematic Parameters | | | |
|---|---|---|---|
| f [mm] | 15.79 | CT3/CT1 | 0.36 |
| Fno | 3.52 | CT3/T34 | 0.31 |
| HFOV [deg.] | 14.3 | CT4/CT2 | 0.62 |
| TL/ImgH | 3.66 | CT4/T34 | 0.25 |
| TD/BL | 0.82 | (T34 + T45)/T23 | 7.36 |
| SD/TD | 0.55 | T12/CT2 | 0.05 |
| (\|f/f4\| + \|f/f5\|)/(\|f/f1\| + \|f/f2\|) | 0.29 | V2 + V3 + V4 | 79.3 |
| f3/f4 | 1.08 | V1/N1 | 36.3 |
| \|f2\|/CT2 | 11.43 | V2/N2 | 14.3 |
| (R3 − R4)/(R3 + R4) | 0.58 | V3/N3 | 23.9 |
| (R5 + R6)/(R5 − R6) | −3.57 | V4/N4 | 10.9 |
| (R5 + R7)/(R5 − R7) | 0.28 | V5/N5 | 23.9 |
| (R9 + R10)/(R9 − R10) | 6.76 | Vmin | 18.4 |
| ΣCT/ΣAT | 1.81 | Y5R2/Y1R1 | 0.88 |
| (CT1 + CT2)/(CT4 + CT5) | 2.29 | Y3R2/Y4R1 | 0.98 |
| (CT1 + T12 + CT2 + T23 + CT3)/TL | 0.24 | tan(CRA) | 0.37 |

6th Embodiment

Figure 11:
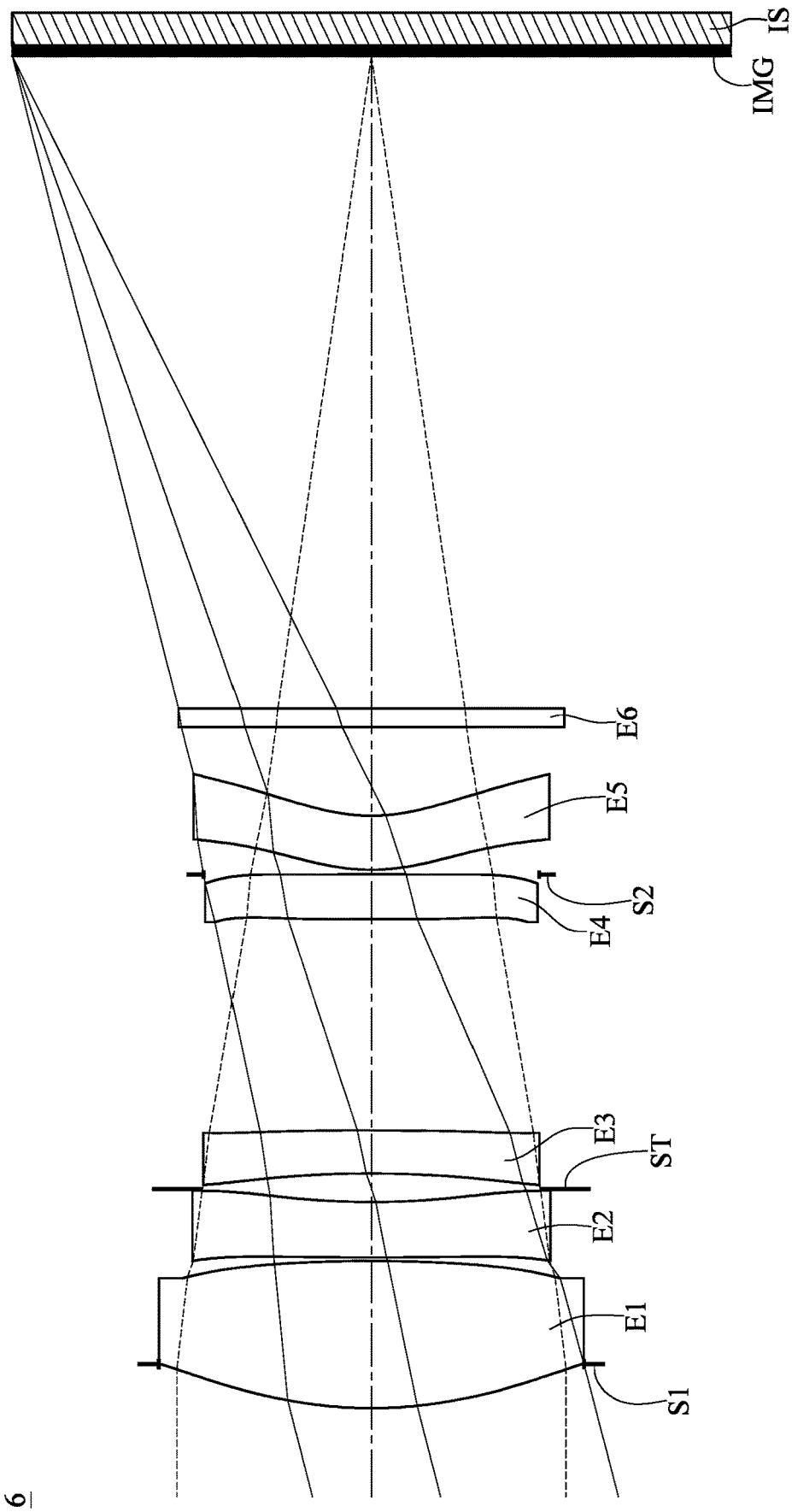
FIG. 11 is a schematic view of an image capturing unit according to the 6th embodiment of the present disclosure.
Figure 12:
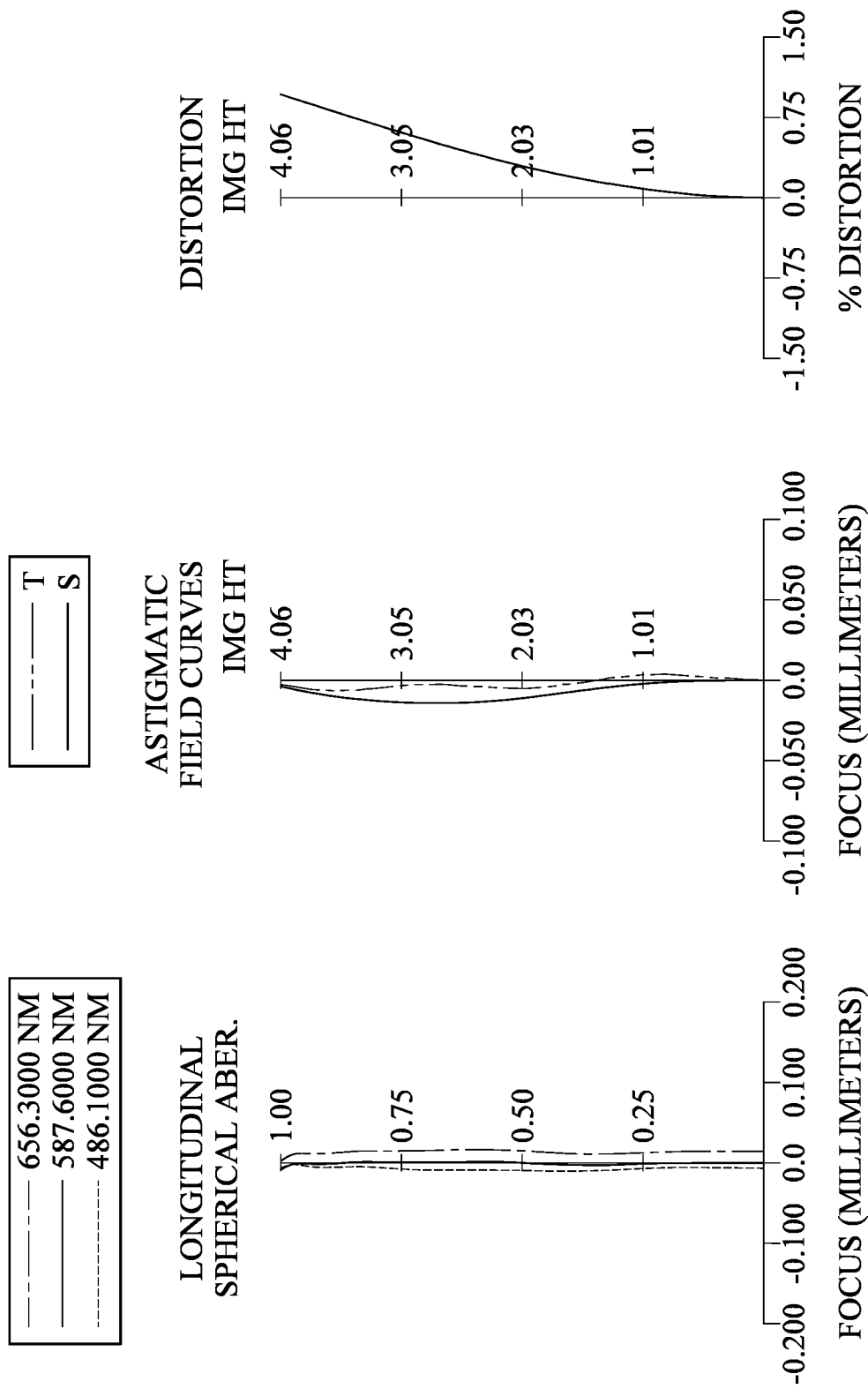
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the photographing optical lens assembly (its reference numeral is omitted) of the present disclosure and an image sensor IS. The photographing optical lens assembly includes, in order from an object side to an image side along an optical axis, a stop S1, a first lens element E1, a second lens element E2, an aperture stop ST, a third lens element E3, a fourth lens element E4, a stop S2, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 6th embodiment are shown in Table 6A and the aspheric surface data are shown in Table 6B below.

TABLE 6A

6th Embodiment
f = 15.47 mm, Fno = 3.52, HFOV = 14.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.500 | | | | |
| 2 | Lens 1 | 5.0105 | (ASP) | 1.670 | Plastic | 1.544 | 56.0 | 7.35 |
| 3 | | −17.4954 | (ASP) | 0.040 | | | | |
| 4 | Lens 2 | 57.2259 | (ASP) | 0.619 | Plastic | 1.639 | 23.5 | −15.38 |
| 5 | | 8.3475 | (ASP) | 0.149 | | | | |
| 6 | Ape. Stop | Plano | | 0.177 | | | | |
| 7 | Lens 3 | −11.6466 | (ASP) | 0.488 | Plastic | 1.566 | 37.4 | −28.26 |
| 8 | | −43.4783 | (ASP) | 2.387 | | | | |
| 9 | Lens 4 | −25.4505 | (ASP) | 0.508 | Plastic | 1.686 | 18.4 | 196.63 |

TABLE 6A-continued

6th Embodiment
f = 15.47 mm, Fno = 3.52, HFOV = 14.6 deg.

| Surface # | | Curvature Radius | Thickness | Material | Index | Abbe # | Focal Length |
|---|---|---|---|---|---|---|---|
| 10 | | −21.5851 (ASP) | −0.004 | | | | |
| 11 | Stop | Plano | 0.054 | | | | |
| 12 | Lens 5 | 2.2146 (ASP) | 0.613 | Plastic | 1.566 | 37.4 | 595.92 |
| 13 | | 2.0062 (ASP) | 1.000 | | | | |
| 14 | Filter | Plano | 0.210 | Glass | 1.517 | 64.2 | — |
| 15 | | Plano | 7.384 | | | | |
| 16 | Image | Plano | — | | | | |

Note:
Reference wavelength is 587.6 nm (d-line).
An effective radius of the stop S1 (Surface 1) is 2.402 mm.
An effective radius of the stop S2 (Surface 11) is 1.895 mm.

TABLE 6B

Aspheric Coefficients

| Surface # | 2 | 3 | 4 | 5 |
|---|---|---|---|---|
| k= | −5.3364800E−01 | 3.7728700E+01 | −2.1790200E+01 | 2.5590300E+00 |
| A4= | −1.1928955E−03 | −2.0106744E−03 | −3.0506612E−03 | −5.2836549E−03 |
| A6= | −2.4495396E−04 | 1.0927104E−03 | 2.1188545E−03 | 3.0679398E−03 |
| A8= | 2.5796928E−05 | −5.8008631E−04 | −1.2193044E−03 | −1.9267130E−03 |
| A10= | −4.2853972E−06 | 1.0242606E−04 | 1.5760228E−04 | 1.4082419E−04 |
| A12= | — | −5.9129825E−06 | 1.8819820E−06 | 5.7495322E−05 |
| A14= | — | — | −1.0023691E−06 | −7.5086155E−06 |

| Surface # | 7 | 8 | 9 | 10 |
|---|---|---|---|---|
| k= | 2.5328900E+01 | −9.0000000E+01 | −9.0000000E+01 | −8.8259800E+01 |
| A4= | 1.4599143E−03 | −2.7611056E−04 | 5.3344154E−02 | 4.1011708E−02 |
| A6= | 2.5618943E−03 | −5.2243233E−04 | −3.9986746E−02 | −3.3269181E−02 |
| A8= | −1.8121549E−03 | −4.3155019E−04 | 1.9832609E−02 | 1.6495817E−02 |
| A10= | 6.5756792E−04 | 4.8671795E−04 | −8.2015678E−03 | −6.8422481E−03 |
| A12= | −9.6574887E−05 | −1.1396020E−04 | 2.2336761E−03 | 1.8706287E−03 |
| A14= | 5.8847007E−06 | 8.2090475E−06 | −3.5212159E−04 | −2.8732988E−04 |
| A16= | — | — | 2.4091798E−05 | 1.8761547E−05 |

| Surface # | 12 | 13 |
|---|---|---|
| k= | −2.9760700E+00 | −5.5835500E+00 |
| A4= | −4.2968138E−02 | −6.4794522E−03 |
| A6= | 7.2201242E−03 | −6.2091018E−03 |
| A8= | 1.0051016E−03 | 4.6316729E−03 |
| A10= | −1.5016149E−03 | −1.8118617E−03 |
| A12= | 5.8444249E−04 | 4.4404712E−04 |
| A14= | −1.0364774E−04 | −6.1692135E−05 |
| A16= | 7.1688688E−06 | 3.6747440E−06 |

In the 6th embodiment, the equation of the aspheric surface profiles of the aforementioned lens elements is the same as the equation of the 1st embodiment. Also, the definitions of these parameters shown in Table 6C are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

Schematic Parameters

| f [mm] | 15.47 | CT3/CT1 | 0.29 |
|---|---|---|---|
| Fno | 3.52 | CT3/T34 | 0.20 |
| HFOV [deg.] | 14.6 | CT4/CT2 | 0.82 |
| TL/ImgH | 3.77 | CT4/T34 | 0.21 |
| TD/BL | 0.78 | (T34 + T45)/T23 | 7.48 |
| SD/TD | 0.63 | T12/CT2 | 0.06 |
| (|f/f4| + |f/f5|)/(|f/f1| + |f/f2|) | 0.03 | V2 + V3 + V4 | 79.3 |
| f3/f4 | −0.14 | V1/N1 | 36.3 |
| |f2|/CT2 | 24.85 | V2/N2 | 14.3 |
| (R3 − R4)/(R3 + R4) | 0.75 | V3/N3 | 23.9 |
| (R5 + R6)/(R5 − R6) | −1.73 | V4/N4 | 10.9 |
| (R5 + R7)/(R5 − R7) | −2.69 | V5/N5 | 23.9 |
| (R9 + R10)/(R9 − R10) | 20.25 | Vmin | 18.4 |
| ΣCT/ΣAT | 1.39 | Y5R2/Y1R1 | 0.84 |
| (CT1 + CT2)/(CT4 + CT5) | 2.04 | Y3R2/Y4R1 | 1.03 |
| (CT1 + T12 + CT2 + T23 + CT3)/TL | 0.21 | tan(CRA) | 0.35 |

7th Embodiment

Figure 13:
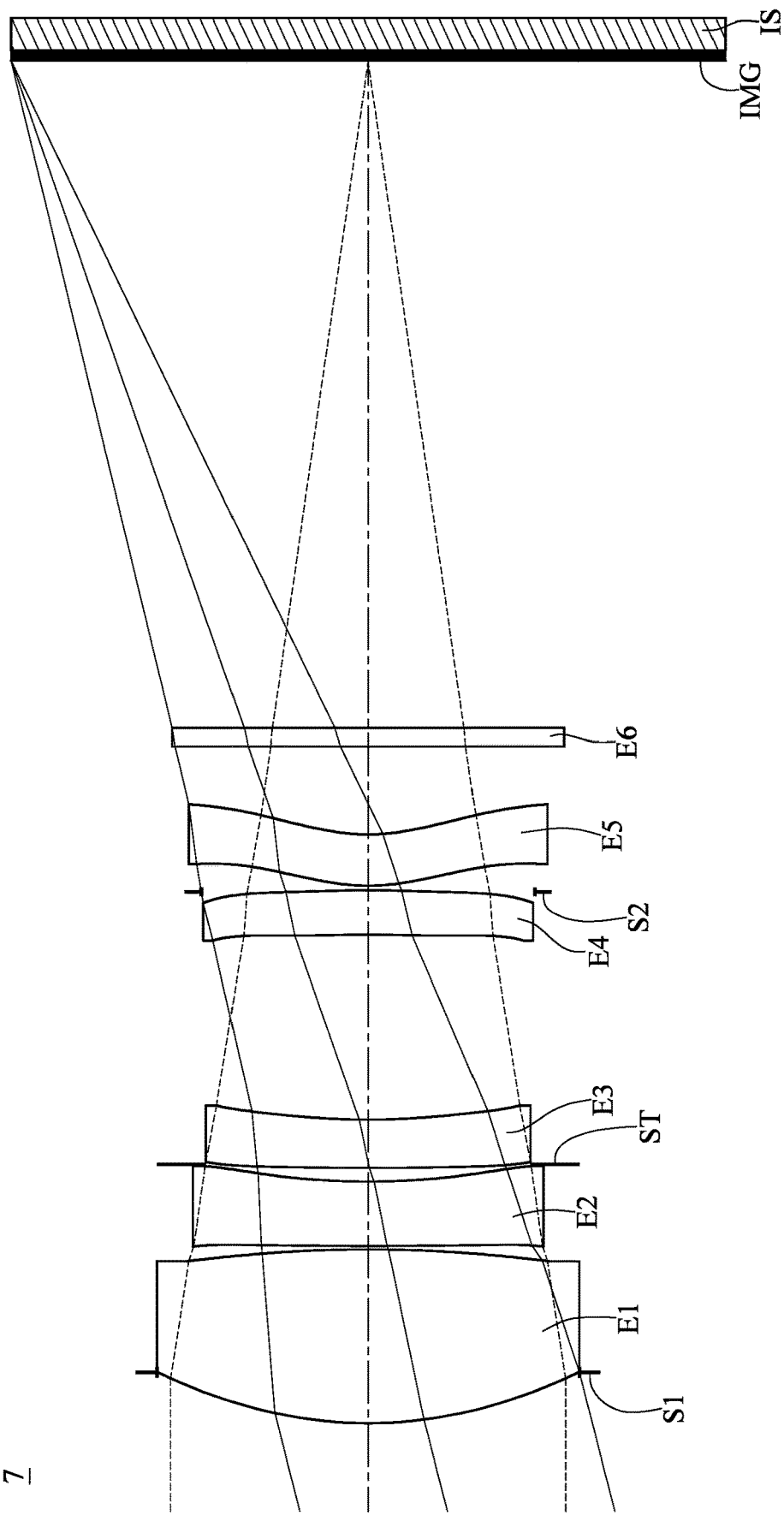
FIG. 13 is a schematic view of an image capturing unit according to the 7th embodiment of the present disclosure.
Figure 14:
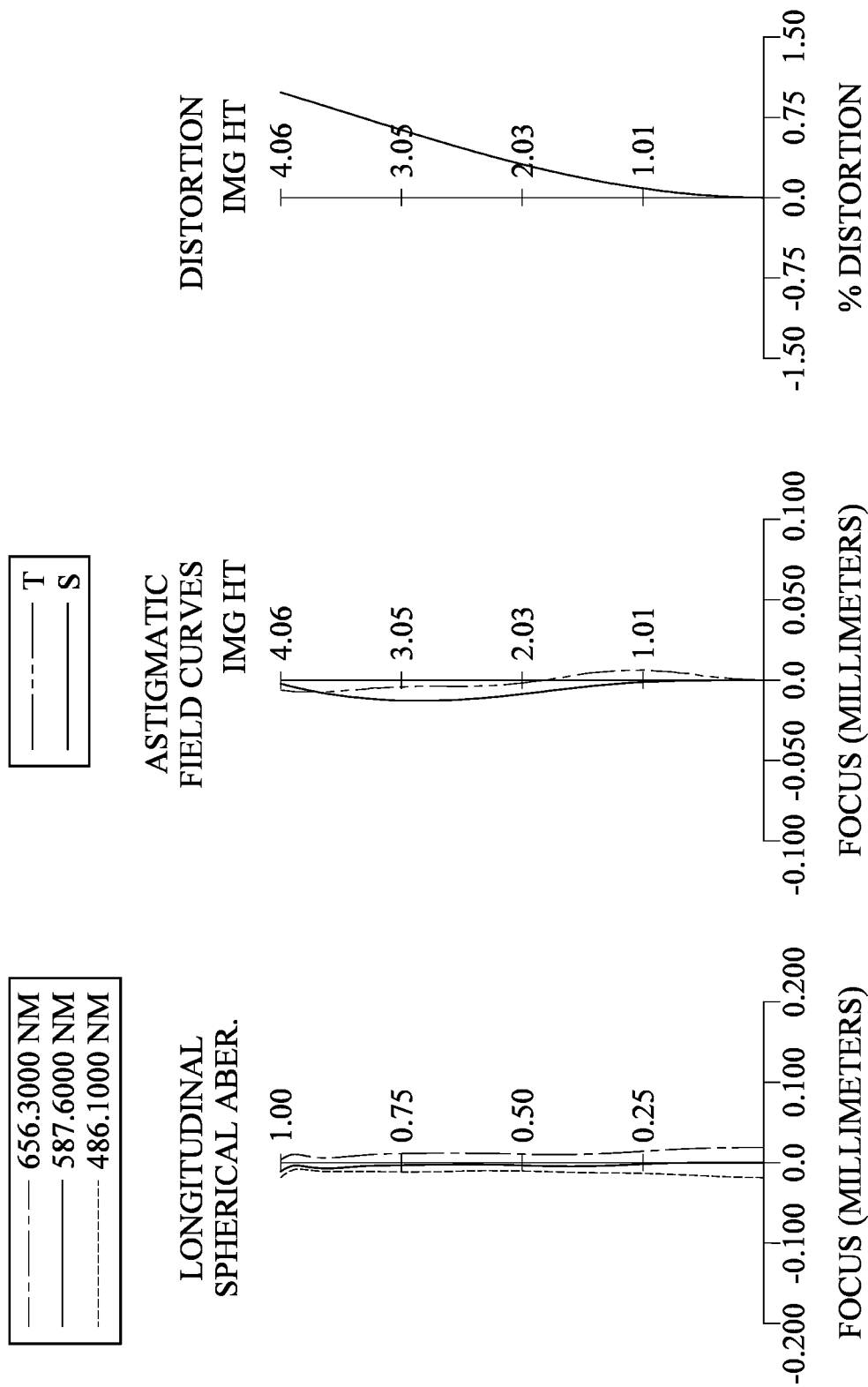
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the photographing optical lens assembly (its reference numeral is omitted) of the present disclosure and an image sensor IS. The photographing optical lens assembly includes, in order from an object side to an image side along an optical axis, a stop S1, a first lens element E1, a second lens element E2, an aperture stop ST, a third lens element E3, a fourth lens element E4, a stop S2, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 7th embodiment are shown in Table 7A and the aspheric surface data are shown in Table 7B below.

TABLE 7A

7th Embodiment
f = 15.80 mm, Fno = 3.52, HFOV = 14.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.580 | | | | |
| 2 | Lens 1 | 4.8779 | (ASP) | 1.980 | Plastic | 1.544 | 56.0 | 7.14 |
| 3 | | −16.3496 | (ASP) | 0.040 | | | | |
| 4 | Lens 2 | 47.7645 | (ASP) | 0.728 | Plastic | 1.639 | 23.5 | −15.82 |
| 5 | | 8.2913 | (ASP) | 0.196 | | | | |
| 6 | Ape. Stop | Plano | | −0.040 | | | | |
| 7 | Lens 3 | 44.6987 | (ASP) | 0.550 | Plastic | 1.566 | 37.4 | −16.70 |
| 8 | | 7.7685 | (ASP) | 2.104 | | | | |
| 9 | Lens 4 | −12.4844 | (ASP) | 0.508 | Plastic | 1.686 | 18.4 | 111.98 |
| 10 | | −10.9171 | (ASP) | −0.019 | | | | |
| 11 | Stop | Plano | | 0.069 | | | | |
| 12 | Lens 5 | 2.3588 | (ASP) | 0.584 | Plastic | 1.566 | 37.4 | 98.98 |
| 13 | | 2.2421 | (ASP) | 1.000 | | | | |
| 14 | Filter | Plano | | 0.210 | Glass | 1.517 | 64.2 | — |
| 15 | | Plano | | 7.597 | | | | |
| 16 | Image | Plano | | — | | | | |

Note:
Reference wavelength is 587.6 nm (d-line).
An effective radius of the stop S1 (Surface 1) is 2.401 mm.
An effective radius of the stop S2 (Surface 11) is 1.895 mm.

TABLE 7B

Aspheric Coefficients

| Surface # | 2 | 3 | 4 | 5 |
|---|---|---|---|---|
| k= | −1.7628100E−02 | 4.0238800E+01 | 5.0268200E+01 | 5.1080600E+00 |
| A4= | −1.0862246E−03 | −2.7967723E−03 | −3.3456485E−03 | −3.7139502E−04 |

TABLE 7B-continued

| Aspheric Coefficients | | | | |
|---|---|---|---|---|
| A6= | −9.8015026E−05 | 2.7653132E−03 | 1.9628592E−03 | 8.3393268E−04 |
| A8= | 6.2508309E−06 | −7.1377361E−04 | −5.6293076E−04 | −9.1602975E−04 |
| A10= | 2.5576705E−07 | 8.9132781E−05 | −2.9789401E−05 | 1.9102501E−05 |
| A12= | — | −3.7473065E−06 | 1.8150826E−05 | 4.2735894E−05 |
| A14= | — | — | −1.3409358E−06 | −5.4720873E−06 |

| Surface # | 7 | 8 | 9 | 10 |
|---|---|---|---|---|
| k= | 9.0000000E+01 | −5.3668100E+01 | −5.5812900E+01 | −4.3647600E+01 |
| A4= | −2.9042011E−03 | 6.7922856E−03 | 5.4752771E−02 | 4.0207353E−02 |
| A6= | 1.9050304E−03 | −6.1070149E−03 | −4.0960666E−02 | −3.2193778E−02 |
| A8= | −7.8588609E−04 | 2.7250766E−03 | 1.9949738E−02 | 1.5783215E−02 |
| A10= | 3.7692912E−04 | −5.1180739E−04 | −7.7656790E−03 | −6.3468484E−03 |
| A12= | −5.8379938E−05 | 6.7742607E−05 | 1.9287398E−03 | 1.6612323E−03 |
| A14= | 2.4364364E−06 | −5.2180112E−06 | −2.6166249E−04 | −2.3716034E−04 |
| A16= | — | — | 1.3986860E−05 | 1.3628114E−05 |

| Surface # | 12 | 13 |
|---|---|---|
| k= | −4.0312800E+00 | −6.9403200E+00 |
| A4= | −3.9342162E−02 | −1.1855760E−02 |
| A6= | 4.9836766E−03 | −4.2240280E−03 |
| A8= | 1.4383876E−03 | 3.3752896E−03 |
| A10= | −1.5487283E−03 | −1.2956188E−03 |
| A12= | 5.6309296E−04 | 3.0489549E−04 |
| A14= | −9.1940865E−05 | −3.9543144E−05 |
| A16= | 5.5068008E−06 | 2.1031335E−06 |

In the 7th embodiment, the equation of the aspheric surface profiles of the aforementioned lens elements is the same as the equation of the 1st embodiment. Also, the definitions of these parameters shown in Table 7C are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Schematic Parameters | | | |
|---|---|---|---|
| f [mm] | 15.80 | CT3/CT1 | 0.28 |
| Fno | 3.52 | CT3/T34 | 0.26 |
| HFOV [deg.] | 14.3 | CT4/CT2 | 0.70 |
| TL/ImgH | 3.82 | CT4/T34 | 0.24 |
| TD/BL | 0.76 | (T34 + T45)/T23 | 13.81 |
| SD/TD | 0.56 | T12/CT2 | 0.05 |
| (|f/f4| + |f/f5|)/(|f/f1| + |f/f2|) | 0.09 | V2 + V3 + V4 | 79.3 |
| f3/f4 | −0.15 | V1/N1 | 36.3 |
| |f2|/CT2 | 21.74 | V2/N2 | 14.3 |
| (R3 − R4)/(R3 + R4) | 0.70 | V3/N3 | 23.9 |
| (R5 + R6)/(R5 − R6) | 1.42 | V4/N4 | 10.9 |
| (R5 + R7)/(R5 − R7) | 0.56 | V5/N5 | 23.9 |
| (R9 + R10)/(R9 − R10) | 39.43 | Vmin | 18.4 |
| ΣCT/ΣAT | 1.85 | Y5R2/Y1R1 | 0.85 |
| (CT1 + CT2)/(CT4 + CT5) | 2.48 | Y3R2/Y4R1 | 0.98 |
| (CT1 + T12 + CT2 + T23 + CT3)/TL | 0.22 | tan(CRA) | 0.35 |

8th Embodiment

Figure 15:
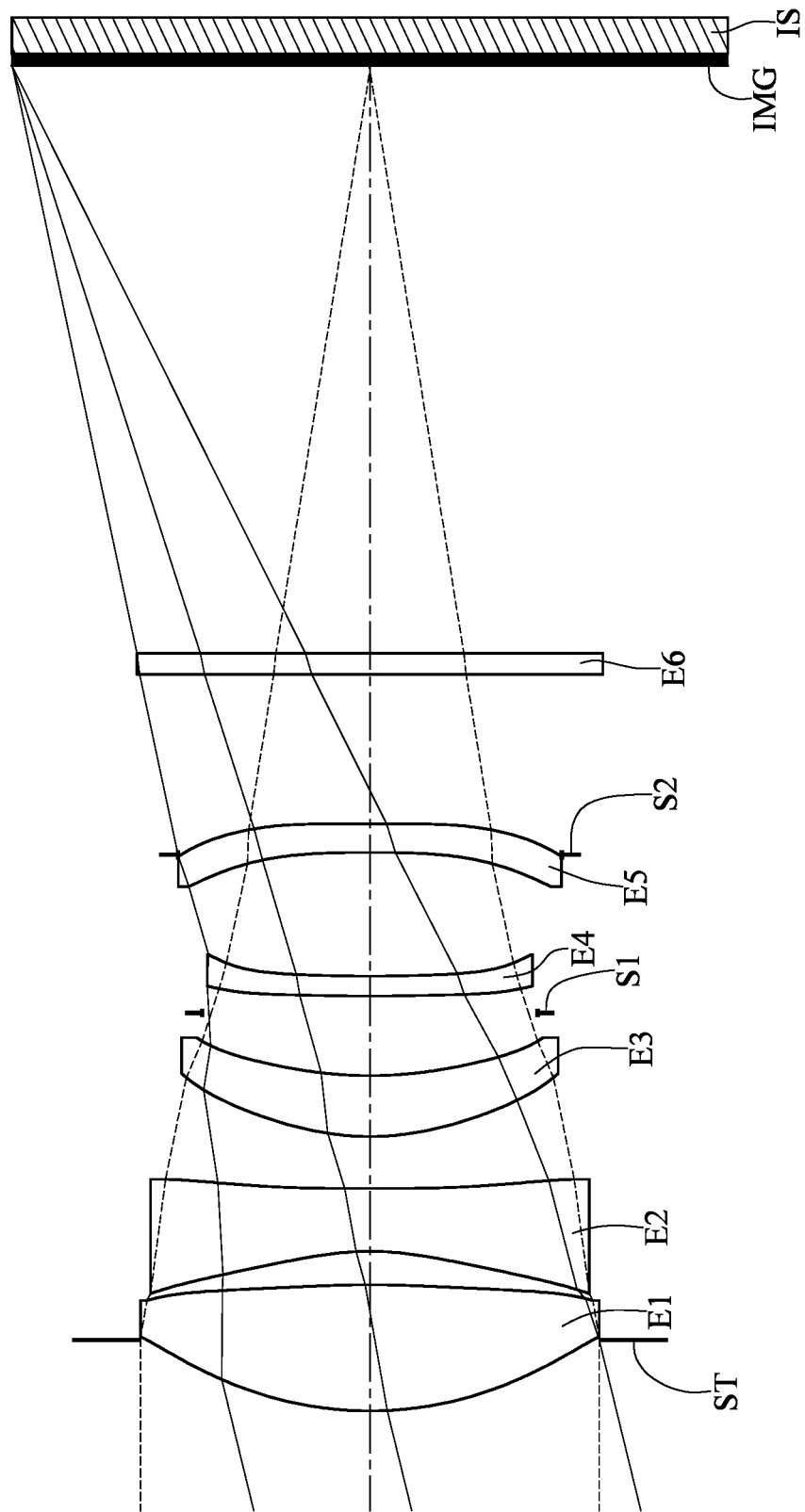
FIG. 15 is a schematic view of an image capturing unit according to the 8th embodiment of the present disclosure.
Figure 16:
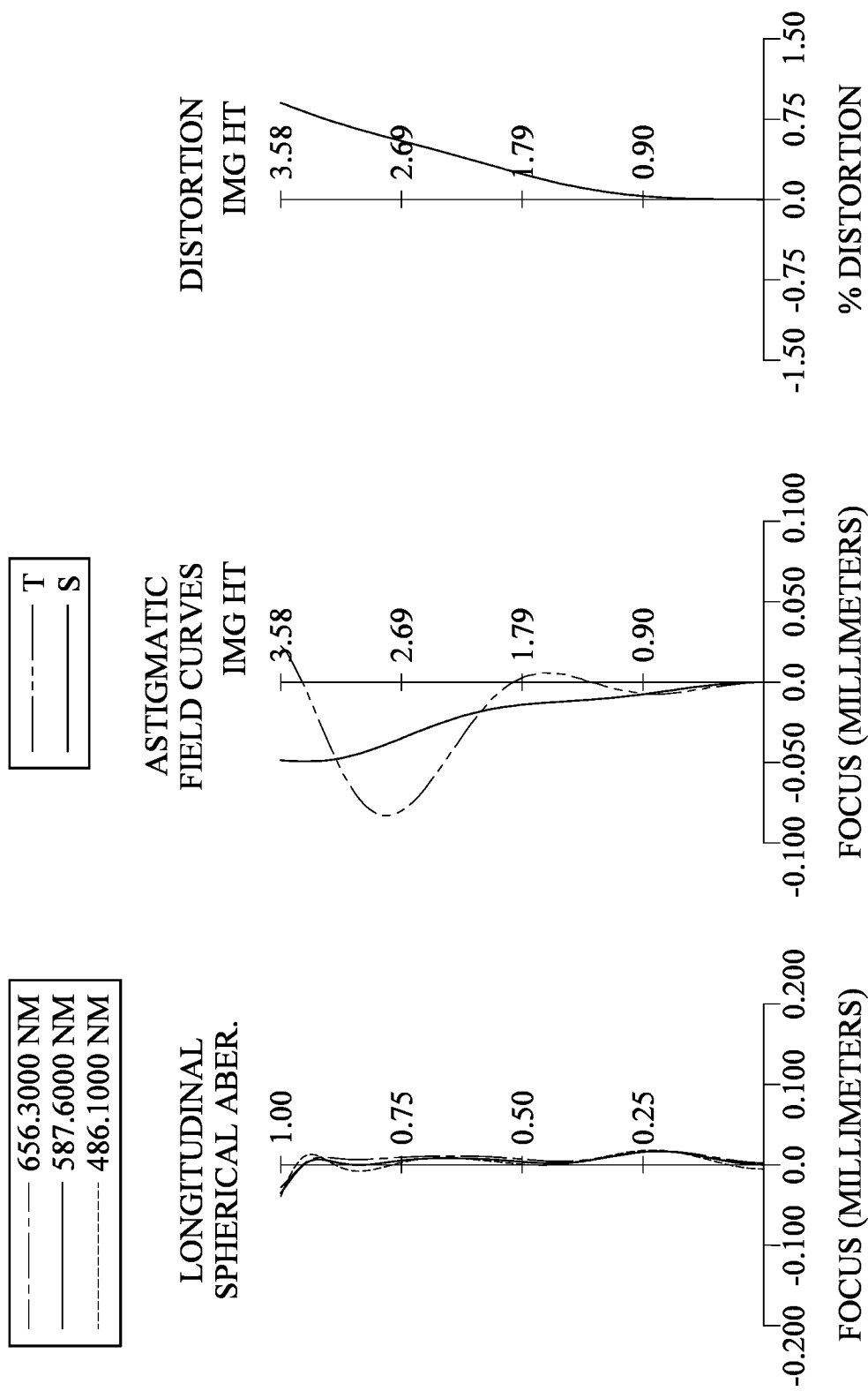
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the photographing optical lens assembly (its reference numeral is omitted) of the present disclosure and an image sensor IS.

The photographing optical lens assembly includes, in order from an object side to an image side along an optical axis, an aperture stop ST, a first lens element E1, a second lens element E2, a third lens element E3, a stop S1, a fourth lens element E4, a fifth lens element E5, a stop S2, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point. The image-side surface of the first lens element E1 has two inflection points.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The filter E6 is made of glass material and located between the stop S2 and the image surface IMG, and will not affect the focal length of the photographing optical lens assembly. The image sensor IS is disposed on or near the image surface IMG of the photographing optical lens assembly.

The detailed optical data of the 8th embodiment are shown in Table 8A and the aspheric surface data are shown in Table 8B below.

TABLE 8A

8th Embodiment
f = 14.52 mm, Fno = 3.16, HFOV = 13.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.710 | | | | |
| 2 | Lens 1 | 3.5890 | (ASP) | 1.265 | Plastic | 1.545 | 56.1 | 5.06 |
| 3 | | −10.4405 | (ASP) | 0.337 | | | | |
| 4 | Lens 2 | −2.6107 | (ASP) | 0.632 | Plastic | 1.637 | 22.8 | −4.31 |
| 5 | | −59.0287 | (ASP) | 0.519 | | | | |
| 6 | Lens 3 | 2.6725 | (ASP) | 0.610 | Plastic | 1.686 | 18.4 | 10.13 |
| 7 | | 3.9401 | (ASP) | 0.630 | | | | |
| 8 | Stop | Plano | | 0.169 | | | | |
| 9 | Lens 4 | 16.1998 | (ASP) | 0.200 | Plastic | 1.587 | 28.3 | −342.64 |
| 10 | | 14.9242 | (ASP) | 1.240 | | | | |
| 11 | Lens 5 | −22.2977 | (ASP) | 0.287 | Plastic | 1.540 | 50.8 | −28.31 |
| 12 | | 48.9343 | (ASP) | −0.310 | | | | |
| 13 | Stop | Plano | | 1.810 | | | | |
| 14 | Filter | Plano | | 0.210 | Glass | 1.517 | 64.2 | — |
| 15 | | Plano | | 5.899 | | | | |
| 16 | Image | Plano | | — | | | | |

Note:
Reference wavelength is 587.6 nm (d-line).
An effective radius of the stop S1 (Surface 8) is 1.680 mm.
An effective radius of the stop S2 (Surface 13) is 1.921 mm.

TABLE 8B

Aspheric Coefficients

| Surface # | 2 | 3 | 4 | 5 |
|---|---|---|---|---|
| k= | 1.5347000E−01 | −1.0627700E+01 | −2.5516900E+00 | 0.0000000E+00 |
| A4= | −1.7526911E−03 | 1.6089106E−02 | 8.0848734E−02 | 5.0677695E−02 |
| A6= | 6.5721197E−04 | 1.2620124E−03 | −4.9832036E−02 | −4.1616335E−02 |
| A8= | −2.5764545E−04 | −6.4127825E−03 | 2.0289100E−02 | 2.1962404E−02 |
| A10= | −5.6771811E−05 | 3.3658062E−03 | −5.4328365E−03 | −7.2966694E−03 |
| A12= | 3.8744711E−05 | −8.1760558E−04 | 9.6908407E−04 | 1.4542911E−03 |
| A14= | −6.8176899E−06 | 9.4978898E−05 | −1.1964012E−04 | −1.6031738E−04 |
| A16= | 3.6457157E−07 | −4.2423463E−06 | 9.6441570E−06 | 7.5378587E−06 |
| A18= | — | — | −3.6685797E−07 | — |

| Surface # | 6 | 7 | 9 | 10 |
|---|---|---|---|---|
| k= | −4.4216700E−01 | 2.6697600E+00 | 6.4397700E+01 | 5.5528000E+01 |
| A4= | −1.7207938E−02 | −2.4473016E−02 | −4.0768083E−02 | −2.6232700E−02 |
| A6= | −3.4377030E−03 | 7.7254538E−03 | 3.7036162E−02 | 2.7499610E−02 |
| A8= | 7.4813501E−03 | −2.1741697E−03 | −6.0313717E−04 | 1.7130749E−02 |
| A10= | −4.6782749E−03 | −8.9110841E−04 | −2.4676410E−02 | −4.2287277E−02 |
| A12= | 1.5482496E−03 | 6.7395134E−04 | 2.1441790E−02 | 3.2309589E−02 |
| A14= | −2.4238867E−04 | −6.7932914E−05 | −8.2570412E−03 | −1.2053153E−02 |
| A16= | 1.4143139E−05 | −8.0526828E−06 | 1.5340351E−03 | 2.2027186E−03 |
| A18= | — | — | −1.1340899E−04 | −1.5836517E−04 |

TABLE 8B-continued

Aspheric Coefficients

| Surface # | 11 | 12 |
|---|---|---|
| k= | 0.0000000E+00 | 0.0000000E+00 |
| A4= | −5.3107346E−02 | −5.1597113E−02 |
| A6= | 2.3460908E−02 | 2.7027375E−02 |
| A8= | −1.4350156E−02 | −2.1913033E−02 |
| A10= | 6.4045035E−03 | 1.3387863E−02 |
| A12= | −1.3261156E−03 | −5.1920498E−03 |
| A14= | −9.1330729E−06 | 1.2075635E−03 |
| A16= | 4.3187049E−05 | −1.5599062E−04 |
| A18= | −4.2190842E−06 | 8.7044000E−06 |

In the 8th embodiment, the equation of the aspheric surface profiles of the aforementioned lens elements is the same as the equation of the 1st embodiment. Also, the definitions of these parameters shown in Table 8C are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

Schematic Parameters

| f [mm] | 14.52 | CT3/CT1 | 0.48 |
|---|---|---|---|
| Fno | 3.16 | CT3/T34 | 0.76 |
| HFOV [deg.] | 13.7 | CT4/CT2 | 0.32 |
| TL/ImgH | 3.77 | CT4/T34 | 0.25 |
| TD/BL | 0.77 | (T34 + T45)/T23 | 3.93 |
| SD/TD | 0.88 | T12/CT2 | 0.53 |
| (|f/f4| + |f/f5|)/(|f/f1| + |f/f2|) | 0.09 | V2 + V3 + V4 | 69.5 |
| f3/f4 | −0.03 | V1/N1 | 36.3 |
| |f2|/CT2 | 6.82 | V2/N2 | 13.9 |
| (R3 − R4)/(R3 + R4) | −0.92 | V3/N3 | 10.9 |
| (R5 + R6)/(R5 − R6) | −5.22 | V4/N4 | 17.8 |
| (R5 + R7)/(R5 − R7) | −1.40 | V5/N5 | 33.0 |
| (R9 + R10)/(R9 − R10) | −0.37 | Vmin | 18.4 |
| ΣCT/ΣAT | 1.03 | Y5R2/Y1R1 | 0.84 |
| (CT1 + CT2)/(CT4 + CT5) | 3.90 | Y3R2/Y4R1 | 1.04 |
| (CT1 + T12 + CT2 + T23 + CT3)/TL | 0.25 | tan(CRA) | 0.32 |

9th Embodiment

Figure 17:
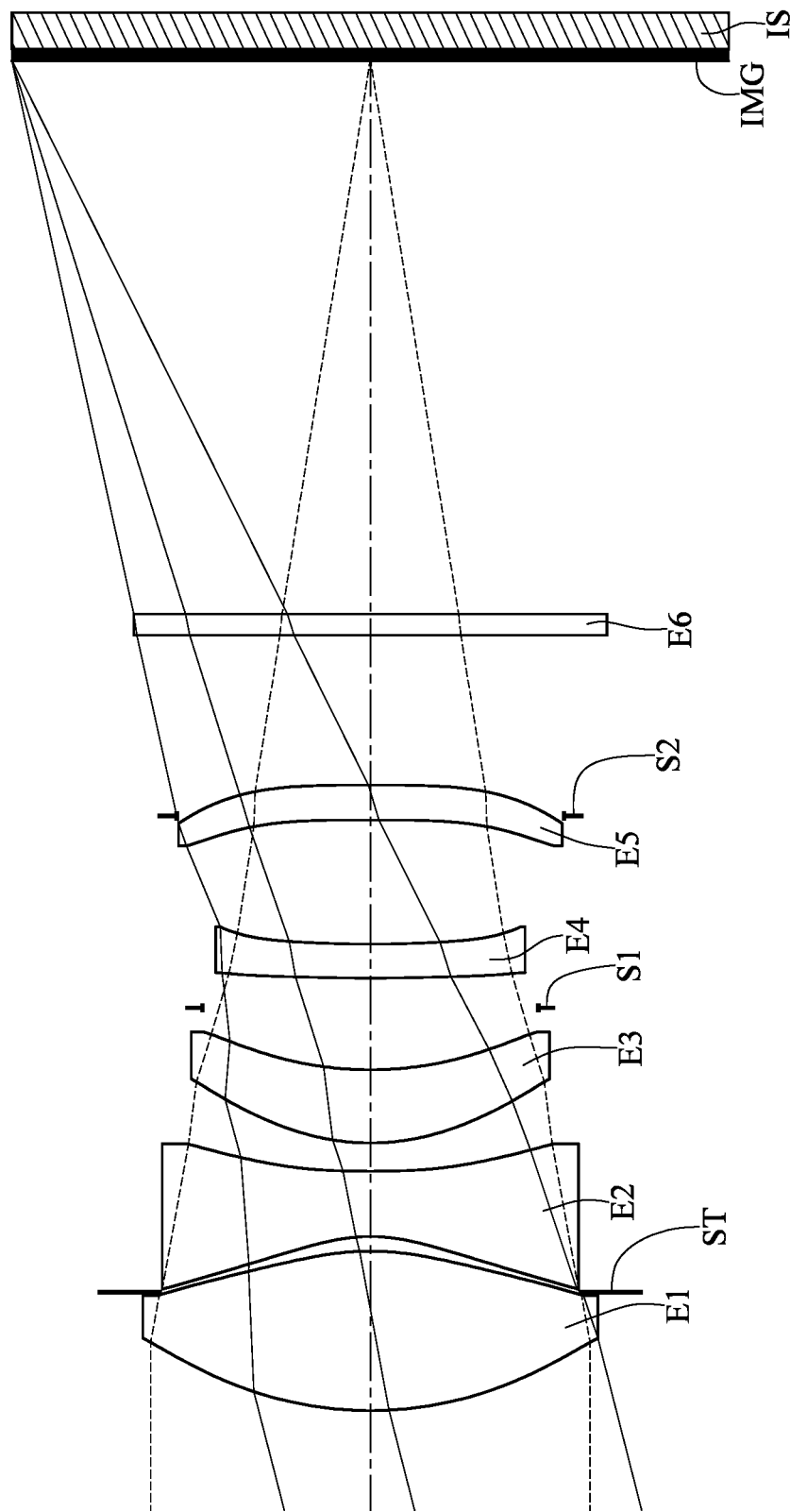
FIG. 17 is a schematic view of an image capturing unit according to the 9th embodiment of the present disclosure.
Figure 18:
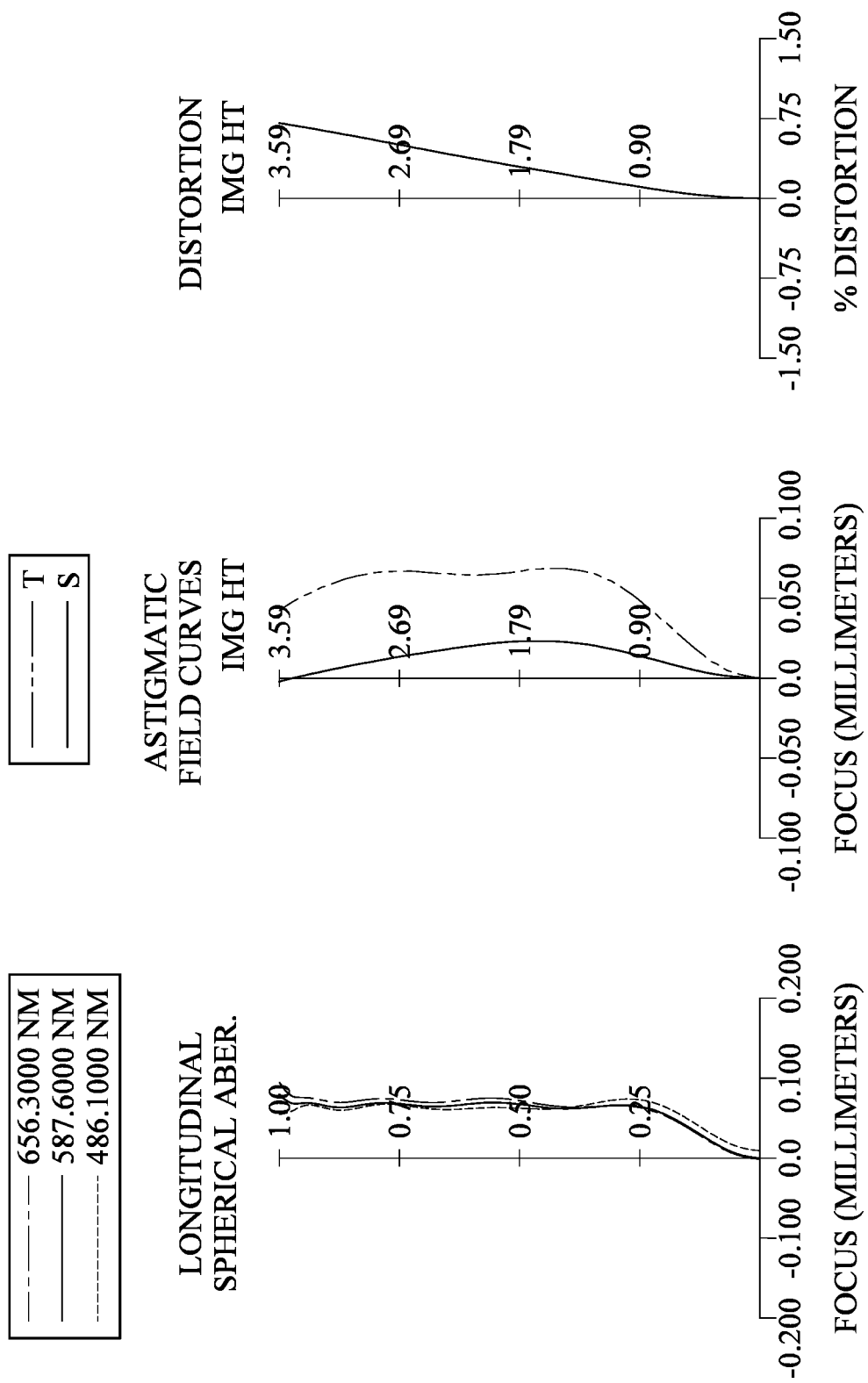
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the photographing optical lens assembly (its reference numeral is omitted) of the present disclosure and an image sensor IS. The photographing optical lens assembly includes, in order from an object side to an image side along an optical axis, a first lens element E1, an aperture stop ST, a second lens element E2, a third lens element E3, a stop S1, a fourth lens element E4, a fifth lens element E5, a stop S2, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point.

The filter E6 is made of glass material and located between the stop S2 and the image surface IMG, and will not affect the focal length of the photographing optical lens assembly. The image sensor IS is disposed on or near the image surface IMG of the photographing optical lens assembly.

The detailed optical data of the 9th embodiment are shown in Table 9A and the aspheric surface data are shown in Table 9B below.

TABLE 9A

9th Embodiment
f= 13.89 mm, Fno = 3.16, HFOV = 14.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.6087 | (ASP) | 1.595 | Plastic | 1.511 | 56.8 | 3.27 |
| 2 | | −2.6449 | (ASP) | −0.409 | | | | |
| 3 | Ape. Stop | Plano | | 0.556 | | | | |
| 4 | Lens 2 | −1.6287 | (ASP) | 0.654 | Plastic | 1.587 | 28.3 | −2.46 |
| 5 | | 14.8407 | (ASP) | 0.283 | | | | |
| 6 | Lens 3 | 2.3753 | (ASP) | 0.732 | Plastic | 1.680 | 18.2 | 8.19 |
| 7 | | 3.6262 | (ASP) | 0.619 | | | | |
| 8 | Stop | Plano | | 0.298 | | | | |
| 9 | Lens 4 | 17.3553 | (ASP) | 0.340 | Plastic | 1.614 | 25.6 | −56.19 |
| 10 | | 11.4616 | (ASP) | 1.242 | | | | |
| 11 | Lens 5 | −79.2513 | (ASP) | 0.350 | Plastic | 1.534 | 56.0 | 270.79 |
| 12 | | −51.2821 | (ASP) | −0.310 | | | | |
| 13 | Stop | Plano | | 1.810 | | | | |
| 14 | Filter | Plano | | 0.210 | Glass | 1.517 | 64.2 | — |
| 15 | | Plano | | 5.538 | | | | |
| 16 | Image | Plano | | — | | | | |

Note:
Reference wavelength is 587.6 nm (d-line).
An effective radius of the stop S1 (Surface 8) is 1.680 mm.
An effective radius of the stop S2 (Surface 13) is 1.937 mm.

TABLE 9B

Aspheric Coefficients

| Surface # | 1 | 2 | 4 | 5 |
|---|---|---|---|---|
| k= | 1.3399200E−01 | −7.8370000E+00 | −2.9807500E+00 | 4.0984000E+01 |
| A4= | −1.8945582E−03 | −5.7636818E−03 | 9.0579744E−02 | 9.0808835E−02 |
| A6= | −5.9267933E−04 | 3.1034662E−02 | −5.0749216E−02 | −7.9583343E−02 |
| A8= | 8.6798224E−04 | −2.6568059E−02 | 1.7702522E−02 | 3.9576227E−02 |
| A10= | −5.0986524E−04 | 1.1103012E−02 | −4.6477092E−03 | −1.1951722E−02 |
| A12= | 1.3986041E−04 | −2.5282495E−03 | 1.1641840E−03 | 2.1222439E−03 |
| A14= | −1.8866886E−05 | 2.9928216E−04 | −2.5516647E−04 | −2.0326246E−04 |
| A16= | 9.5602371E−07 | −1.4414183E−05 | 3.4519329E−05 | 7.9557525E−06 |
| A18= | — | — | −1.9426476E−06 | — |

| Surface # | 6 | 7 | 9 | 10 |
|---|---|---|---|---|
| k= | −4.3936500E−01 | 2.4668200E+00 | 4.1295600E+01 | 4.0569700E+01 |
| A4= | 1.1693360E−02 | 7.9957216E−03 | −1.7885059E−02 | −1.4045676E−02 |
| A6= | −2.5002580E−02 | −1.6821009E−02 | 8.4708151E−03 | 8.5359446E−03 |
| A8= | 1.4893869E−02 | 8.4098988E−03 | −3.0311472E−03 | 5.6238030E−03 |
| A10= | −5.7533973E−03 | −4.3368141E−03 | 5.6510379E−03 | −5.2616196E−03 |
| A12= | 1.5450208E−03 | 1.8446488E−03 | −5.1830238E−03 | 2.4518668E−03 |
| A14= | −2.5494171E−04 | −4.9030914E−04 | 2.3946643E−03 | −5.8178305E−04 |
| A16= | 1.7063556E−05 | 4.6898490E−05 | −5.7769553E−04 | 4.3791715E−05 |
| A18= | — | — | 5.4580193E−05 | 3.5701939E−07 |

| Surface # | 11 | 12 |
|---|---|---|
| k= | −9.0000000E+01 | −9.0000000E+01 |
| A4= | −3.8507921E−02 | −3.4689777E−02 |
| A6= | 7.9069082E−03 | 4.3329373E−03 |
| A8= | −2.6809402E−03 | −7.6275366E−05 |
| A10= | 1.0528398E−03 | −8.9032569E−04 |
| A12= | −2.1301136E−04 | 5.4610249E−04 |
| A14= | −8.2303420E−06 | −1.6423912E−04 |
| A16= | 1.5075278E−05 | 2.4893798E−05 |
| A18= | −1.9754724E−06 | −1.3946305E−06 |

In the 9th embodiment, the equation of the aspheric surface profiles of the aforementioned lens elements is the same as the equation of the 1st embodiment. Also, the definitions of these parameters shown in Table 9C are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

Schematic Parameters

| | | | |
|---|---|---|---|
| f [mm] | 13.89 | CT3/CT1 | 0.46 |
| Fno | 3.16 | CT3/T34 | 0.80 |
| HFOV [deg.] | 14.3 | CT4/CT2 | 0.52 |
| TL/ImgH | 3.77 | CT4/T34 | 0.37 |
| TD/BL | 0.86 | (T34 + T45)/T23 | 7.63 |
| SD/TD | 0.81 | T12/CT2 | 0.22 |
| (\|f/f4\| + \|f/f5\|)/(\|f/f1\| + \|f/f2\|) | 0.03 | V2 + V3 + V4 | 72.1 |
| f3/f4 | −0.15 | V1/N1 | 37.6 |
| \|f2\|/CT2 | 3.77 | V2/N2 | 17.8 |
| (R3 − R4)/(R3 + R4) | −1.25 | V3/N3 | 10.8 |
| (R5 + R6)/(R5 − R6) | −4.80 | V4/N4 | 15.9 |
| (R5 + R7)/(R5 − R7) | −1.32 | V5/N5 | 36.5 |
| (R9 + R10)/(R9 − R10) | 4.67 | Vmin | 18.2 |
| ΣCT/ΣAT | 1.42 | Y5R2/Y1R1 | 0.85 |
| (CT1 + CT2)/(CT4 + CT5) | 3.26 | Y3R2/Y4R1 | 1.06 |
| (CT1 + T12 + CT2 + T23 + CT3)/TL | 0.25 | tan(CRA) | 0.31 |

10th Embodiment

Figure 19:
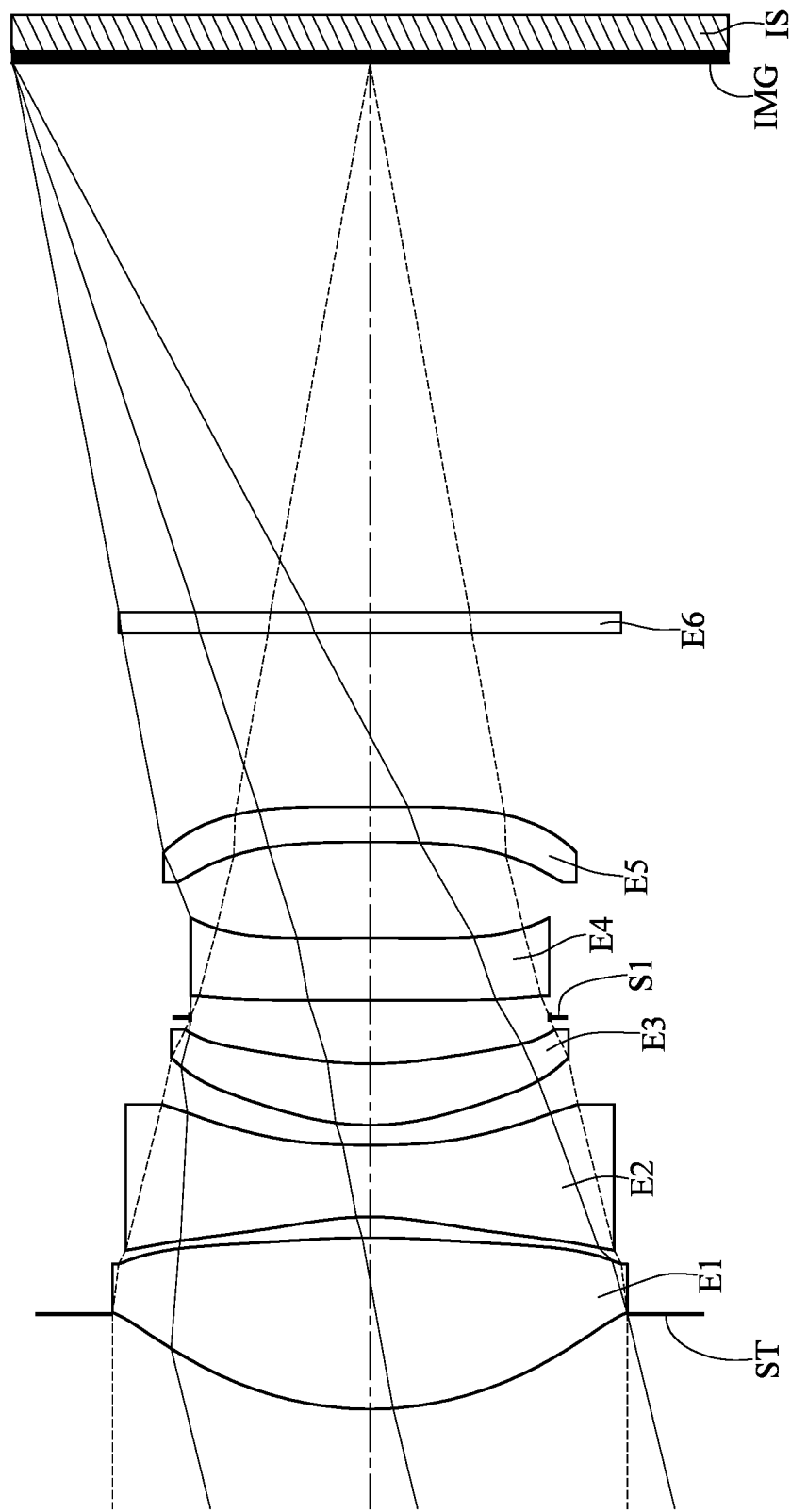
FIG. 19 is a schematic view of an image capturing unit according to the 10th embodiment of the present disclosure.
Figure 20:
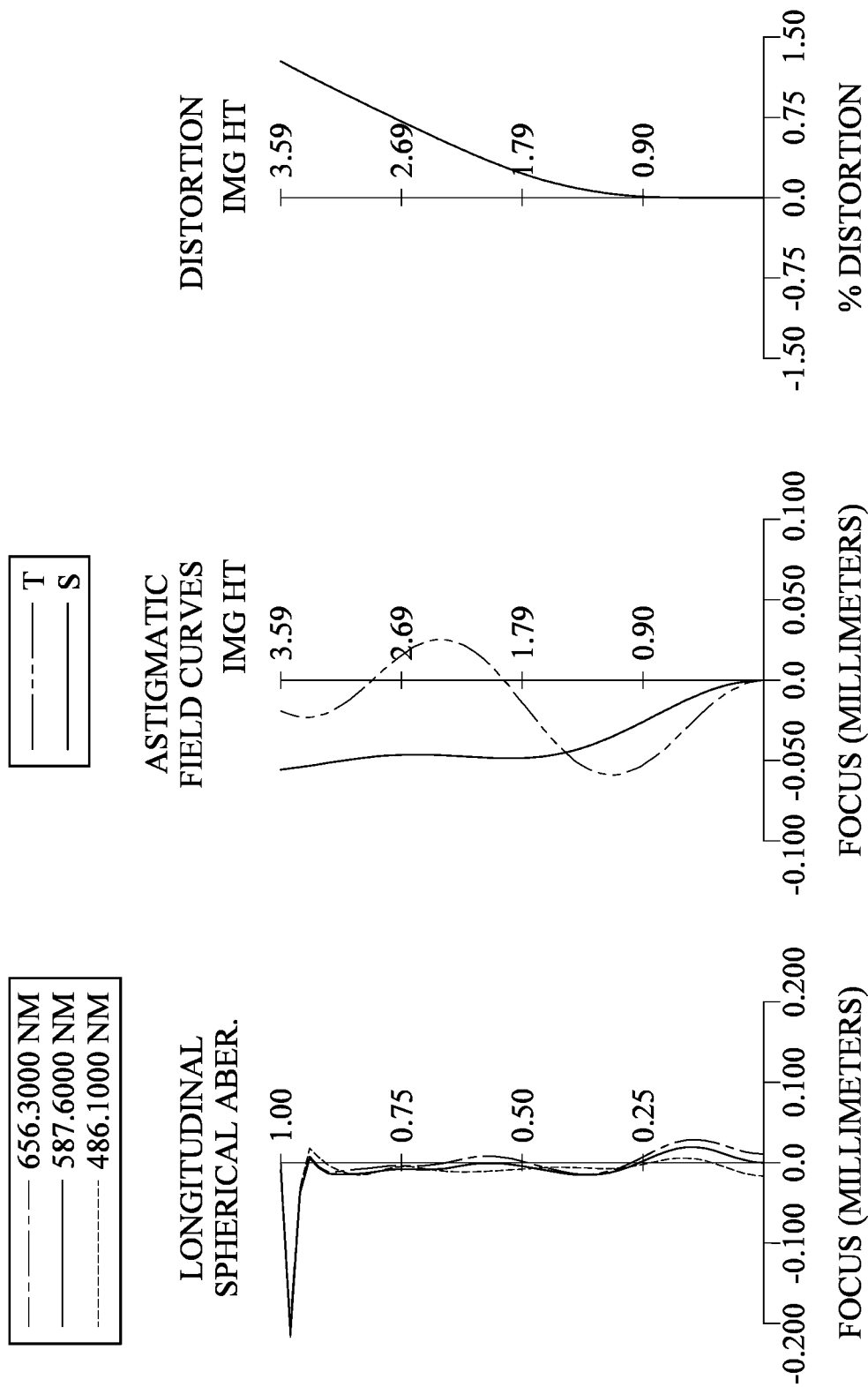
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a second lens element E2, a third lens element E3, a stop S1, a fourth lens element E4, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point. The image-side surface of the first lens element E1 has three inflection points.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has three inflection points. The image-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has one inflection point.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 10th embodiment are shown in Table 10A and the aspheric surface data are shown in Table 10B below.

TABLE 10A

10th Embodiment
f = 14.50 mm, Fno = 2.81, HFOV = 13.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.952 | | | | |
| 2 | Lens 1 | 3.3998 | (ASP) | 1.718 | Plastic | 1.545 | 56.1 | 4.93 |
| 3 | | −10.5518 | (ASP) | 0.208 | | | | |
| 4 | Lens 2 | −3.0012 | (ASP) | 0.720 | Plastic | 1.642 | 22.5 | −3.74 |
| 5 | | 13.0792 | (ASP) | 0.201 | | | | |
| 6 | Lens 3 | 2.6122 | (ASP) | 0.614 | Plastic | 1.697 | 16.3 | 9.75 |
| 7 | | 3.8329 | (ASP) | 0.465 | | | | |
| 8 | Stop | Plano | | 0.170 | | | | |
| 9 | Lens 4 | 73.3203 | (ASP) | 0.626 | Plastic | 1.614 | 26.0 | 67.54 |
| 10 | | −95.0480 | (ASP) | 0.963 | | | | |
| 11 | Lens 5 | −25.9782 | (ASP) | 0.350 | Plastic | 1.535 | 56.3 | −30.22 |
| 12 | | 42.9371 | (ASP) | 1.744 | | | | |
| 13 | Filter | Plano | | 0.210 | Glass | 1.517 | 64.2 | — |

TABLE 10A-continued

10th Embodiment
f = 14.50 mm, Fno = 2.81, HFOV = 13.7 deg.

| Surface # | | Curvature Radius | Thickness | Material | Index | Abbe # | Focal Length |
|---|---|---|---|---|---|---|---|
| 14 | | Plano | 5.506 | | | | |
| 15 | Image | Plano | — | | | | |

Note:
Reference wavelength is 587.6 nm (d-line).
An effective radius of the stop S1 (Surface 8) is 1.800 mm.

TABLE 10B

Aspheric Coefficients

| Surface # | 2 | 3 | 4 | 5 |
|---|---|---|---|---|
| k= | 1.3413200E−01 | 3.5983300E+00 | −2.7687800E+00 | 3.4472300E+01 |
| A4= | −2.8747164E−03 | −8.7365634E−03 | 5.5544358E−02 | 9.7151070E−02 |
| A6= | 3.8425385E−04 | 2.0666946E−02 | −1.5687850E−02 | −1.2446437E−01 |
| A8= | 1.2008757E−04 | −5.6723661E−03 | 8.5684186E−03 | 1.2507691E−01 |
| A10= | −2.8333182E−04 | −3.5841497E−03 | −8.2950658E−03 | −8.7063243E−02 |
| A12= | 1.4997972E−04 | 2.9306149E−03 | 4.3913421E−03 | 3.9264333E−02 |
| A14= | −4.3125285E−05 | −8.9359647E−04 | −1.2571513E−03 | −1.1178138E−02 |
| A16= | 7.0863271E−06 | 1.4176225E−04 | 2.0097868E−04 | 1.9330217E−03 |
| A18= | −6.2410911E−07 | −1.1625279E−05 | −1.6981690E−05 | −1.8529369E−04 |
| A20= | 2.2483814E−08 | 3.9041384E−07 | 5.9323170E−07 | 7.5497332E−06 |

| Surface # | 6 | 7 | 9 | 10 |
|---|---|---|---|---|
| k= | −6.0786900E−01 | 2.4654700E+00 | −9.0000000E+01 | −9.0000000E+01 |
| A4= | 2.2750383E−02 | −2.2852527E−02 | −1.3175141E−02 | −1.3765121E−03 |
| A6= | −9.1474921E−02 | −2.4469792E−02 | 1.9048986E−02 | 2.5477030E−02 |
| A8= | 8.6933317E−02 | 6.8021359E−03 | −3.0245166E−02 | −2.7765239E−02 |
| A10= | −4.4690548E−02 | 2.2919071E−02 | 4.3469181E−02 | 3.0130325E−02 |
| A12= | 1.1718372E−02 | −2.7652450E−02 | −3.6322269E−02 | −2.1983703E−02 |
| A14= | −5.7886457E−04 | 1.4786286E−02 | 1.7765297E−02 | 9.8784126E−03 |
| A16= | −4.5918701E−04 | −4.2886268E−03 | −5.1090194E−03 | −2.6612161E−03 |
| A18= | 1.0907774E−04 | 6.5973114E−04 | 8.0537437E−04 | 3.9785511E−04 |
| A20= | −7.7670512E−06 | −4.2563697E−05 | −5.4027674E−05 | −2.5543190E−05 |

| Surface # | 11 | 12 |
|---|---|---|
| k= | 9.0000000E+01 | −9.0000000E+01 |
| A4= | −4.0459830E−02 | −4.0500352E−02 |
| A6= | 8.0512953E−03 | 1.3066867E−02 |
| A8= | 5.7483166E−03 | −5.9604686E−03 |
| A10= | −9.8693070E−03 | 1.6577199E−03 |
| A12= | 6.2962536E−03 | −2.0916104E−04 |
| A14= | −2.2356774E−03 | −2.1917259E−05 |
| A16= | 4.5264260E−04 | 9.6858350E−06 |
| A18= | −4.7388148E−05 | −7.4598195E−07 |
| A20= | 1.9176555E−06 | −1.8331002E−08 |

In the 10th embodiment, the equation of the aspheric surface profiles of the aforementioned lens elements is the same as the equation of the 1st embodiment. Also, the definitions of these parameters shown in Table 10C are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE 10C

Schematic Parameters

| f [mm] | 14.50 | CT3/CT1 | 0.36 |
|---|---|---|---|
| Fno | 2.81 | CT3/T34 | 0.97 |
| HFOV [deg.] | 13.7 | CT4/CT2 | 0.87 |
| TL/ImgH | 3.76 | CT4/T34 | 0.99 |

TABLE 10C-continued

Schematic Parameters

| TD/BL | 0.81 | (T34 + T45)/T23 | 7.95 |
|---|---|---|---|
| SD/TD | 0.84 | T12/CT2 | 0.29 |
| (\|f/f4\| + \|f/f5\|)/(\|f/f1\| + \|f/f2\|) | 0.10 | V2 + V3 + V4 | 64.8 |
| f3/f4 | 0.14 | V1/N1 | 36.3 |
| \|f2\|/CT2 | 5.19 | V2/N2 | 13.7 |
| (R3 − R4)/(R3 + R4) | −1.60 | V3/N3 | 9.6 |
| (R5 + R6)/(R5 − R6) | −5.28 | V4/N4 | 16.1 |
| (R5 + R7)/(R5 − R7) | −1.07 | V5/N5 | 36.7 |
| (R9 + R10)/(R9 − R10) | −0.25 | Vmin | 16.3 |
| ΣCT/ΣAT | 2.01 | Y5R2/Y1R1 | 0.80 |
| (CT1 + CT2)/(CT4 + CT5) | 2.50 | Y3R2/Y4R1 | 1.03 |
| (CT1 + T12 + CT2 + T23 + CT3)/TL | 0.26 | tan(CRA) | 0.33 |

11th Embodiment

Figure 21:
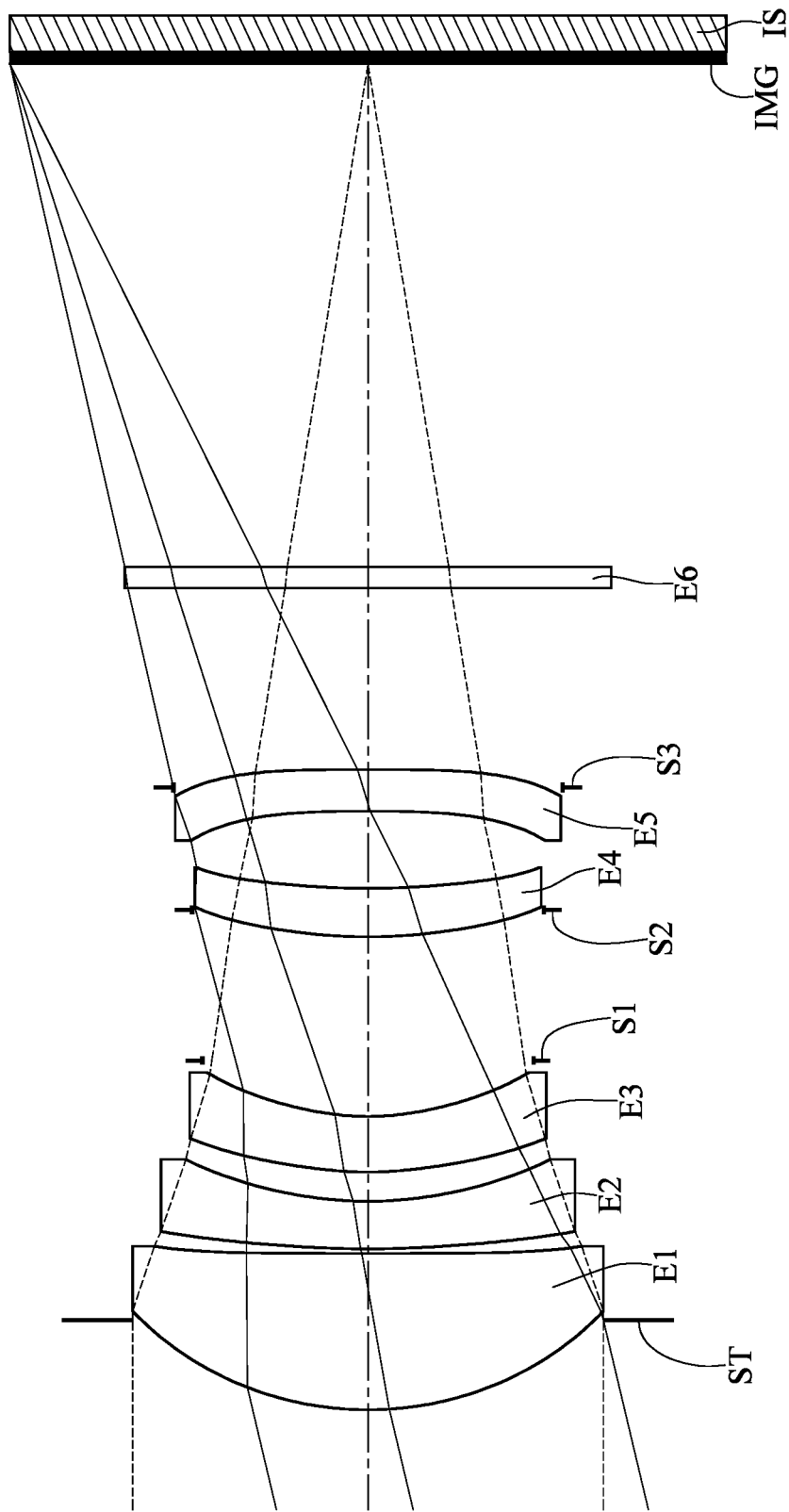
FIG. 21 is a schematic view of an image capturing unit according to the 11th embodiment of the present disclosure.
Figure 22:
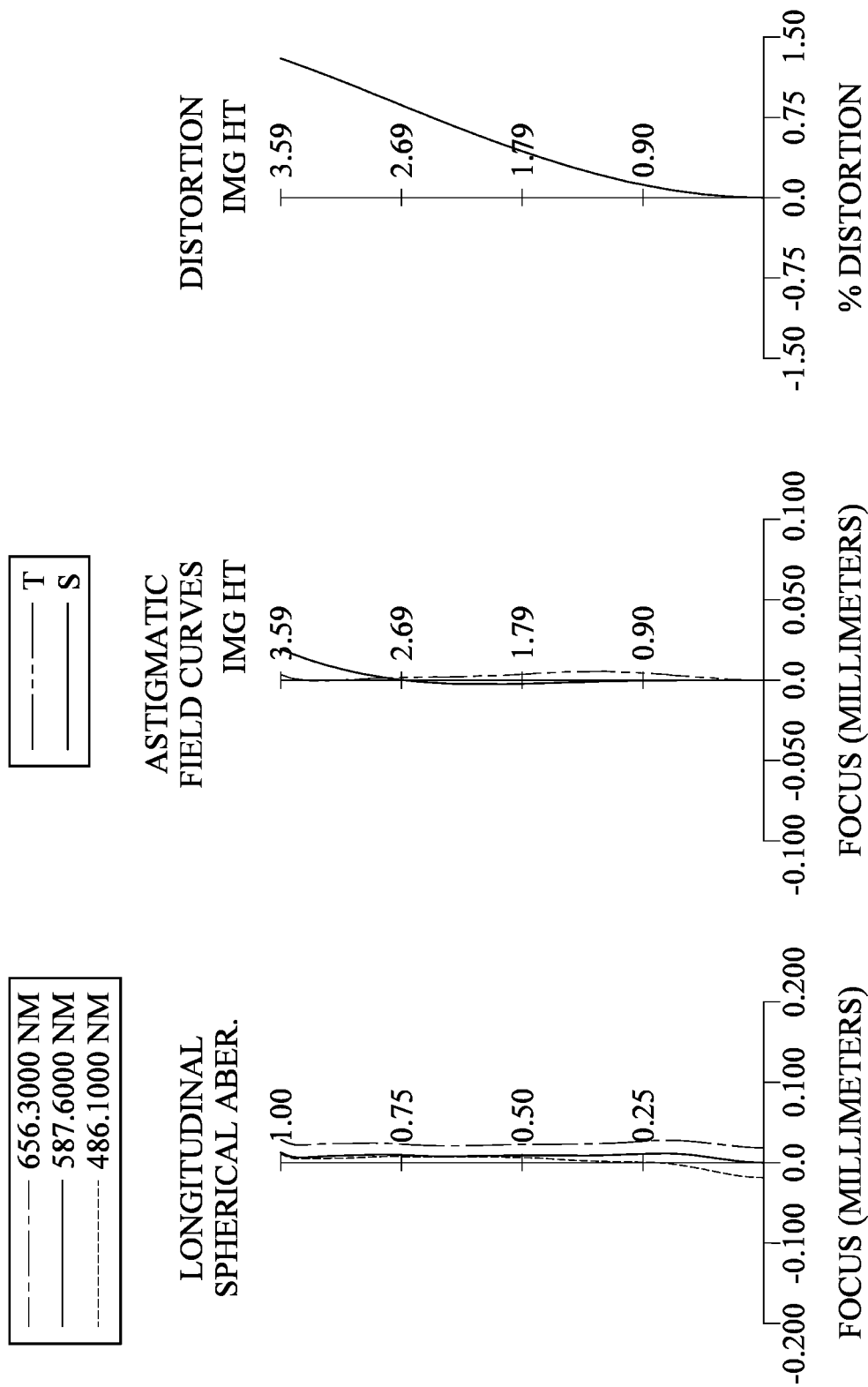
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit 11 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a second lens element E2, a third lens element E3, a stop S1, a stop S2, a fourth lens element E4, a fifth lens element E5, a stop S3, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric.

The filter E6 is made of glass material and located between the stop S3 and the image surface IMG, and will not affect the focal length of the photographing optical lens assembly. The image sensor IS is disposed on or near the image surface IMG of the photographing optical lens assembly.

The detailed optical data of the 11th embodiment are shown in Table 11A and the aspheric surface data are shown in Table 11B below.

TABLE 11A

11th Embodiment
f = 14.88 mm, Fno = 3.15, HFOV = 13.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.900 | | | | |
| 2 | Lens 1 | 3.3554 (ASP) | 1.568 | Plastic | 1.545 | 56.1 | 6.33 |
| 3 | | 99.9989 (ASP) | 0.045 | | | | |
| 4 | Lens 2 | 9.0592 (ASP) | 0.476 | Plastic | 1.639 | 23.5 | −8.98 |
| 5 | | 3.4396 (ASP) | 0.294 | | | | |
| 6 | Lens 3 | 3.4254 (ASP) | 0.558 | Plastic | 1.587 | 28.3 | −23.77 |
| 7 | | 2.5847 (ASP) | 0.560 | | | | |
| 8 | Stop | Plano | 1.511 | | | | |
| 9 | Stop | Plano | −0.270 | | | | |
| 10 | Lens 4 | 5.0942 (ASP) | 0.486 | Plastic | 1.669 | 19.5 | 20.79 |
| 11 | | 7.7311 (ASP) | 0.774 | | | | |
| 12 | Lens 5 | −20.0938 (ASP) | 0.416 | Plastic | 1.544 | 56.0 | −45.03 |
| 13 | | −112.5868 (ASP) | −0.178 | | | | |
| 14 | Stop | Plano | 2.000 | | | | |
| 15 | Filter | Plano | 0.210 | Glass | 1.517 | 64.2 | — |
| 16 | | Plano | 5.048 | | | | |
| 17 | Image | Plano | — | | | | |

Note:
Reference wavelength is 587.6 nm (d-line).
An effective radius of the stop S1 (Surface 8) is 1.659 mm.
An effective radius of the stop S2 (Surface 9) is 1.761 mm.
An effective radius of the stop S3 (Surface 14) is 1.950 mm.

TABLE 11B

Aspheric Coefficients

| Surface # | 2 | 3 | 4 | 5 |
|---|---|---|---|---|
| k= | 4.9540000E−01 | 5.0000000E+01 | 0.0000000E+00 | −9.7860600E−01 |
| A4= | −1.2667838E−03 | −7.1084548E−03 | −2.5392612E−02 | −4.9448825E−02 |
| A6= | −3.6309049E−04 | 1.0079891E−02 | 2.6799543E−02 | 5.4987774E−02 |
| A8= | 5.1369488E−05 | −7.5482877E−03 | −1.9650368E−02 | −3.9244931E−02 |
| A10= | −1.3022868E−05 | 3.9554757E−03 | 9.7114201E−03 | 1.9584644E−02 |
| A12= | 3.4249123E−06 | −1.3069716E−03 | −3.1295599E−03 | −6.6458716E−03 |
| A14= | −1.1936900E−06 | 2.5888116E−04 | 6.2163047E−04 | 1.3883493E−03 |
| A16= | 2.1893963E−07 | −2.8137720E−05 | −6.8503637E−05 | −1.5101794E−04 |
| A18= | −1.7472975E−08 | 1.2919757E−06 | 3.2002444E−06 | 6.0123081E−06 |

| Surface # | 6 | 7 | 10 | 11 |
|---|---|---|---|---|
| k= | −5.0940300E+00 | −5.5544800E+00 | −2.1350500E+01 | −4.2550700E+01 |
| A4= | −5.5229964E−02 | −1.2640661E−02 | 8.6704876E−03 | 1.0513213E−03 |
| A6= | 5.1550634E−02 | 2.0813983E−02 | −3.8203589E−03 | −2.5504605E−04 |
| A8= | −2.8521206E−02 | −1.1027236E−02 | 2.7718981E−03 | 1.0809568E−03 |
| A10= | 1.2020055E−02 | 5.2750438E−03 | −7.1560313E−04 | 1.3174088E−04 |
| A12= | −3.6813239E−03 | −1.9674115E−03 | 1.4056691E−04 | −1.3008638E−04 |
| A14= | 6.8627738E−04 | 4.5892276E−04 | −1.9832966E−05 | 3.3336428E−05 |
| A16= | −5.5607254E−05 | −4.7882473E−05 | 1.0423942E−06 | −3.9448102E−06 |

| Surface # | 12 | 13 |
|---|---|---|
| k= | 0.0000000E+00 | −7.4693000E+01 |
| A4= | −2.2128217E−02 | −1.7625442E−02 |
| A6= | −2.1683081E−04 | −3.8056726E−04 |
| A8= | 6.8593793E−04 | 8.0799828E−04 |
| A10= | −2.7760005E−04 | −4.1169722E−04 |
| A12= | 8.5947605E−05 | 1.1295712E−04 |
| A14= | −2.5632333E−05 | −2.0985969E−05 |
| A16= | 2.1912323E−06 | 1.6469828E−06 |

In the 11th embodiment, the equation of the aspheric surface profiles of the aforementioned lens elements is the same as the equation of the 1st embodiment. Also, the definitions of these parameters shown in Table 11C are the same as those stated in the 1st embodiment with corresponding values for the 11th embodiment, so an explanation in this regard will not be provided again.

Moreover, these parameters can be calculated from Table 11A and Table 11B as the following values and satisfy the following conditions:

TABLE 11C

Schematic Parameters

| f [mm] | 14.88 | CT3/CT1 | 0.36 |
|---|---|---|---|
| Fno | 3.15 | CT3/T34 | 0.31 |
| HFOV [deg.] | 13.4 | CT4/CT2 | 1.02 |
| TL/ImgH | 3.77 | CT4/T34 | 0.27 |
| TD/BL | 0.91 | (T34 + T45)/T23 | 8.76 |
| SD/TD | 0.86 | T12/CT2 | 0.09 |
| (\|f/f4\| + \|f/f5\|)/(\|f/f1\| + \|f/f2\|) | 0.26 | V2 + V3 + V4 | 71.3 |
| f3/f4 | −1.14 | V1/N1 | 36.3 |
| \|f2\|/CT2 | 18.86 | V2/N2 | 14.3 |
| (R3 − R4)/(R3 + R4) | 0.45 | V3/N3 | 17.8 |
| (R5 + R6)/(R5 − R6) | 7.15 | V4/N4 | 11.7 |
| (R5 + R7)/(R5 − R7) | −5.11 | V5/N5 | 36.3 |
| (R9 + R10)/(R9 − R10) | −1.43 | Vmin | 19.5 |
| ΣCT/ΣAT | 1.20 | Y5R2/Y1R1 | 0.82 |
| (CT1 + CT2)/(CT4 + CT5) | 2.27 | Y3R2/Y4R1 | 0.94 |
| (CT1 + T12 + CT2 + T23 + CT3)/TL | 0.22 | tan(CRA) | 0.32 |

12th Embodiment

Figure 23:
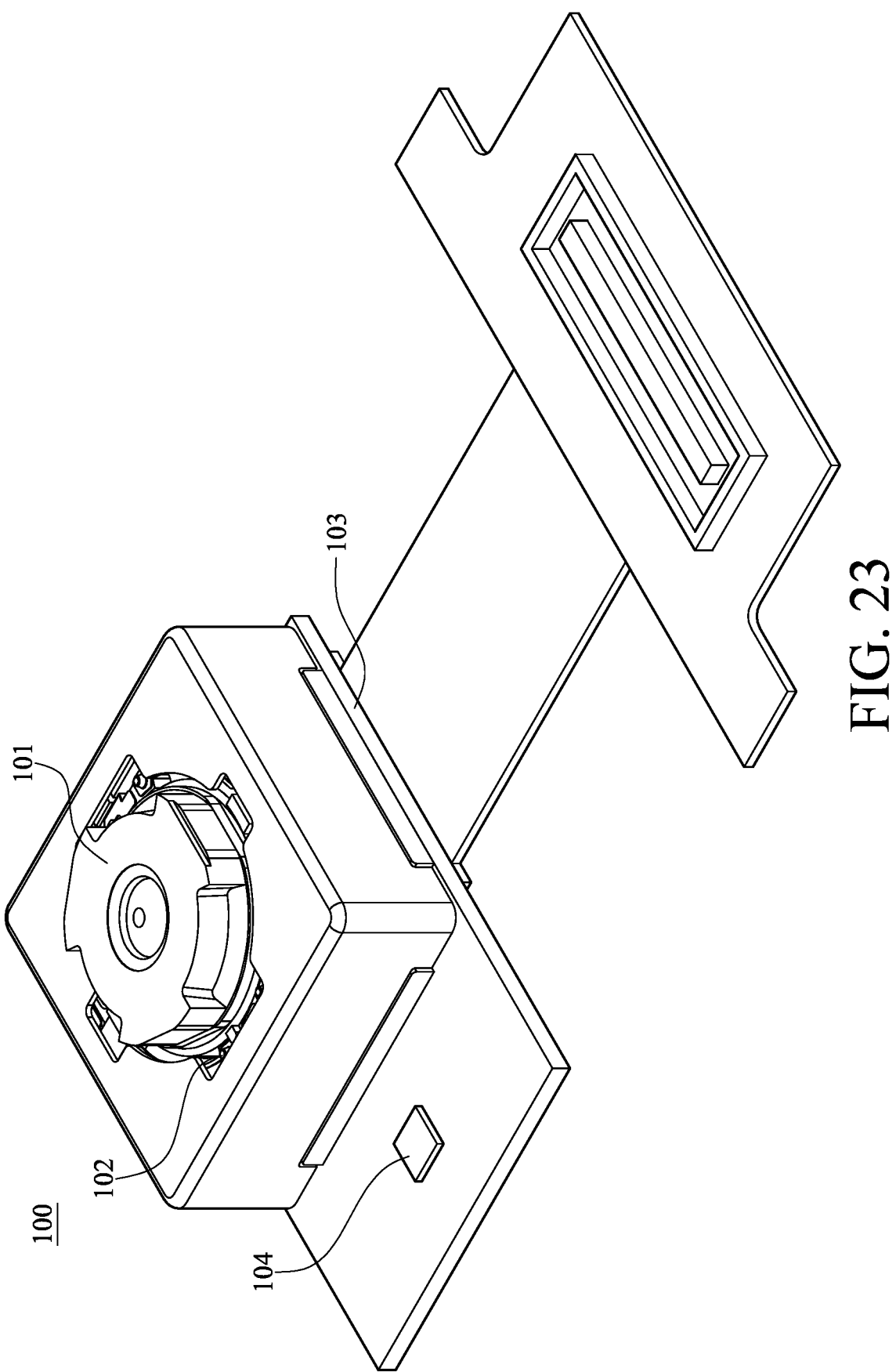
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 100 is a camera module including a lens unit 101, a driving device 102, an image sensor 103 and an image stabilizer 104. The lens unit 101 includes the photographing optical lens assembly disclosed in the 1st embodiment, a barrel and a holder member (their reference numerals are omitted) for holding the photographing optical lens assembly. However, the lens unit 101 may alternatively be provided with the photographing optical lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the photographing optical lens assembly to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

13th Embodiment

Figure 24:
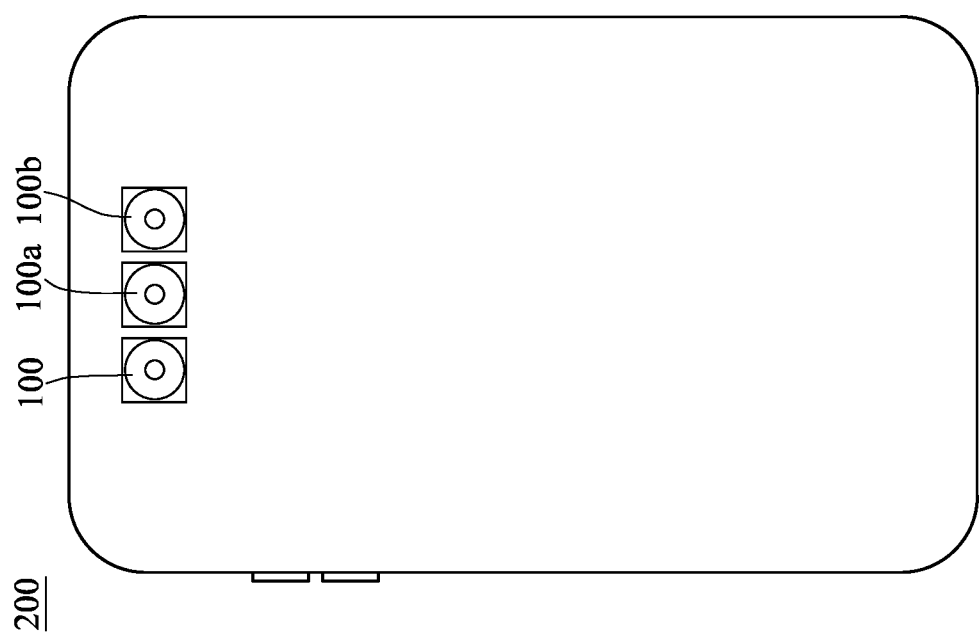
FIG. 24 is one perspective view of an electronic device according to the 13th embodiment of the present disclosure.
Figure 25:
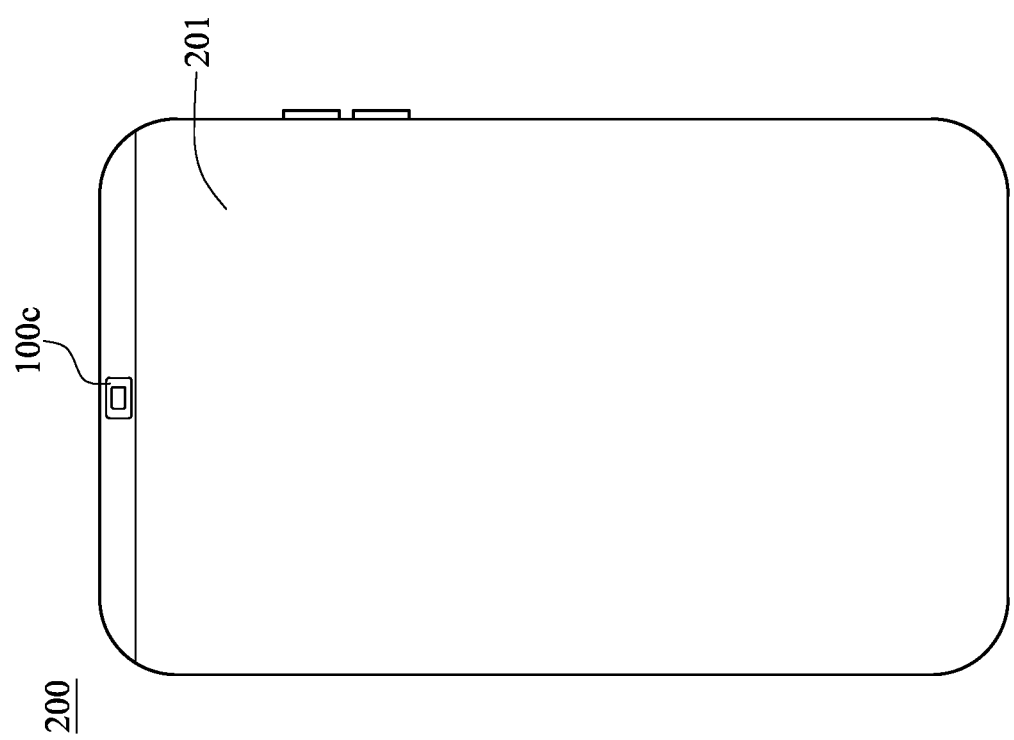
FIG. 25 is another perspective view of the electronic device in FIG. 24.

FIG. 24 is one perspective view of an electronic device according to the 13th embodiment of the present disclosure. FIG. 25 is another perspective view of the electronic device in FIG. 24.

In this embodiment, an electronic device 200 is a smartphone including the image capturing unit 100 disclosed in the 12th embodiment, an image capturing unit 100a, an image capturing unit 100b, an image capturing unit 100c and a display unit 201. As shown in FIG. 24, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 25, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the photographing optical lens assembly of the present disclosure and can have a configuration similar to that of the image capturing unit 100. In detail, each of the image capturing units 100a, 100b and 100c can include a lens unit, a driving device, an image sensor and an image stabilizer, and each of the lens unit can include an optical lens assembly such as the photographing optical lens assembly of the present disclosure, a barrel and a holder member for holding the photographing optical lens assembly.

The image capturing unit 100 is a telephoto image capturing unit, the image capturing unit 100a is a wide-angle image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 25, the image capturing unit 100c can have a non-circular opening, and the lens barrel or the lens elements in the image capturing unit 100c can have one or more trimmed edges at outer diameter positions thereof for corresponding to the non-circular opening. Therefore, it is favorable for further reducing the length of the image capturing unit 100c along single axis, thereby reducing the overall size of the lens, increasing the area ratio of the display unit 201 with respect to the electronic device 200, reducing the thickness of the electronic device 200, and achieving compactness of the overall module. In this embodiment, the electronic device 200 includes multiple image capturing units 100, 100a, 100b and 100c, but the present disclosure is not limited to the number and arrangement of image capturing units.

14th Embodiment

Figure 26:
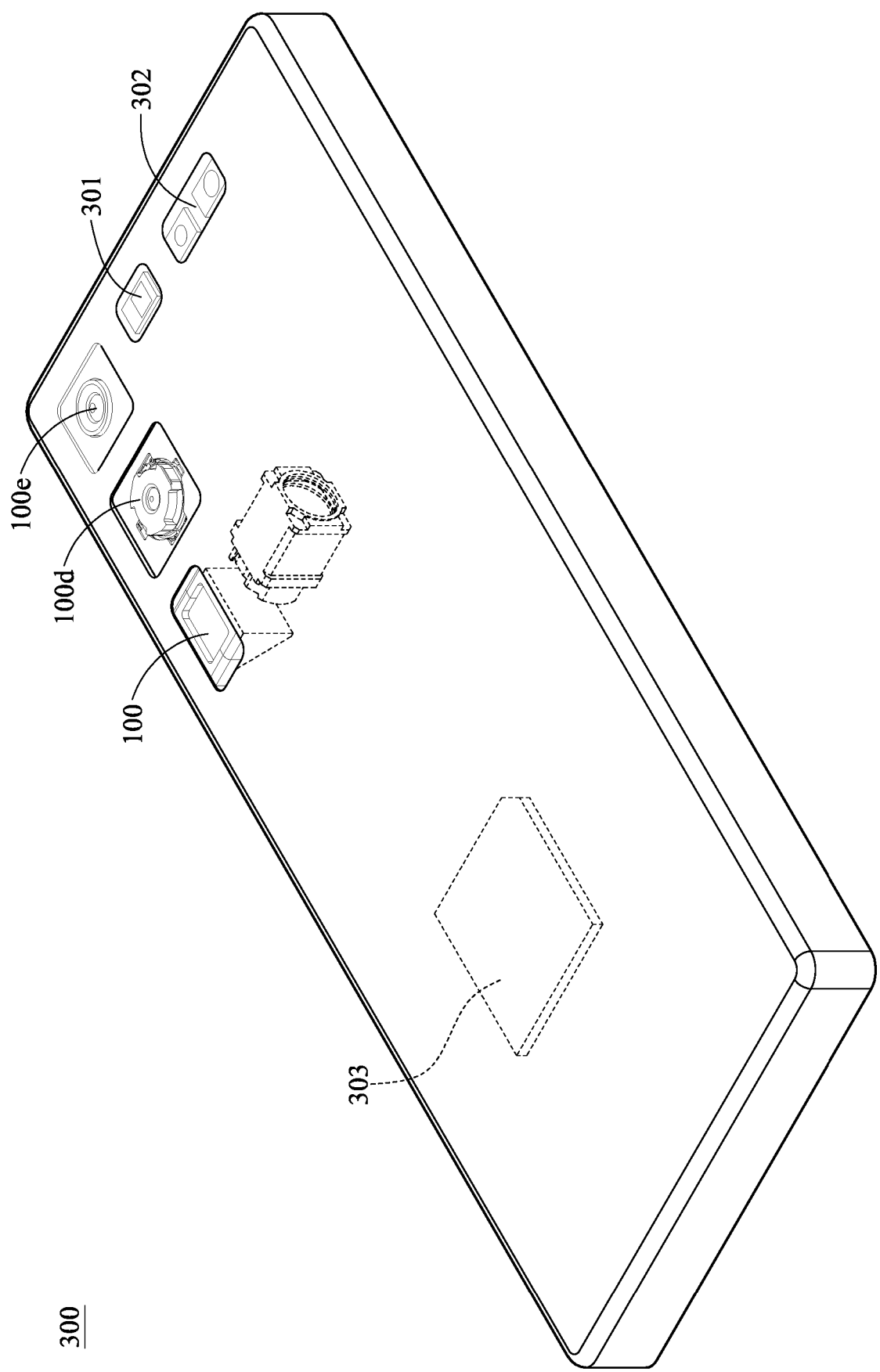
FIG. 26 is one perspective view of an electronic device according to the 14th embodiment of the present disclosure.
Figure 27:
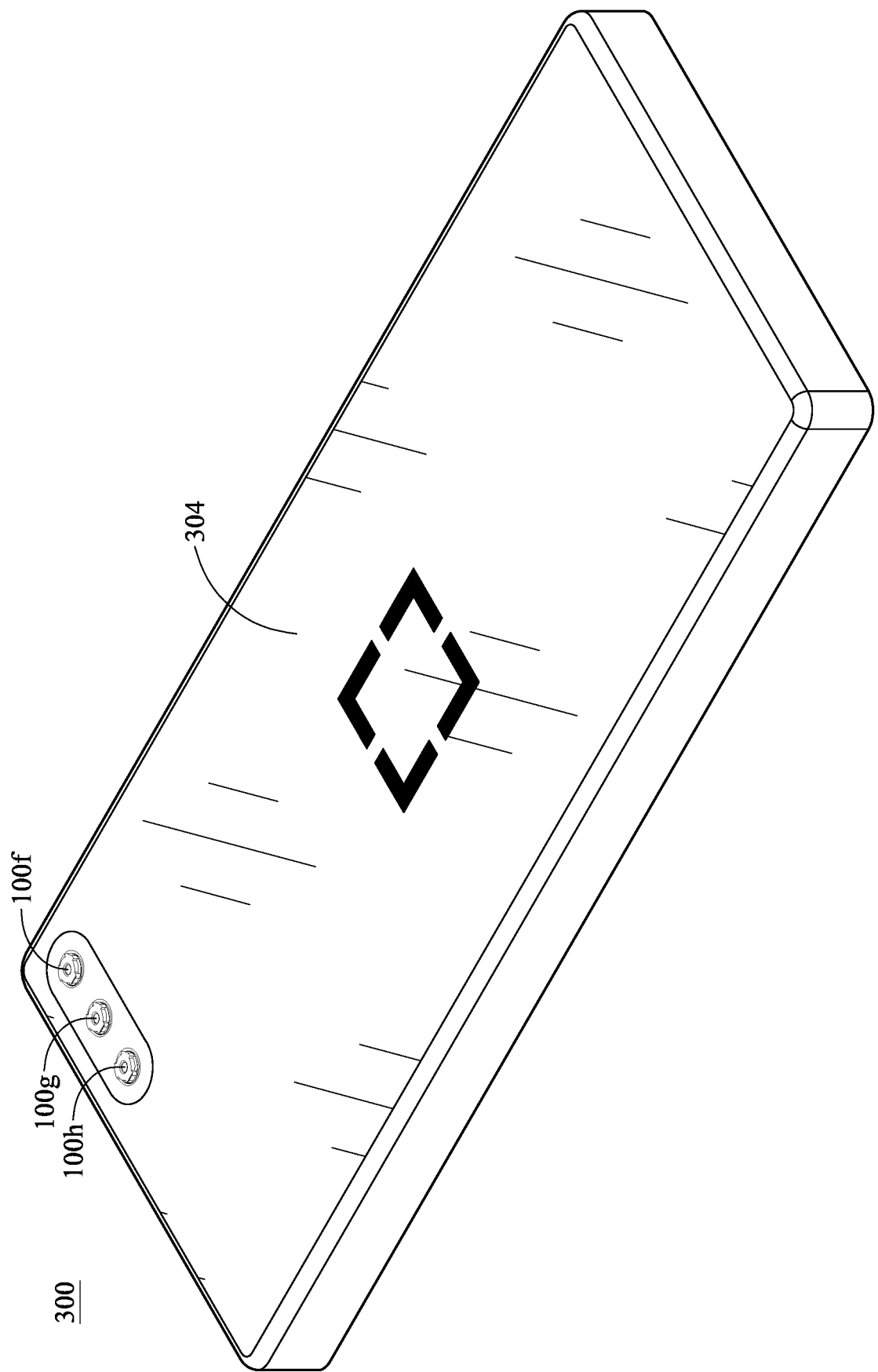
FIG. 27 is another perspective view of the electronic device in FIG. 26.
Figure 28:
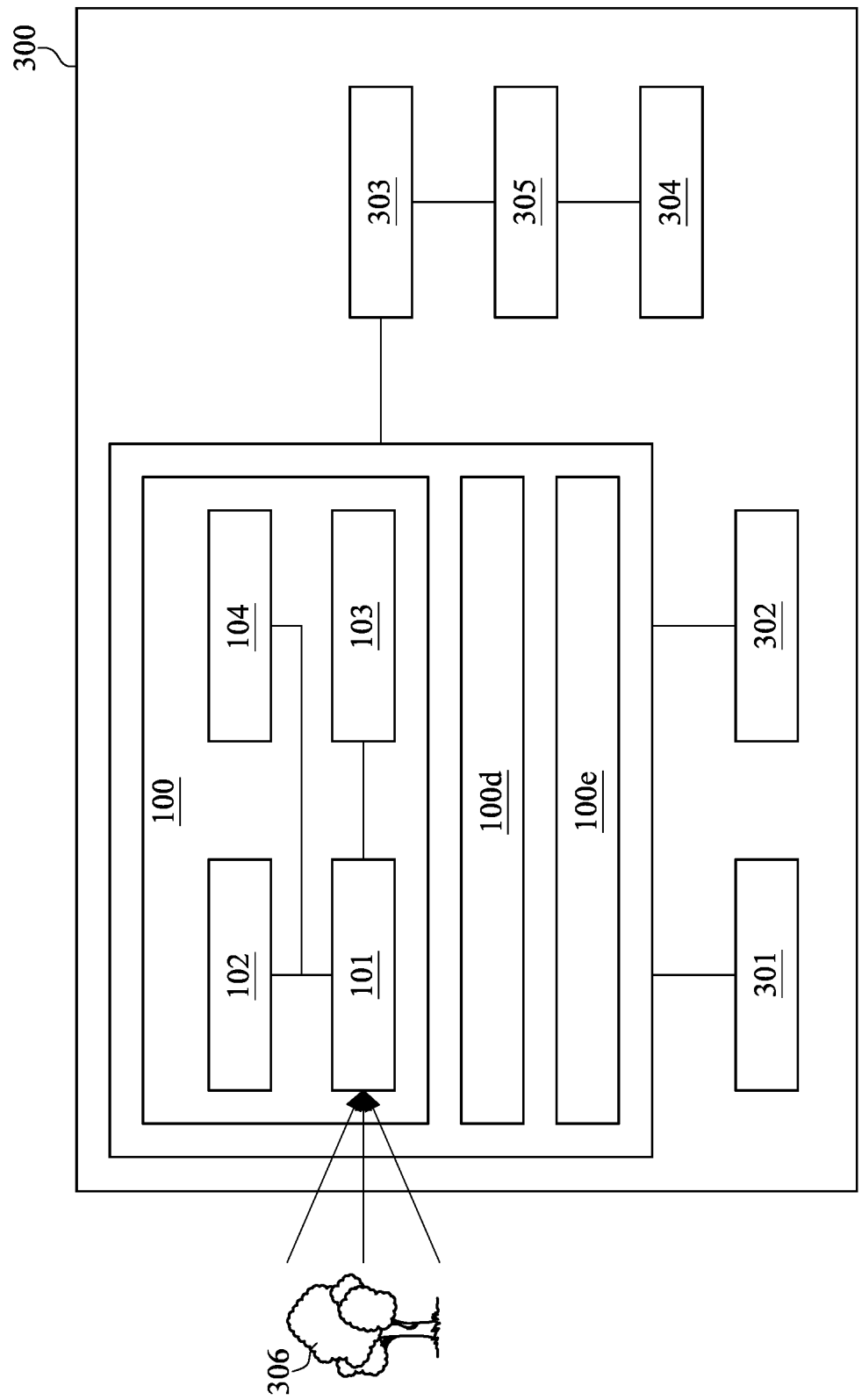
FIG. 28 is a block diagram of the electronic device in FIG. 26.

FIG. 26 is one perspective view of an electronic device according to the 14th embodiment of the present disclosure. FIG. 27 is another perspective view of the electronic device in FIG. 26. FIG. 28 is a block diagram of the electronic device in FIG. 26.

In this embodiment, an electronic device 300 is a smartphone including the image capturing unit 100 disclosed in the 12th embodiment, an image capturing unit 100d, an image capturing unit 100e, an image capturing unit 100f, an image capturing unit 100g, an image capturing unit 100h, a flash module 301, a focus assist module 302, an image signal processor 303, a display module 304 and an image software processor 305. The image capturing unit 100, the image capturing unit 100d and the image capturing unit 100e are disposed on the same side of the electronic device 300. The focus assist module 302 can be a laser rangefinder or a ToF (time of flight) module, but the present disclosure is not limited thereto. The image capturing unit 100f, the image capturing unit 100g, the image capturing unit 100h and the display module 304 are disposed on the opposite side of the electronic device 300, and the display module 304 can be a user interface, such that the image capturing units 100f, 100g, 100h can be front-facing cameras of the electronic device 300 for taking selfies, but the present disclosure is not limited thereto. Furthermore, each of the image capturing units 100d, 100e, 100f, 100g and 100h can include the photographing optical lens assembly of the present disclosure and can have a configuration similar to that of the image capturing unit 100. In detail, each of the image capturing units 100d, 100e, 100f, 100g and 100h can include a lens unit, a driving device, an image sensor and an image stabilizer, and each of the lens unit can include an optical lens assembly such as the photographing optical lens assembly of the present disclosure, a barrel and a holder member for holding the photographing optical lens assembly.

The image capturing unit 100 is a telephoto image capturing unit, the image capturing unit 100d is a wide-angle image capturing unit, the image capturing unit 100e is an ultra-wide-angle image capturing unit, the image capturing unit 100f is a wide-angle image capturing unit, the image capturing unit 100g is an ultra-wide-angle image capturing unit, and the image capturing unit 100h is a ToF image capturing unit. In this embodiment, the image capturing units 100, 100d and 100e have different fields of view, such that the electronic device 300 can have various magnification ratios so as to meet the requirement of optical zoom functionality. Moreover, the image capturing unit 100 can be a telephoto image capturing unit having an optical path folding element configuration such as a reflective element configuration, such that the total track length of the image capturing unit 100 is not limited by the thickness of the electronic device 300. Moreover, the optical path folding element configuration of the image capturing unit 100 can be similar to, for example, one of the structures shown in FIG. 32 to FIG. 36, which can be referred to foregoing descriptions corresponding to FIG. 32 to FIG. 36, and the details in this regard will not be provided again. In addition, the image capturing unit 100h can determine depth information of the imaged object. In this embodiment, the electronic device 300 includes multiple image capturing units 100, 100d, 100e, 100f, 100g and 100h, but the present disclosure is not limited to the number and arrangement of image capturing units.

When a user captures images of an object 306, the light rays converge in the image capturing unit 100, the image capturing unit 100d or the image capturing unit 100e to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100f, 100g or 100h to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

15th Embodiment

Figure 29:
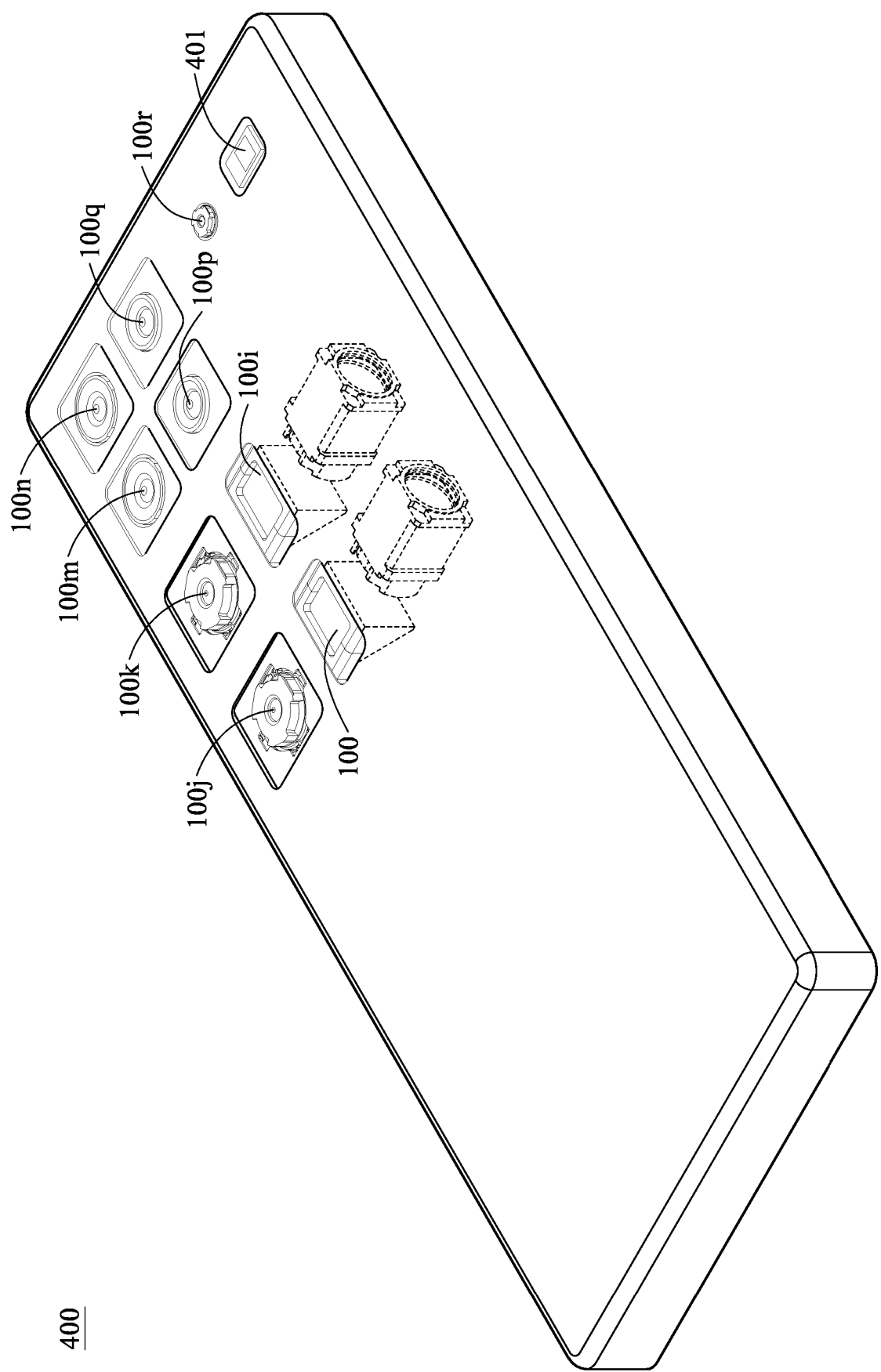
FIG. 29 is one perspective view of an electronic device according to the 15th embodiment of the present disclosure.

FIG. 29 is one perspective view of an electronic device according to the 15th embodiment of the present disclosure.

In this embodiment, an electronic device 400 is a smartphone including the image capturing unit 100 disclosed in the 12th embodiment, an image capturing unit 100i, an image capturing unit 100j, an image capturing unit 100k, an image capturing unit 100m, an image capturing unit 100n, an image capturing unit 100p, an image capturing unit 100q, an image capturing unit 100r, a flash module 401, a focus assist module, an image signal processor, a display module and an image software processor (not shown). The image capturing units 100, 100i, 100j, 100k, 100m, 100n, 100p, 100q and 100r are disposed on the same side of the electronic device 400, while the display module is disposed on the opposite side of the electronic device 400. Furthermore, each of the image capturing units 100i, 100j, 100k, 100m, 100n, 100p, 100q and 100r can include the photographing optical lens assembly of the present disclosure and can have a configuration similar to that of the image capturing unit 100, and the details in this regard will not be provided again.

The image capturing unit 100 is a telephoto image capturing unit, the image capturing unit 100i is a telephoto image capturing unit, the image capturing unit 100j is a wide-angle image capturing unit, the image capturing unit 100k is a wide-angle image capturing unit, the image capturing unit 100m is an ultra-wide-angle image capturing unit, the image capturing unit 100n is an ultra-wide-angle image capturing unit, the image capturing unit 100p is a telephoto image capturing unit, the image capturing unit 100q is a telephoto image capturing unit, and the image capturing unit 100r is a ToF image capturing unit. In this embodiment, the image capturing units 100, 100i, 100j, 100k, 100m, 100n, 100p, and 100q have different fields of view, such that the electronic device 400 can have various magnification ratios so as to meet the requirement of optical zoom functionality. Moreover, each of the image capturing units 100 and 100i can be a telephoto image capturing unit having an optical path folding element configuration such as a reflective element configuration. Moreover, the optical path folding element configuration of each of the image capturing unit 100 and 100i can be similar to, for example, one of the structures shown in FIG. 32 to FIG. 36, which can be referred to foregoing descriptions corresponding to FIG. 32 to FIG. 36, and the details in this regard will not be provided again. In addition, the image capturing unit 100r can determine depth information of the imaged object. In this embodiment, the electronic device 400 includes multiple image capturing units 100, 100i, 100j, 100k, 100m, 100n, 100p, 100q and 100r, but the present disclosure is not limited to the number and arrangement of image capturing units. When a user captures images of an object, the light rays converge in the image capturing unit 100, 100i, 100j, 100k, 100m, 100n, 100p, 100q or 100r to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the photographing optical lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-11C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising five lens elements, the five lens elements being, in order from an object side to an image side along an optical path, a first lens element, a second lens element, a third lens element, a fourth lens element and a fifth lens element;
wherein a total number of lens elements of the photographing optical lens assembly is five, the first lens element has positive refractive power, and the second lens element has negative refractive power;
wherein an Abbe number of the second lens element is V2, an Abbe number of the third lens element is V3, an Abbe number of the fourth lens element is V4, a sum of central thicknesses of all lens elements of the photographing optical lens assembly is ΣCT, a sum of axial distances between each of all adjacent lens elements of the photographing optical lens assembly is ΣAT, a central thickness of the first lens element is CT1, a central thickness of the second lens element is CT2, a central thickness of the fourth lens element is CT4, a central thickness of the fifth lens element is CT5, an axial distance between an object-side surface of the first lens element and an image-side surface of the fifth lens element is TD, an axial distance between the image-side surface of the fifth lens element and an image surface is BL, an axial distance between the object-side surface of the first lens element and the image surface is TL, a maximum image height of the photographing optical lens assembly is ImgH, an axial distance between the third lens element and the fourth lens element is T34, and the following conditions are satisfied:

30<$V2+V3+V4$<93;

0.5<$\Sigma CT/\Sigma AT$<2.5;

1.8<$(CT1+CT2)/(CT4+CT5)$<5.0;

0.1<$TD/BL$<1.1;

1.0<$TL/\mathrm{Img}H$<4.2; and 0.01<$CT4/T34$<4.0.

2. The photographing optical lens assembly of claim 1, wherein the Abbe number of the second lens element is V2, the Abbe number of the third lens element is V3, the Abbe number of the fourth lens element is V4, and the following condition is satisfied:

50<$V2+V3+V4$<90.

3. The photographing optical lens assembly of claim 1, wherein the axial distance between the object-side surface of the first lens element and the image surface is TL, the maximum image height of the photographing optical lens assembly is ImgH, and the following condition is satisfied:

3.0<$TL/\mathrm{Img}H$<4.0.

4. The photographing optical lens assembly of claim 1, wherein the central thickness of the fourth lens element is CT4, the axial distance between the third lens element and the fourth lens element is T34, and the following condition is satisfied:

0.1<$CT4/T34$<2.5.

5. The photographing optical lens assembly of claim 1, wherein a curvature radius of an object-side surface of the third lens element is R5, a curvature radius of an image-side surface of the third lens element is R6, and the following condition is satisfied:

$(R5+R6)/(R5-R6)$<−1.5.

6. The photographing optical lens assembly of claim 1, wherein a curvature radius of an object-side surface of the third lens element is R5, a curvature radius of an object-side surface of the fourth lens element is R7, and the following condition is satisfied:

−15.0<$(R5+R7)/(R5-R7)$<0.6.

7. The photographing optical lens assembly of claim 1, wherein a curvature radius of an object-side surface of the fifth lens element is R9, a curvature radius of the image-side surface of the fifth lens element is R10, and the following condition is satisfied:

−0.5<$(R9+R10)/(R9-R10)$<13.0.

8. The photographing optical lens assembly of claim 1, wherein a focal length of the second lens element is f2, the central thickness of the second lens element is CT2, and the following condition is satisfied:

3.2<$|f2|/CT2$<27.5.

9. The photographing optical lens assembly of claim 1, further comprising an aperture stop, wherein the central thickness of the first lens element is CT1, the central thickness of the second lens element is CT2, a central thickness of the third lens element is CT3, an axial distance between the first lens element and the second lens element is T12, an axial distance between the second lens element and the third lens element is T23, the axial distance between the object-side surface of the first lens element and the image surface is TL, an axial distance between the aperture stop and the image-side surface of the fifth lens element is SD, the axial distance between the object-side surface of the first lens element and the image-side surface of the fifth lens element is TD, and the following conditions are satisfied:

0.15<$(CT1+T12+CT2+T23+CT3)/TL$<0.32; and 0.35<$SD/TD$<0.95.

10. The photographing optical lens assembly of claim 1, wherein a focal length of the third lens element is f3, a focal length of the fourth lens element is f4, and the following condition is satisfied:

−0.45<$f3/f4$<3.0.

11. The photographing optical lens assembly of claim 1, wherein the central thickness of the second lens element is CT2, the central thickness of the fourth lens element is CT4, and the following condition is satisfied:

0.1<$CT4/CT2$<1.2.

12. The photographing optical lens assembly of claim 1, wherein a minimum value among Abbe numbers of all lens elements of the photographing optical lens assembly is Vmin, and the following condition is satisfied:

$V\min$<20.

13. The photographing optical lens assembly of claim 1, wherein a chief ray angle at a maximum image height position of the photographing optical lens assembly is CRA, and the following condition is satisfied:

0.25<$\tan(CRA)$<0.45.

14. The photographing optical lens assembly of claim 1, further comprising a reflective element located between an imaged object and the image surface.

15. The photographing optical lens assembly of claim 14, wherein the reflective element is located at an object side of the object-side surface of the first lens element or at an image side of the image-side surface of the fifth lens element.

16. An image capturing unit, comprising:
the photographing optical lens assembly of claim 1; and
an image sensor disposed on the image surface of the photographing optical lens assembly.

17. An electronic device, comprising:
the image capturing unit of claim 16.

18. A photographing optical lens assembly comprising five lens elements, the five lens elements being, in order from an object side to an image side along an optical path, a first lens element, a second lens element, a third lens element, a fourth lens element and a fifth lens element;
wherein a total number of lens elements of the photographing optical lens assembly is five, the first lens element has positive refractive power, the second lens element has negative refractive power, and the third lens element has an image-side surface being concave in a paraxial region thereof,
wherein an Abbe number of the second lens element is V2, an Abbe number of the third lens element is V3, an Abbe number of the fourth lens element is V4, a sum of central thicknesses of all lens elements of the photographing optical lens assembly is ΣCT, a sum of axial distances between each of all adjacent lens elements of the photographing optical lens assembly is ΣAT, a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between an object-side surface of the first lens element and an image-side surface of the fifth lens element is TD, an axial distance between the image-side surface of the fifth lens element and an image surface is BL, a focal length of the photographing optical lens assembly is f, a focal length of the first lens element is f1, a focal length of the second lens element is f2, a focal length of the fourth lens element is f4, a focal length of the fifth lens element is f5, and the following conditions are satisfied:

$30 < V2+V3+V4 < 93;$ $0.5 < \Sigma CT/\Sigma AT < 2.5;$ $1.8 < (CT1+CT2)/(CT4+CT5) < 5.0;$ $0.1 < TD/BL < 1.1;$ $0 < (|f/f4|+|f/f5|)/(|f/f1|+|f/f2|) < 0.35;$ and $0 < CT3/CT1 < 0.55.$

19. The photographing optical lens assembly of claim 18, wherein the third lens element has positive refractive power.

20. The photographing optical lens assembly of claim 18, wherein the third lens element has an object-side surface being convex in a paraxial region thereof.

21. The photographing optical lens assembly of claim 18, wherein at least one of an object-side surface and the image-side surface of the fifth lens element has at least one inflection point, an axial distance between the first lens element and the second lens element is T12, the central thickness of the second lens element is CT2, and the following condition is satisfied:

$0 < T12/CT2 < 0.9.$

22. The photographing optical lens assembly of claim 18, wherein the Abbe number of the second lens element is V2, the Abbe number of the third lens element is V3, the Abbe number of the fourth lens element is V4, and the following condition is satisfied:

$50 < V2+V3+V4 < 90.$

23. The photographing optical lens assembly of claim 18, wherein a curvature radius of an object-side surface of the second lens element is R3, a curvature radius of an image-side surface of the second lens element is R4, and the following condition is satisfied:

$-10.0 < (R3-R4)/(R3+R4) < 1.4.$

24. The photographing optical lens assembly of claim 18, wherein a curvature radius of an object-side surface of the third lens element is R5, a curvature radius of the image-side surface of the third lens element is R6, and the following condition is satisfied:

$(R5+R6)/(R5-R6) < -1.8.$

25. The photographing optical lens assembly of claim 18, wherein a curvature radius of an object-side surface of the third lens element is R5, a curvature radius of an object-side surface of the fourth lens element is R7, and the following condition is satisfied:

$-15.0 < (R5+R7)/(R5-R7) < 0.6.$

26. The photographing optical lens assembly of claim 18, wherein an axial distance between the second lens element and the third lens element is T23, an axial distance between the third lens element and the fourth lens element is T34, an axial distance between the fourth lens element and the fifth lens element is T45, and the following condition is satisfied:

$2.5 < (T34+T45)/T23 < 20.0.$

27. The photographing optical lens assembly of claim 18, wherein a maximum effective radius of the object-side surface of the first lens element is Y1R1, a maximum effective radius of the image-side surface of the third lens element is Y3R2, a maximum effective radius of an object-side surface of the fourth lens element is Y4R1, a maximum effective radius of the image-side surface of the fifth lens element is Y5R2, and the following conditions are satisfied:

$0.5 < Y5R2/Y1R1 < 1.0;$ and $0.8 < Y3R2/Y4R1 < 1.5.$

28. The photographing optical lens assembly of claim 18, wherein the central thickness of the third lens element is CT3, an axial distance between the third lens element and the fourth lens element is T34, and the following condition is satisfied:

$CT3/T34 < 5.0;$ wherein an Abbe number of the first lens element is V1, the Abbe number of the second lens element is V2, the Abbe number of the third lens element is V3, the Abbe number of the fourth lens element is V4, an Abbe number of the fifth lens element is V5, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the i-th lens element is Ni, and at least one lens element of the photographing optical lens assembly satisfies the following condition:

$5.0 < Vi/Ni < 12.0,$ wherein $i=1,2,3,4,$ or $5.$

* * * * *